United States Patent
Hachiya et al.

(10) Patent No.: US 6,434,597 B1
(45) Date of Patent: Aug. 13, 2002

(54) ANIMATED VIRTUAL AGENT DISPLAYING APPARATUS, METHOD FOR DISPLAYING A VIRTUAL AGENT, AND MEDIUM FOR STORING INSTRUCTIONS FOR DISPLAYING A VIRTUAL AGENT

(75) Inventors: Kazuhiko Hachiya, Tokyo; Michio Kitamura, Kanagawa; Takashi Koki; Namie Otaki, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/691,354

(22) Filed: Oct. 18, 2000

Related U.S. Application Data

(62) Division of application No. 09/068,000, filed on Apr. 28, 1998, now Pat. No. 6,175,857.

(30) Foreign Application Priority Data

Apr. 30, 1997 (JP) .............................................. 9-113151

(51) Int. Cl.$^7$ .............................................. G06F 15/16
(52) U.S. Cl. ....................... 709/202; 345/473; 345/335; 345/327
(58) Field of Search ........................ 709/202; 707/505; 345/473, 474, 335, 327, 329

(56) References Cited

U.S. PATENT DOCUMENTS

| | | | | |
|---|---|---|---|---|
| 5,499,364 A | * | 3/1996 | Klein et al. ................. 709/202 |
| 5,517,663 A | * | 5/1996 | Kahn ......................... 395/173 |
| 5,682,469 A | * | 10/1997 | Linnett et al. |
| 5,694,616 A | | 12/1997 | Johnson et al. ............. 395/860 |
| 5,721,908 A | * | 2/1998 | Lagarde et al. ............... 707/10 |
| 5,768,505 A | | 6/1998 | Gilchrist et al. ........ 395/200.31 |
| 5,790,789 A | * | 8/1998 | Suarez ........................ 709/202 |
| 5,805,810 A | | 9/1998 | Maxwell ................ 395/200.36 |
| 5,822,526 A | | 10/1998 | Waskiewicz ........... 395/200.36 |
| 5,826,269 A | | 10/1998 | Hussey ......................... 707/10 |
| 5,944,787 A | | 8/1999 | Zoken ......................... 709/206 |
| 5,982,390 A | * | 11/1999 | Stoneking et al. .......... 345/474 |
| 5,987,525 A | | 11/1999 | Roberts et al. .............. 709/248 |
| 6,034,692 A | * | 3/2000 | Gallery et al. ............... 345/427 |
| 6,057,833 A | * | 5/2000 | Heidmann et al. .......... 345/328 |
| 6,085,222 A | * | 7/2000 | Fujino et al. ................ 709/202 |
| 6,141,019 A | * | 10/2000 | Roseborough et al. ...... 345/473 |
| 6,178,432 B1 | * | 1/2001 | Cook et al. .................. 707/513 |
| 6,292,828 B1 | * | 9/2001 | Williams .................... 709/218 |
| 6,311,195 B1 | * | 10/2001 | Hachiya et al. ............. 707/512 |
| 6,314,555 B1 | * | 11/2001 | Ndumu et al. ................. 717/1 |

\* cited by examiner

*Primary Examiner*—Krisna Lim
(74) *Attorney, Agent, or Firm*—Bell, Boyd & Lloyd LLC

(57) ABSTRACT

A method and apparatus for processing attached E-mail data and storage medium for processing a program for attached data in which, in sending/receiving an E-mail using a virtual pet displayed on a real world oriented GUI screen as an agent, in which parameters controlling the behavior of the agent are processed on the side of a server and returned to the user to enable the user to change the agent behavior. A user appends agent parameters to an E-mail to send the resulting mail to a pre-set address. An Internet service provider receives the E-mail to judge whether the title (Subject:) of the mail header is (cocktail lounge). If the title is the cocktail lounge, the physical power parameter of the agent parameter is lowered to append it to the E-mail Magneto-optical disc to send the mail back to the user. On the user side, the tipsy behavior of the drunken pet is displayed on the basis of the agent parameters appended to the E-mail Magneto-optical disc.

18 Claims, 60 Drawing Sheets

| INNER PARAMETERS | OUTER PARAMETERS |
|---|---|
| (1) MAIL COUNT | (1) POSITION |
| (2) AGE | (2) COMFORTABLENESS |
| (3) SEX | (3) USER ACTION-CARESSING |
| (4) INTELLIGENCE | (4) USER ACTION HITTING |
| (5) BODILY POWERS | (5) GUEST ACTION-CALLED |
| (6) VIGOR | (6) GUEST ACTION-SHOWN FRIENDSHIP |
| (7) FRIENDSHIP WITH KEEPER | (7) GUEST ACTION-SHOWN HOSTILITY |
| (8) HUNGRY DEGREE | (8) GUEST ACTION-ITEM GIVEN |
| (9) HAPPINESS DEGREE | (9) GUEST ACTION-ITEM REQUESTED |
| (10) CLEANNESS DEGREE | |
| (12) BIO-RYTHM (INDEFINITE) | |
| (13) NOISE (INDEFINITE) | |
| (11) FRIENDSHIP (WITH COUNTERPART) | |
| (12) PARAM 01 | |
| (13) POSITIVE / NEGATIVE (+/−) | |
| (14) GENTLENESS/ COLDNESS (+/−) | |
| (15) HEARTFULNESS / INDIFFERENCE (+/−) | |
| (16) CONCENTRATION/ DIFFUSIVENESS (+/−) | |
| (17) CHIC / AWKWARD (+/−) | |
| (18) PARAM 02 | |
| (19) PARAM 03 | |
| (20) PARAM 04 | |
| (21) PARAM 05 | |
| (22) PARAM 06 | |
| (23) MAKEUP DEGREE | |
| (24) PARAM 07 | |
| (25) PARAM 08 | |
| (26) PARAM 09 | |
| (27) ATTRACTIVENESS | |
| (28) PARAM 10 | |
| (29) PARAM 11 | |
| (30) GOURMET | |

FIG.7

```
Content-Type : application/x-postpet
Content-Transfer-Encoding : Base64
lAAEVgAAAAA...AAAAAAAAAAAAPABQAAAAAAAA8AFAAEADzoH/gf/B/z9NTOiVTiJYVihwXvNF
ROvMfFFPTk9RTURFSE5MUVBUSO5MSkpRUVIWWVlfXFpZWIFUTk9SUlFRSkRDSIBQTVNUYIFMRVFX
Y4u520Df40DI5eTo5ubn4+Pl4+Lh50Pm4unf5d714t7m4ubi3+fn3t7i50Df40Dl5uXh4+Xn4N/J
40jm4+bm4uPo4oXe5+jm5d/i60DJ50fg6ebm60bf3ufo2dDO1NP+zxjROM7N1M7LzdPT0tHoz9HM
z9DNOc/UldfTZ9bPztbNlNPoZNPRONPPy9TWO9LMOM7O0s3WONDT0dHP1M7TzdPUO9LPz9LUzdDV
lMrROM3Qzsu4i2RTTU9MSOILUVNQuVVUVk9QTO1FOzk5RkZQSIRPW1hWUlF0TUIMTEpHROZESUZl
/kUUQkBHTOlLTIVMTOheRkZQUIFGREFGAC/+LXsqLTtwLzUyMCMolSsoKSwtLS4pJiknJigsLiow
LSOoJIYsMC4yNZAWMy4xKSwpKiwpKSUmlSYoLCswLCUnJScsKz54sdPK40PI3uXj4uTh4+Xe3+rh
40Pg3t3j4uXj4d/j4+Dj5d7k5uDj4+XJ50DI4d/h50Xg3uHe3+Dlbt7g4uLh4+Tn50Le50Pk40bm
4+f5+jh6N/l4+Xg3+LZztXMlMrTO87NlM/MzsZVzdLSz9DTzNTVONHQzNLR0tLWONPROM7VO8zS
```

FIG.8

E-MAIL M to: petdata@yyy. or. jp from: user A@xxx. or. jp subject: nomiya ( NO MAIN TEXT )

+

AGENT PARAMETER P

FIG.54

E-MAIL M' to: user A@xxx. or. jp from: petdata@yyy. or. jp subject: nomiya ( NO MAIN TEXT )

+

AGENT PARAMETER P'

FIG.55

| E-MAIL ADDRESS | PET NAME | PHYSICAL POWER PARAMETER |
|---|---|---|
| user A1@xxx. or. jp | FURO | 5.00 |
| user A2@xxx. or. jp | MOMO | 10.00 |
| user A3@xxx. or. jp | SUMIKO | 3.00 |

FIG.61

```
to: user A1@xxx. or. jp
from: petdata@yyy. or. jp
subject: race result

YOUR PET ARRIVED SECOND
```

FIG.62

| | |
|---|---|
| FIRST | MOMO |
| SECOND | FURO |
| THIRD | SUMIKO |
| . | . |
| . | . |
| . | . |
| . | . |

FIG.64

ANIMATED VIRTUAL AGENT DISPLAYING APPARATUS, METHOD FOR DISPLAYING A VIRTUAL AGENT, AND MEDIUM FOR STORING INSTRUCTIONS FOR DISPLAYING A VIRTUAL AGENT

This is a divisional of Ser. No. 09/068,000 filed Apr. 28, 1998 now U.S. Pat. No. 6,175,857.

BACKGROUND OF THE INVENTION

1. Field of the Invention

This invention relates to a method and apparatus for processing attached E-mail data and storage medium for processing a program for attached data.

2. Description of Related Art

As a configuration of utilizing the Internet, providing a global-scale communication network environment capable of exchanging the information between mutually spaced-apart computers, an electronic mail (E-mail) is in widespread use.

In the Internet E-mail system, mail servers are provided in a distributed fashion in each domain. The client user sends or receives an E-mail to or from a mail server of the domain to which he or she belongs.

That is, a sender states the contents he or she desires to send and accords a required address and name by a client tool for an E-mail termed a mailer (software for sending/receiving the mail) or a browser (perusal/retrieval software) for sending the required address and mail to the receiver.

The mail server of a domain to which the sender belongs sends the mail for transmission to a representative mail server of an organization. The representative mail server accords an address of the server/node to be arrived at to send the address to the network, which then refers to the address to sequentially transfer the mail to the mail server to which belongs the counterpart of the communication (receiver).

The receiver recognizes the arrival of the E-mail in his or her post by various means such as display of a notice of arrival upon starting the mailer so that he or she can read the sent mail.

For delivery of the E-mail, the simple mail transfer protocol (SMTP), which is the upper-order protocol of the Transmission Control Protocol/Internet Protocol (TCP/IP), is used as the communication protocol. Usually, the format is automatically formulated by the mailer. To the leading end of the main text of the mail is appended a header made up of rows stating a date [Date:], name of mail sender [From:], an address [To:], a title [Subject:] or a carbon copy (blind carbon copy) [Bcc:], in accordance with SMTP.

Although the E-mail system of the Internet is based on the text (letter information: character codes), an extension format, configured for enabling handling of languages other than English or multimedia such as pictures or speech, is also defined as multi-purpose Internet mail extension (MIME). That is, the still-picture information, moving picture information or the speech information is compressed and converted to character codes which are assembled in the MIME system into the text and sent in this form. The receiver side automatically interprets the MIME system to check the form in which the information is assembled into the text to start a viewer/player tool for displaying/reproducing the information.

Although the above-described E-mail system is highly convenient if one is accustomed to it, the system is unfriendly to a user sending or receiving the E-mail for the first time using a personal computer, because the system is very different from the usual letter delivery system customarily used in everyday life. That is, the E-mail system can be utilized only after the user has learned and fully understood the operating method for the mailer as the E-mail exchanging software with the aid of a manual.

Recently, a set-top box, termed an Internet terminal, having assembled therein the Internet accessing function, is on the market, such that a user not in possession of a personal computer can easily utilize the Internet services by connecting the Internet terminal to the television receiver in his or her home. However, the mailer operating method cannot be intuitively understood even by this Internet terminal user.

In order for the user having no experience in using the personal computer to be able to comprehend the mailer operating method intuitively, there has been proposed a method for sending and receiving the E-mail by using a real-world oriented GUI and using an agent on his or her behalf, such as a pet like a rabbit or a tortoise. This displays the process of receiving and delivering the E-mail or the process of E-mail delivery from another user to permit intuitive comprehension of the act of mail delivery between users.

With the above-mentioned E-mail system, the agent parameters controlling the behavior of each pet is varied each time the user causes his or her own pet to send the E-mail such that the pet is improved in ability or lowered in physical power.

However, if a mailer for sending and receiving this special type of the E-mail is not previously installed in each personal computer on the sending side and the receiving side, E-mail sending/reception by the pet cannot be tested, such that the change or growth of the pet cannot be appreciated.

SUMMARY OF THE INVENTION

It is an object of the present invention to provide a method and apparatus for processing attached E-mail data and storage medium for processing a program for attached data in which, in exchanging E-mails using a virtual pet displayed on the real-world oriented GUI picture as an agent, the parameters controlling the behavior of the agent are processed on the server side and returned to the user to enable the agent behavior to be changed on the user side.

In one aspect, the present invention provides a method for processing appended data to an E-mail including extracting, on reception of an E-mail comprised of a mail header and a plurality of appended agent parameters controlling the behavior of an agent which is a virtual pet delivering an E-mail, the mail header and the plural agent parameters of the E-mail, specifying one or more of the extracted agent parameters specified by the extracted mail header and processing the specified agent parameter to return the parameter to a sender of the E-mail.

In another aspect, the present invention provides an apparatus for processing appended data to an E-mail including means for extracting, on reception of an E-mail comprised of a mail header and a plurality of appended agent parameters controlling the behavior of an agent which is a virtual pet delivering an E-mail, the mail header and the plural agent parameters of the E-mail, control means for managing control for specifying one or more of the extracted agent parameters specified by the extracted mail header and transfer means for processing the specified agent parameter to return the parameter to a sender of the E-mail.

In yet another aspect, the present invention provides a medium for storage of a program processing appended data to an E-mail including extracting, on reception of an E-mail comprised of a mail header and a plurality of appended agent parameters controlling the behavior of an agent which is a virtual pet delivering an E-mail, the mail header and the plural agent parameters of the E-mail, specifying one or more of the extracted agent parameters specified by the extracted mail header and processing the specified agent parameter to return the parameter to a sender of the E-mail.

With the method and apparatus for processing attached E-mail data, if an E-mail including a mail header and appended plural agent parameters controlling the behavior of the agent as a virtual pet delivering the E-mail is received, the server extracts the mail header appended to the mail and plural agent parameters and processes the specified one or more agent parameters specified on the basis of the mail header to return the processed agent parameter(s) to the sender. Thus, the behavior of the agent on the side of the mail sender, that is, the user can be modified. That is, the behavior of the agent which is the virtual pet sending the E-mail can be controlled on the side of the server to render it possible to vary the agent behavior by the mail exchange of the server.

With the medium for storage of a program for processing appended data to the E-mail according to the present invention, the function of processing the behavior of the agent as a virtual pet for sending an E-mail, and returning the processed parameters to the user, in exchanging the E-mail for the server using the virtual pet displayed in the real world oriented GUI picture as an agent, is installed on the appended data processing apparatus for displaying this function.

BRIEF DESCRIPTION OF THE DRAWINGS

FIG. 7 shows the type of an agent parameter annexed to the main text of an E-mail sent by the PostPet.

FIG. 8 shows an example of an agent parameter annexed to the main text of an E-mail sent by the PostPet.

FIG. 54 shows the structure of the E-mail M sent by the user.

FIG. 55 shows the structure of the E-mail M returned by the Internet service provider.

FIG. 61 shows the structure of a physical power parameter table.

FIG. 62 illustrates an E-mail returned by the Internet service provider to the user A.

FIG. 64 shows the results of the athletic meeting by the postpets as displayed on a home page of the Internet service provider.

DESCRIPTION OF PREFERRED EMBODIMENTS

Figure 1:
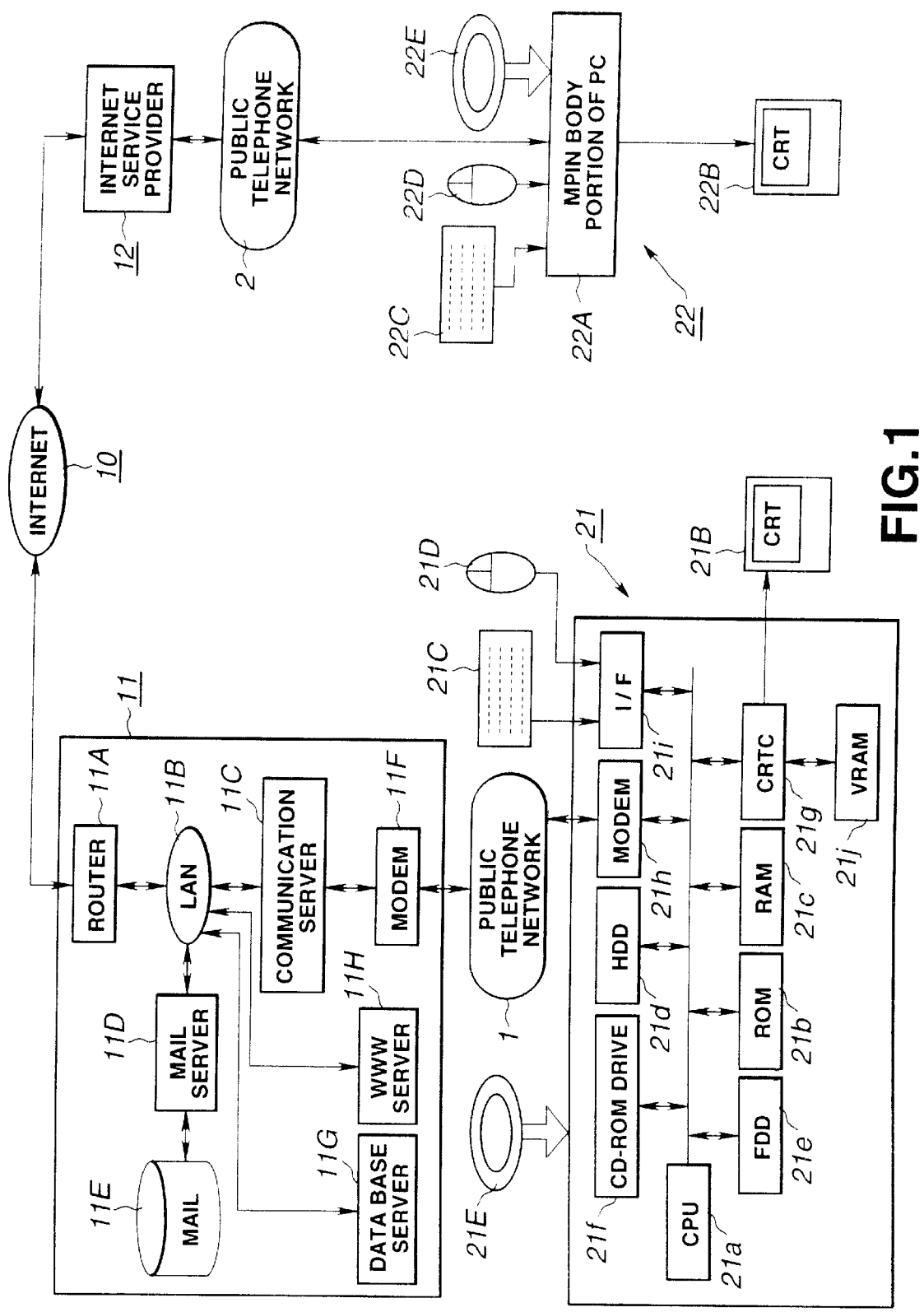
FIG. 1 is a schematic block diagram showing an E-mail system according to the present invention.

Referring to the drawings, preferred embodiments of the present invention will be explained in detail.

The present invention is applied to an electronic mail (E-mail) system in which an E-mail is exchanged between plural personal computers 21, 22 connected respectively to the Internet 10 via public telephone networks 1, 2 and via Internet service providers 11, 12.

The Internet service provider 11 is constituted by a router 11A, a communication server 11C and a mail server 11D interconnected by the Local Area Network (LAN) 11B. There is provided in the mail server 11D a mail spool 11E constituted by a hard disc drive for transient storage of the E-mail. The communication server 11C includes a MODEM 11F for connection over a public telephone network 1 to the personal computer 21. To the LAN 11B are connected a data base server 11G and a World Wide Web (WWW) server 11H.

The E-mail sent to the Internet service provider 11 is first transferred to the mail server 11D. The mail server 11D extracts the mail header or agent parameters as later explained from the transferred E-mail to send these data to the data base server 11G. The data base server 11G has a controller not shown, which stores the information of the E-mail transferred from the mail server 11D in a memory, such as a hard disc, and subsequently sums the information to send the necessary information to the WWW server 11H. In the WWW server 11H is stored the hyper-text (HTML) file made up of the usual text, still pictures, moving pictures or the speech information. The WWW server 11H generates the hyper text file for displaying the hole page based on the information from the database server 11G.

This Internet service provider 11 transfers the E-mail, sent from a personal computer 21 of a client user connected by dial-up IP (Internet Protocol) over the public telephone network 1 to the communication server 11C, to a mail server 11D, which then transfers this transferred E-mail over the Internet 10 to a mail server, not shown, of an Internet service provider 12 of the domain to which belongs the receiver (counterpart of communication). When an E-mail addressed to a client (user) over the Internet 10 is transferred to the Internet service provider 11, the latter stores the mail in a mail spool 11E to transfer the mail to the client user whenever a transfer request is made from the valid client (user). Meanwhile, other Internet service providers 12, . . . also have the E-mail storage and transferring function basically similar to that of the Internet service provider 11.

This personal computer 21 of the client (user) of the Internet service provider 11 includes a main body portion 21A, a CRT display device 21B, a keyboard 21C and a mouse 21D. The main body portion 21A is provided with a central processing unit (CPU) 21a, a read-only memory (ROM) 21b, a random-access memory (RAM) 21c, a hard disc drive 21d, a floppy-disc drive (FDD) 21e, a CD-ROM drive 21f, a cathode ray tube controller (CRTC) as a display controller 21g, a MODEM 21h, an interfacing (I/F) unit 21i and a video RAM 21i. The CRT display device 21B is connected to the display controller 21g, while the keyboard 21C and the mouse 21D are connected to the interfacing unit 21i.

The personal computer 21 is connected via the main body portion 21A to the public telephone network 1.

The personal computer 21 operates as a mailer by reading out and installing an E-mail sending/receiving program stored in the CD-ROM drive 21E. Meanwhile, the E-mail sending/receiving program may also be downloaded and installed from e.g., http://www.so-net.or.p./postpet/index.html of a World Wide Web (WWW) server on the Internet 10 managed by Sony Communication Network Corporation over the Internet service provider 11 and the public telephone network 1.

Therefore, the program storage medium within the scope of the present invention means not only the recording medium such as CD-ROM 21E but also a medium in the broad sense of the term including Internet or digital satellite data broadcast.

In the present embodiment, other personal computers 22 also operate as a mailer by having installed therein the same E-mail sending/receiving programs as the above personal computer 21.

Figure 2:
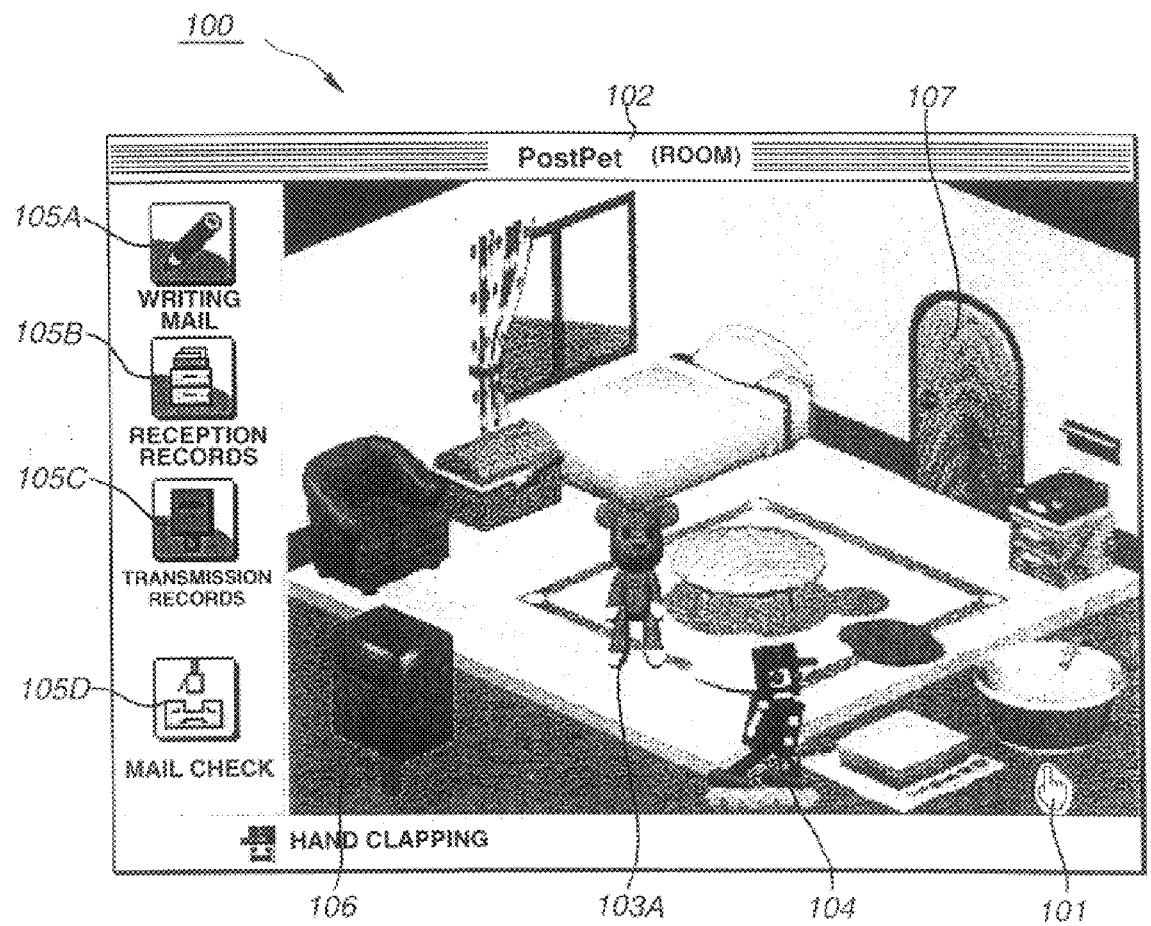
FIG. 2 shows a GUI picture of 'PostPet (room)' displayed upon starting a mailer installed on a personal computer with the E-mail system.

If, in the personal computer 21, having installed therein the above-mentioned E-mail sending/receiving program, the mailer is started, the CPU 21a generates bit map data corresponding to the graphical user interface (GUI) picture simulating a room in order to write the bit map data on the video RAM 21j of the display controller 21g for causing the display controller 21g to display the GUI picture 100 of FIG. 2 on the screen of the display device 21B.

For superposed display of a pointing cursor 101 on the GUI picture 100, the CPU 21a writes the bit map data of the pointing cursor 101 at a pre-set position of the video RAM 21j. This displays the pointing cursor 101 at a position specified by the mouse 21D on the GUI picture 100 displayed on the screen of the display device 21B.

Figure 3:
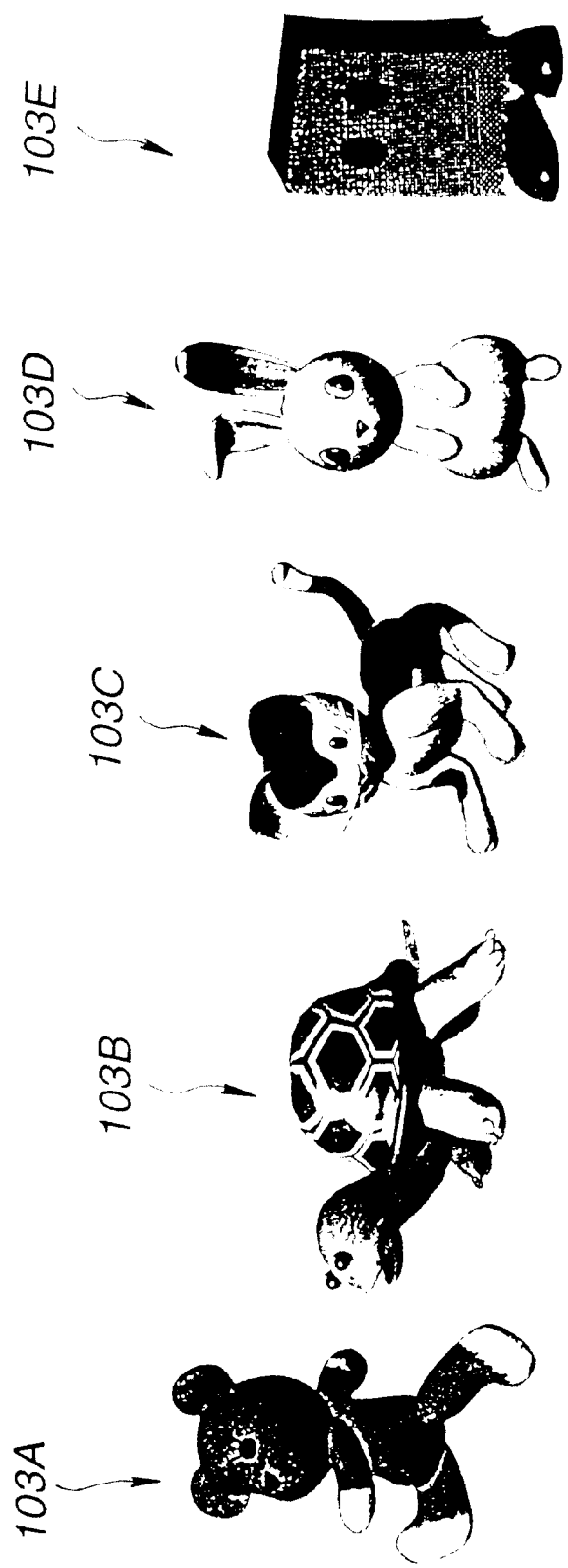
FIG. 3 shows the type of a PostPet prepared in the mailer.

On the top of the GUI picture 100, its title 102 is displayed. On the GUI picture 100 shown in FIG. 3 is displayed 'PostPet (Room)' as a title 102. Meanwhile, the PostPet is a trademark of a mailer which is the Internet E-mail sending/receiving program provided by Sony Communication Network Corporation.

For superposed display on the GUI picture 100 of a post pet 103 simulating a bear doll and a postman 104 simulating a robot doll as agents for performing E-mail sending/reception, the CPU 21e writes bit map data of the post pet 103 and the postman 104 at pre-set positions on the RAM 21j in superposition on the bit map data corresponding to the GUI picture 100. This displays the post pet 103 and the postman 104 on the GUI screen 100.

As characters of the post pet 103, there are provided teddy bear (Momo) 103 simulating a bear, a tortoise (Sumiko) 103B, a hybrid cat (Furo) 103C, a mini-rabbit (Mippi) 103D and a Hatena-kun 103E, as shown, for example, in FIG. 3. One of these excluding Hatena-kun 103E can be registered and used as the post pet 103, that is, as an agent. The post pet 103 has its behavior determined by agent parameters varied by the learning function as later explained.

Figure 4:
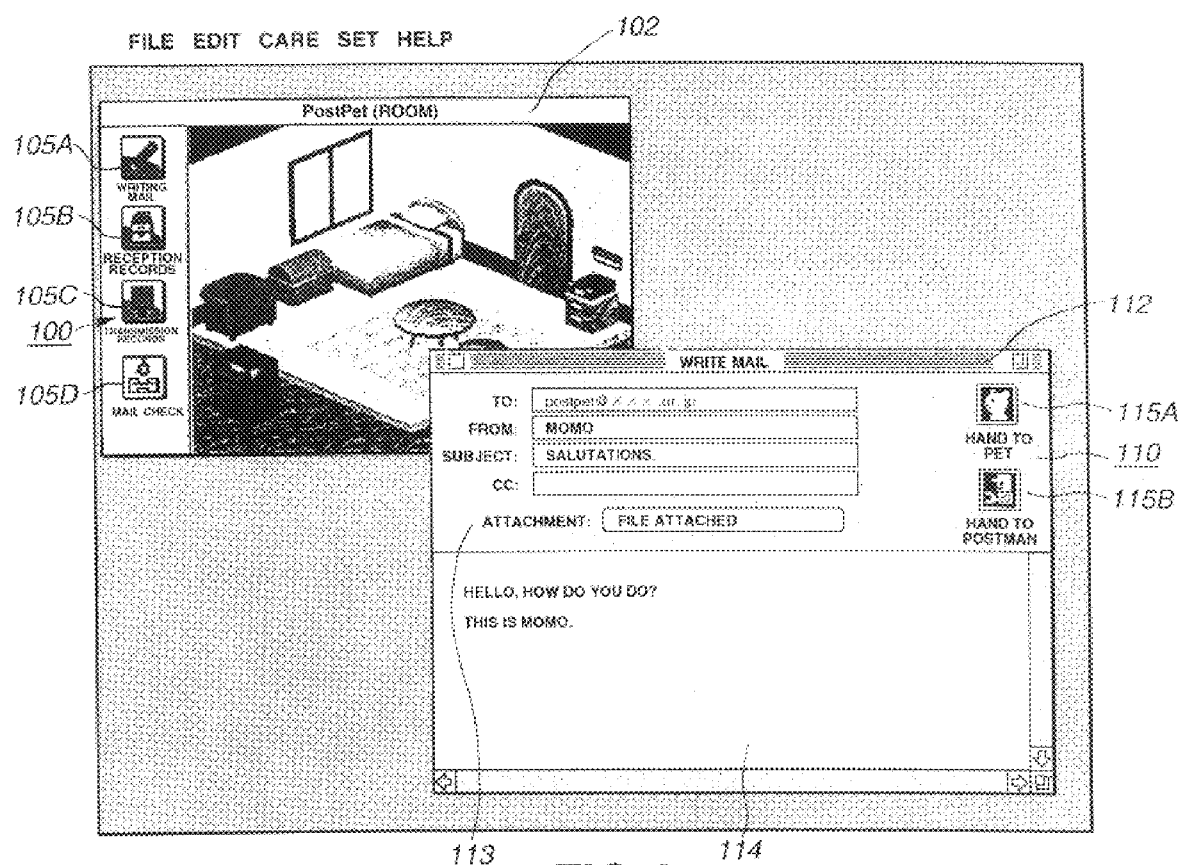
FIG. 4 shows a GUI picture 'Write a Mail' represented on the mailer.
Figure 5:
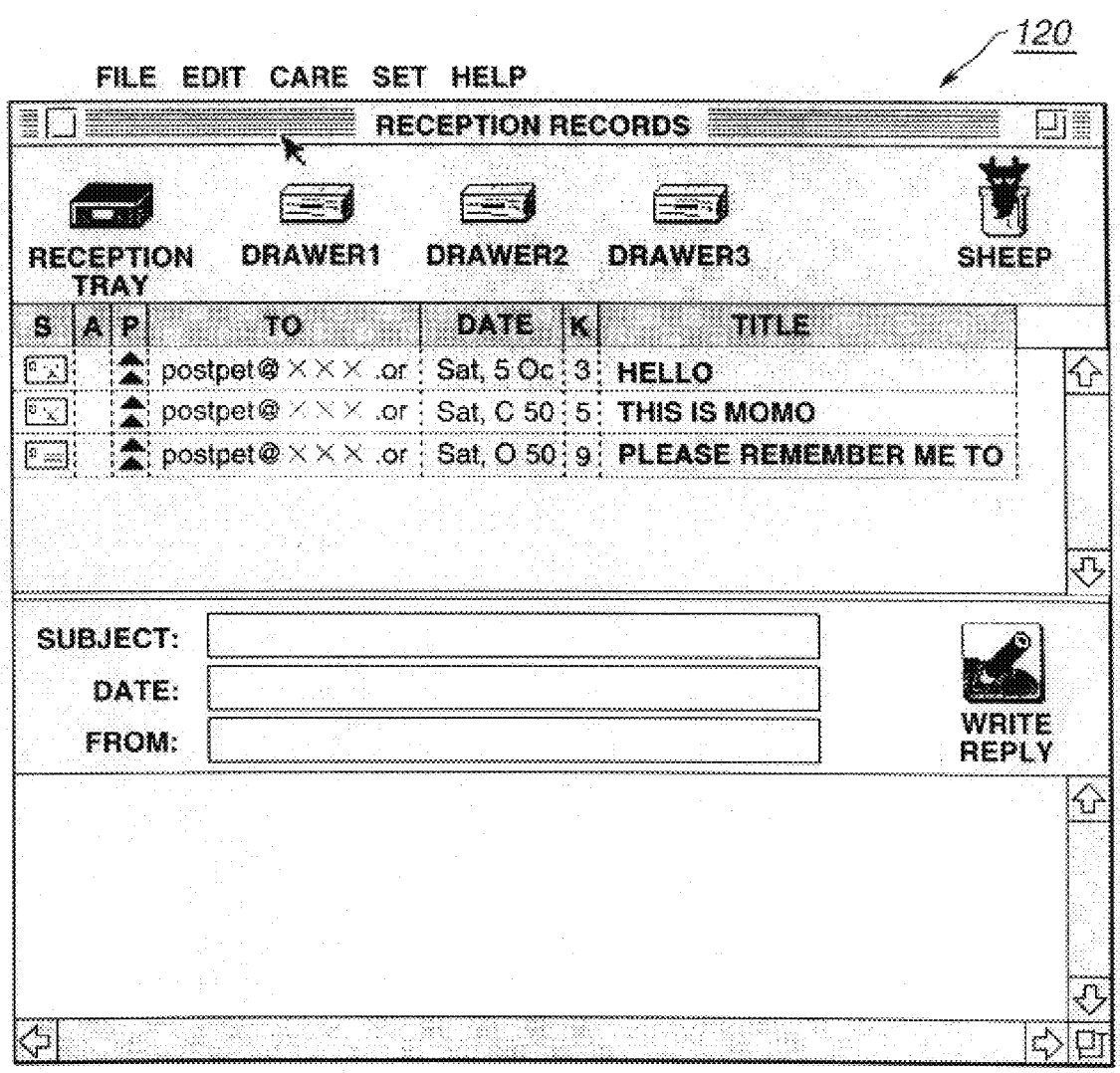
FIG. 5 shows a GUI picture of a 'reception list' represented on the mailer.

On the left-side portion of the GUI picture 100 of the 'PostPet (Room)' shown in FIG. 2 are displayed a mail writing icon 105A, shown in FIG. 4, a reception list icon 105B, shown in FIG. 5, a sending list icon 105C for commanding display of a GUI picture of a sending list, not shown, and a mail check icon 105D for commanding the connection, also not shown.

The user operates the mouse 21D for moving the pointing cursor 101 on the mail writing icon 105A on the GUI picture of the above-mentioned 'PostPet (Room)' to click the mail writing icon 105A. This causes the CPU 21a to write the bit map data, corresponding to the GUI picture 100 of the 'PostPet (Room)' and a 'Write a Mail' GUI picture 110 superposed thereon, at a pre-set position on the video RAM 21j, as shown in FIG. 4, such that the GUI picture 100 of the 'PostPet (Room)' and the 'Write a Mail' GUI picture 110 are displayed by multiple window representation on the screen of the display device 21B.

On the top of the GUI picture 110 is displayed 'Write a Mail' as a title 112. The upper and lower halves of the 'Write a Mail' GUI picture 110 represent a first display area 113 for displaying the contents of the mail header and a second display area 114 for displaying the mail contents, respectively. In the first display area 113, there is displayed the header information, such as the address [To:], name of mail sender [From], title [Subject], carbon copy [Color conversion:] or attachment [Attachment], entered by actuation of the keyboard 21C by the user. In the first display area 113, there are displayed an icon 115A for handing over to a pet for instructing mail dispatch by the post pet 103 and an icon 115B for handing over to the postman 104 for instructing mail dispatch by the postman 104.

In the second display area 114 is displayed the main text of the mail entered on keyboard actuation by the user.

Figure 19:
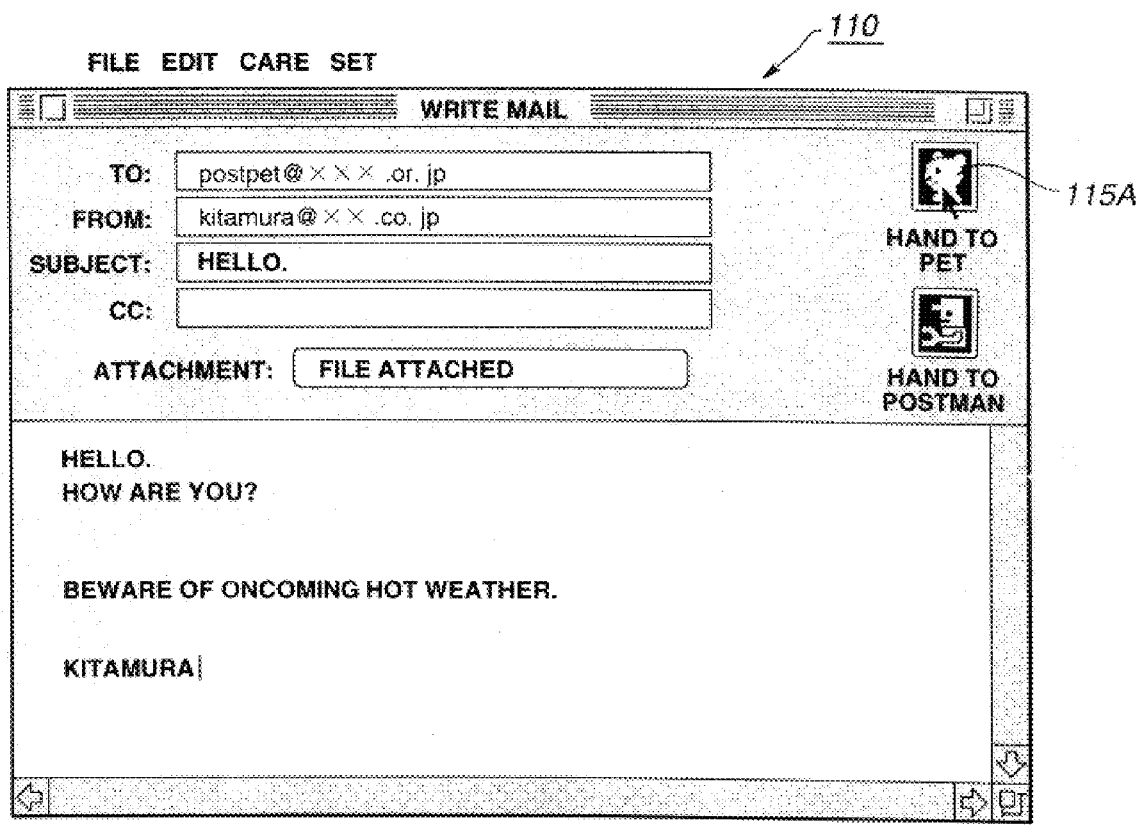
FIG. 19 shows the state of commanding mail sending by the PostPet on the GUI picture 'Write a Mail' represented by the mailer.

If the user actuates the mouse 21D to shift the pointing cursor 101 over the icon 115A of handing over to the pet on the GUI picture 110 of 'Writing a Mail', as shown in FIG. 19, and clicks a mouse button, the CPU 21 a executes processing of steps SP20 to SP27 of the sending subroutine processing to send the pet mail, as will be explained subsequently with reference to FIG. 10.

Figure 6:
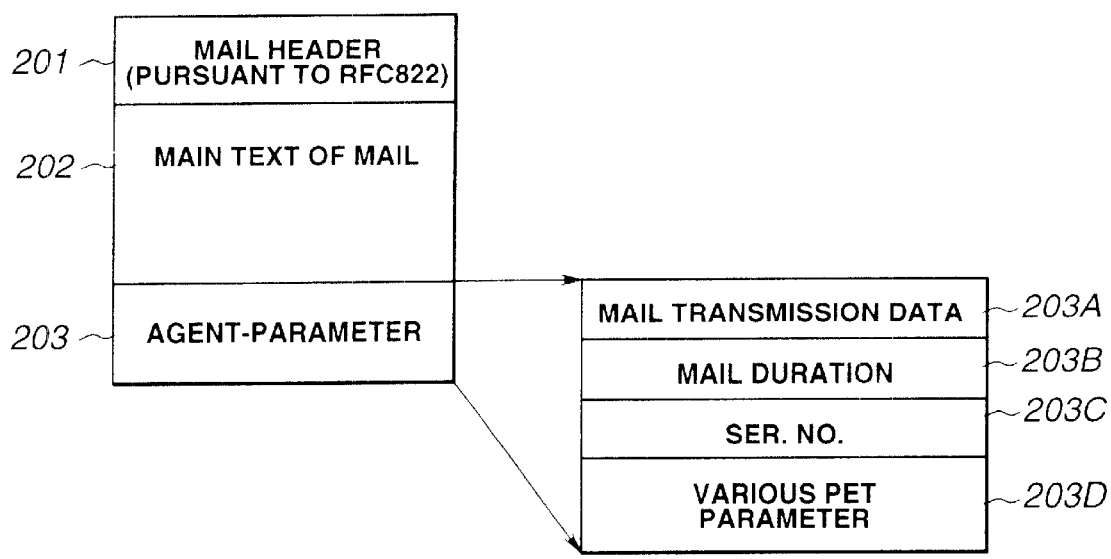
FIG. 6 shows the structure of an E-mail sent by the PostPet.

Specifically, the CPU 21 a formulates data of an E-mail composed of a main text 202 added to with a mail header 201 and an agent parameter 203 determining the behavior of the post pet 103 attached to the main text, and sends the data as pet mail to the receiver, as shown in FIG. 6.

The agent parameter 203 is each made up of 4-byte data of the sending data information 203A specifying the mail sending date, mail life information 203B specifying whether or not the receiver has to modify the mail to return it to the sender, serial number information 203C specifying the number of the mails handled so far by the post pet, and the post pet parameter information 203D, such as the information of the environment, stimulus or desire information of the post pet, as shown in FIG. 6.

The post pet parameter information 203D is made up of the inner parameters and the outer parameters, as shown in FIG. 7. The inner information are made up of, for example, mail count, age, sex, intelligence, vigor, friendship (with the keeper), hunger, happiness, cleanliness, bio-rhythm (indefinite element), noise (indefinite element), friendship (with the counterpart), positiveness/negativeness (+/−), cheerfulness/gloominess (+/−), gentleness/coldness (+/−), concentration/diffusiveness (+/−), chic/awkward, fashionability, attractiveness or taste for gourmet. The outer parameters are made up of, for example, position, comfortableness of a room, user action-number of times of hitting, guest action-called, guest action-shown friendship, guest action-shown hostility, guest action-giving items, and guest action-items requested. These parameters are entered to the feeling unit as later explained to start the behavior unit to determine the behavior of the post pet 10.

The above-mentioned agent parameters 203 are converted into Base 64 format employing letters of A to Z, a to z and 0 to 9 in accordance with the Multipurpose Internet Mail Extension (MIME) of the Internet mail. FIG. 8 shows an example of the agent parameters 203 annexed to the main text of the mail 202. The MIME provides two sorts of the encoding methods. In the Base 64 stated in Request for Comments (RFC) 1512, 3 bytes are divided into four equal parts to narrow the code width to accommodate the values specified by the bytes in 64 numerical figures of from 0 to 63 to which letter codes of A to Z, a to z and 0 to 9 are accorded. Meanwhile, details on RFC are stated in D. Comer, "Internet working with TCP/IP" 1988, Prentice-Hall ISBNO-13-470154-2, 025.

Figure 13:
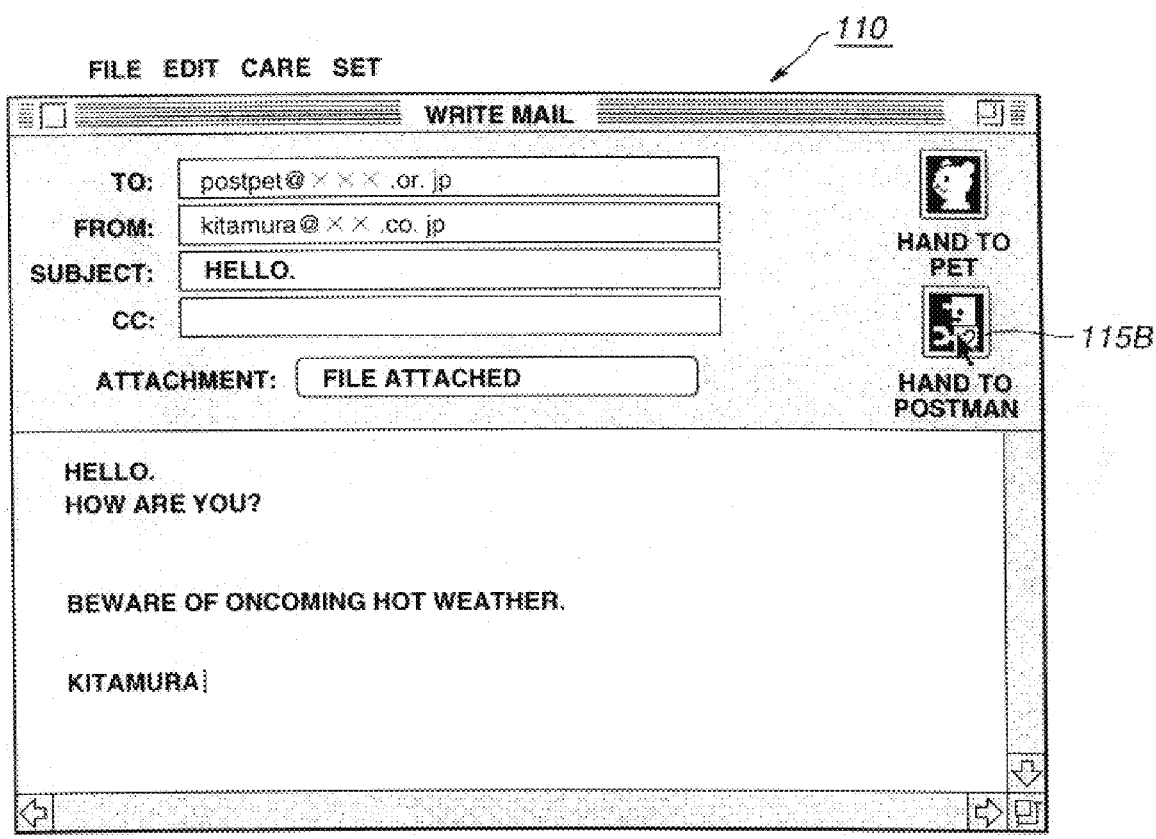
FIG. 13 shows the state of instructing mail sending by a postman in the GUI picture 'Write a Mail' represented by the mailer.

If the user actuates the mouse 21D to move the pointing cursor 101 on the icon 115B of handing over the GUI picture 110 of 'Writing a Mail' to the postman to click the mouse button, as shown in FIG. 13, the CPU 21a executes the processing from SP29 to SP33 in the sending subroutine processing as later explained with reference to FIG. 13 in order to send the usual mail.

That is, the CPU 21a simply formulates data of an E-mail made up of the main text 202 of the mail added to with the mail header 201 and sends it to the counterpart as the usual E-mail.

Referring to FIGS. 9 to 12, the operation of the personal computer 21 having installed therein the above-mentioned E-mail sending/receiving program, is hereinafter explained.

Figure 9:
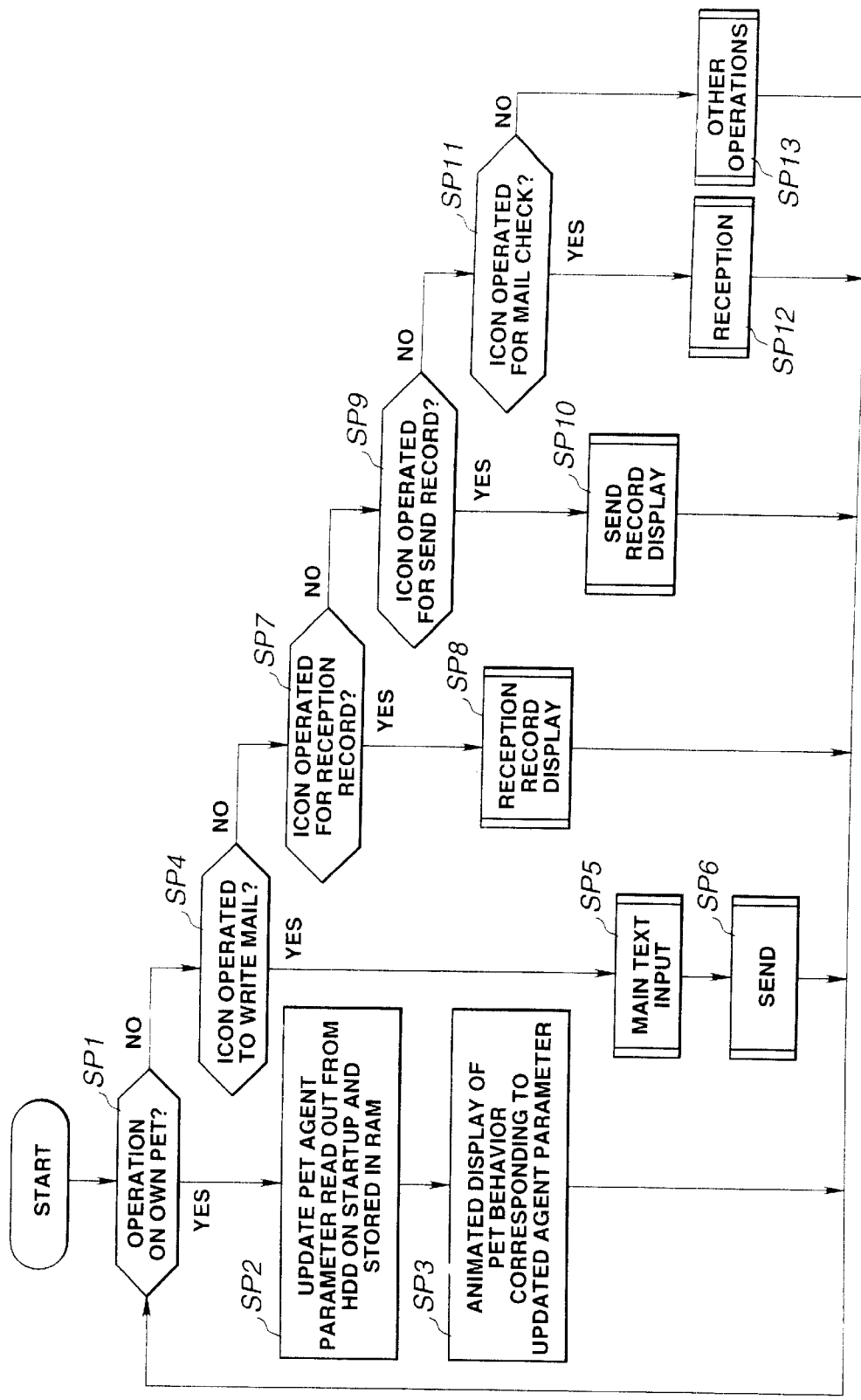
FIG. 9 is a flowchart showing the entire processing function of the mailer.

First, steps SP1 to SP13 of the general flowchart, comprehensively showing the entire operation of FIG. 9, are explained.

Figure 32:
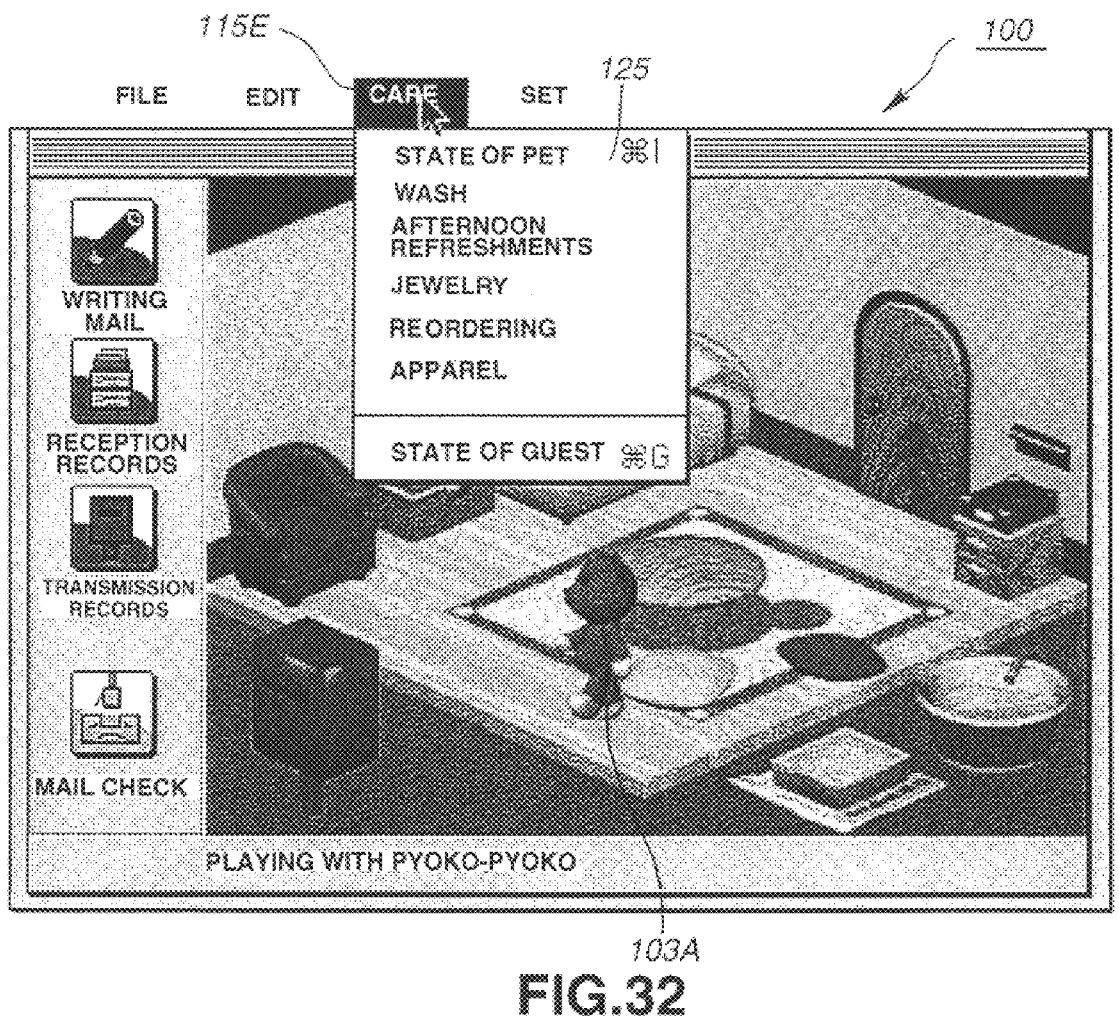
FIG. 32 shows the state of clicking an icon commanding looking after the post pet on the GUI picture of the 'PostPet (Room)' for opening a pulldown menu.

At step SP1 of FIG. 9, it is judged whether or not the operation by the user is the operation on a pet owned by no other than the user. That is, if the mouse 21D is actuated by the user such that the operation of superposing the pointing cursor 101 shown in FIG. 2 on the post pet 103 (on the teddy-bear 103A in the case of FIG. 2), shifting the mouse 21D left or right or clicking the mouse button is carried out, or if 'wash' or 'refreshments' are selected from the looking-after pulldown menu, as shown in FIG. 32, such that the operation of looking after the post pet 103 is carried out, these operations by the user are judged to be the operation for his or her own pet (the pet owned by the user). In this case, processing transfers to step SP2 and, if otherwise, processing transfers to step SP4.

At step SP2, the agent parameters of the user's own pet, read out upon startup of the E-mail sending/receiving program from HDD 21d and stored in RAM 21c, are updated. The processing for updating the agent parameters will be explained later in detail with reference to FIG. 12.

At the next step SP3, the processing for animated representation of the behavior of the user's own pet in association with the updated agent parameters is executed before processing reverts to step SP1.

If, at step SP1, the operations are judged as not being the operations on the user's own pet, such that processing transfers to step SP4, it is judged at this step SP4 whether or not the mail writing icon 105A has been clicked. If the result of judgment is affirmative, processing transfers to step SP5 and, if otherwise, to step SP7.

At step SP5, the sub-routine of entering the header of the E-mail to be sent or the main text is executed. First, the GUI picture 110 of 'Writing a Mail' shown in FIG. 5 is displayed, after which the E-mail header or the main text is formulated in accordance with the text inputting command by the user before processing transfers to step SP6.

Figure 10:
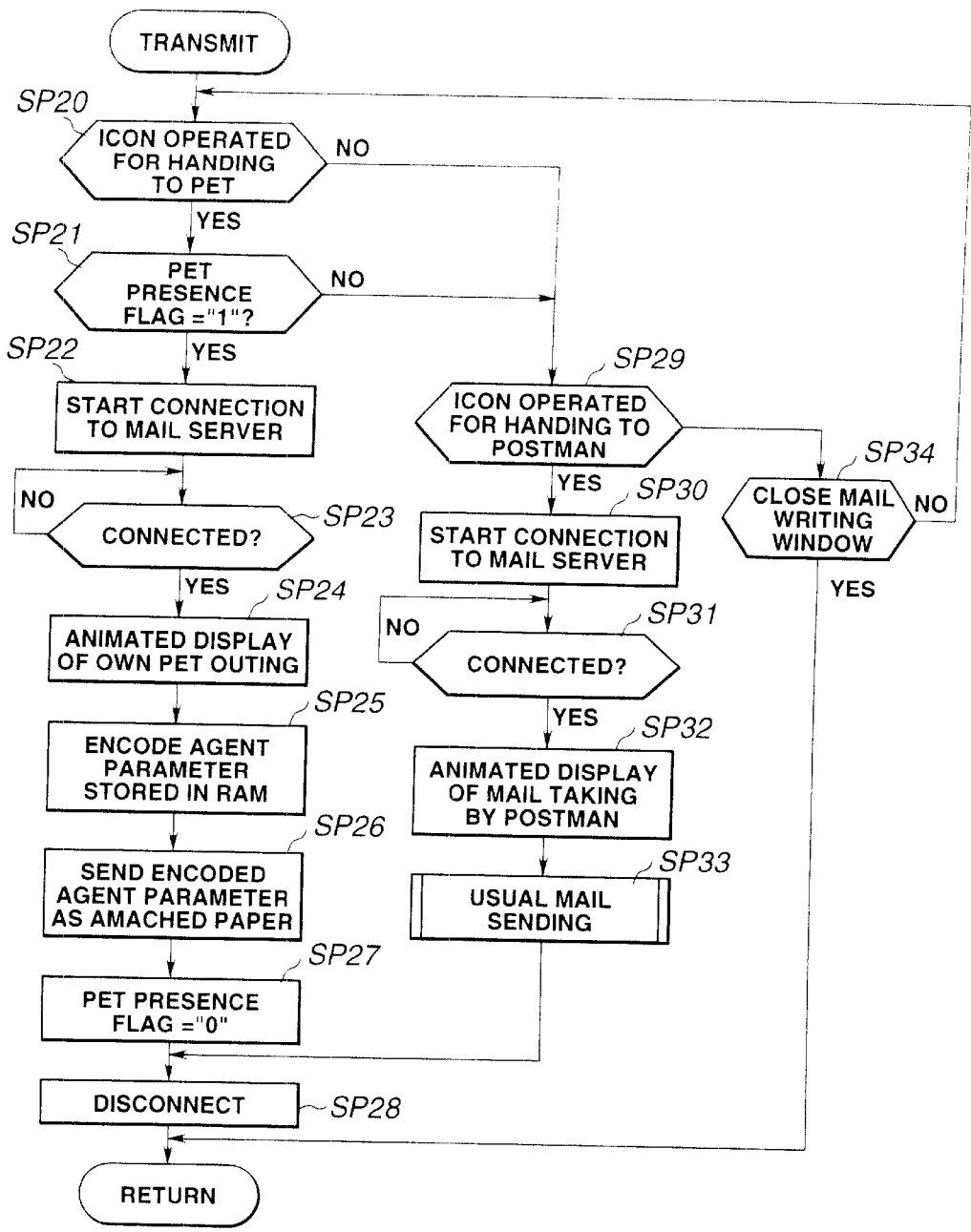
FIG. 10 is a flowchart showing the contents of sending processing by the mailer.

At step SP6, the sending subroutine explained subsequently with reference to FIG. 10 is executed, before processing reverts to step SP1.

At step SP7, it is judged whether or not the reception list icon 105B has been clicked. If the result of judgment is affirmative, processing transfers to step SP8 and, if otherwise, to step SP9. At step SP8, the reception list display subroutine for displaying a GUI picture 120 of the 'reception list' shown in FIG. 5 is executed before processing reverts to step SP1.

At step SP9, it is judged whether or not the sending list 105C has been clicked. If the result of judgment is affirmative, processing transfers to step SP10 and, if otherwise, to step SP11. At step SP10, the reception list displaying the subroutine for displaying the 'sending list' GUI picture, not shown, is executed, before processing reverts to step SP1.

Figure 11:
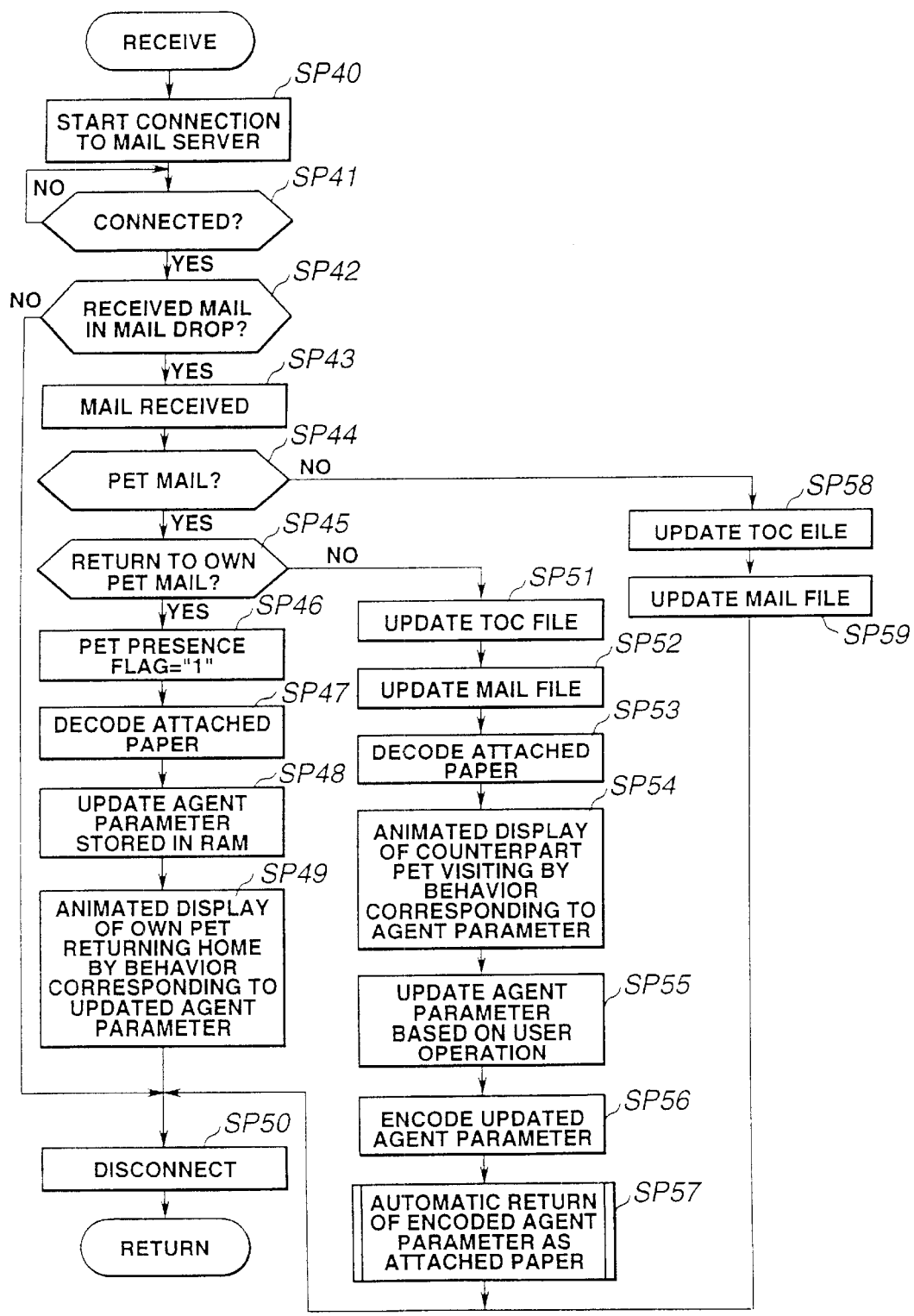
FIG. 11 is a flowchart showing the contents of receiving processing by the mailer.

At step SP11, it is judged whether or not the mail check icon 105D has been clicked. If the result of judgment is affirmative, processing transfers to step SP12 and, if otherwise, to step SP13. At step SP12, the reception subroutine explained subsequently with reference to FIG. 11 is executed before processing reverts to step SP1. At step SP13, other processing operations are executed before processing reverts to step SP1.

Next, the steps SP20 to SP33 of the flowchart of the sending subroutine processing of FIG. 10 is explained.

If the user actuates the mouse 21D to move the pointing cursor 101 on the icon 115A of handing over to the pet on the GUI picture 110 of 'Write a Mail' and clicks the mouse button, as shown in FIG. 19, it is judged that the icon 115A of handing over to the pet has been operated, such that processing transfers from step SP20 to step SP21 to judge whether or not a pet-at-home flag stored in the RAM 21c is '1'. If the user's pet is at home, that is if the pet-at-home flag is '1', the subsequent steps SP22 to SP27 are executed to send the pet mail.

That is, as shown in FIG. 6, E-mail data composed of the mail main text 202 with the mail header 201 appended thereto and the agent parameters 203 determining the behavior of the post pet 103, appended as annexed papers, is formulated, and sent as a pet mail to a counterpart of communication.

In this case, the pet mail can be sent only when the pet-at-home flag is '1', that is if the user's pet is at home.

First, if connection is made at step SP22 to the mail server 11D of the service provider 11, for requesting mail transfer in accordance with the transfer protocol of the Simple Mail Transfer Protocol (SMTP), and connection is judged at the next step SP23 to have been made, processing transfers to step SP24. At this step SP24, the user's own pet (teddy-bear 103A shown in FIG. 2) deems the E-mail of the keeper as being a letter and animation display is made such that the pet opens a door 107 to go out and recover the letter posted in a mail post 106 for delivery to the receiver. At the next step SP25, the agent parameters of the user's pet, stored in the RAM 21C, is encoded by the encoding method prescribed in Base 64 of MIME. At the next step SP26, the encoded agent parameters are annexed to the main text 202 as annexed papers. This pet mail is sent to the mail server 11D.

At step SP27, the pet-at-home flag, stored in the RAM 21c, is set to '0', that is, to absence, before processing transfers to step SP28 to break the connection to the mail server 11D to complete a series of the sending subroutine processing. Then, processing reverts to step SP1 of FIG. 9.

On the other hand, if the user operates the mouse 21D to move the pointing cursor 101 on the icon 115b of handing over to the postman on the GUI picture 110 of 'Write a Mail' to click the mouse button, as shown in FIG. 13, it is judged that the icon 115B of handing over to the postman has been actuated. Thus, processing transfers from step SP20 through step SP29 to step SP30 so that the processing from step SP30 to SP33 is executed to send the usual E-mail.

That is, E-mail data composed simply of the mail main text 202 having appended thereto the mail header 201 is formulated and sent to the counterpart as the usual E-mail.

First, at step SP30, connection is made to the mail server 11D of the service provider 11 for requesting mail transfer based on the SMTP transfer protocol.

If, at the next step SP31, the connection is judged to have been completed, processing transfers to step SP32 to display an animation in which the postman 104 deems the E-mail of the keeper as being a letter to recover the letter posted in the mail post 106 to go out for mail delivery, as shown in FIGS. 14 to 18. At the next step SP33, the usual E-mail is sent to the mail server 11D, after which processing transfers to step SP28 to cancel the connection to the mail server 11D to complete a series of the sending subroutine operations to return to the step SP1 of FIG. 9.

If none of the icon 115A of handing over to the pet nor the icon 115B of handing over to the postman has been operated at steps SP20 and SP29, with the closure box on the upper right side of the GUI picture 110 of 'Write a Mail' being clicked, the mail writing window is judged at step SP34 to be closed, such that processing reverts to step SP1 of FIG. 9 without executing the above-mentioned sending subroutine.

Next, the steps SP40 to SP59 of the reception subroutine of FIG. 11 is explained.

First, at step SP40, connection is made to the mail server 11D of the service provider 11, based on the communication protocol of the Post Office Protocol Version 3 (POP3) which is the upper order protocol of TCP/IP. If the connection has been judged at the next step SP41 to have been completed, processing transfers to step SP42 to make inquiry whether or not there is a mail addressed to the user in a mail drop of the mail server 11D. This personal mail directory is an area for arriving mails for personal use, usually termed a mail drop, and has the function similar to the private box of a post office.

If it is judged at step SP42 that there is an arriving mail, processing transfers to step SP43. If it is judged that there is no arriving mail, processing transfers to step SP50 to cancel connection to the mail server 11D to terminate a series of the reception subroutine operations before processing reverts to step SP1 of FIG. 9.

If it has been judged at step SP42 that there is an arriving mail in the mail drop, the E-mail addressed to the user is received at step SP43 from the mail server 11D. At the next step SP44, it is judged, based on data of the mail header 201 of the E-mail addressed to the user, whether or not the E-mail is the pet mail. If the received E-mail is judged at step SP44 to be the pet mail, processing transfers to step SP45 to judge whether or not the mail received is the return mail to the pet mail dispatched by the user.

If the pet mail sent by the user is automatically reception-processed by the receiver, the mail text 202 is deleted and part of the sent pet mail composed of the mail header 201 and the agent parameters annexed thereto as the annexed papers is returned as the return mail.

If the received pet mail is judged at step SP45 to be the return mail to the pet mail dispatched by the user, processing transfers to step SP46 to set the pet-at-home flag stored in the RAM 21c to '1', that is to 'at home', before processing transfers to step SP47 to decode the annexed papers encoded by the encoding method prescribed by the Base 64 of MIME.

At the next step SP48, the agent parameters of the user's pet stored in the RAM 21c are updated, based on the decoded agent parameters. At the next step SP49, the processing of displaying an animation in which the user's pet opens the door to return home with the behavior corresponding to the updated agent parameters is executed.

Then, processing transfers to step SP50 to cancel the connection to the mail server 11D to complete a series of reception subroutine operations before processing reverts to step SP1 of FIG. 9.

Conversely, if it is judged at step SP45 that the received pet mail is not the return mail to the user's pet mail, processing transfers to step SP51 to execute the updating processing accompanying the addition of new arriving mails to the Table-of-Contents (TOC) file.

The TOC file is a reception list file held on a client's local disc (HDD21d), and is a file composed of an extracted portion of the mail header 201. Specifically, the TOC file is made up of TO, FROM, CC, Subject, priorities, attachment flags indicating the presence or absence of the annexed papers, sort flags indicating whether or not the mail is a pet mail, and addresses in the local disc of the mail main text 202 corresponding to the mail header 201.

When the reception list is first opened, a list of received mails is displayed. This list is formulated from the TOC file. If a mail is designated from the list, the main text 202 of the corresponding address is sliced from the mail file (collective file of the main texts of the mail 202).

For example, if the TOC file reads: FROM: aaaaaa@ipd.sony.co.jp, Subject: Patent for PostPet . . . Address (from 1100 to 1120), and the main text of the mail 202 is to be displayed, the text corresponding to addresses 1100 to 1120 of the mail file is sliced and displayed.

Next, at step SP52, the updating processing accompanying the addition of new arriving mails of the mail file is executed. After updating the mail file having stored therein the main text 202, processing transfers to step SP53 to decode the annexed papers encoded by the encoding method prescribed by the Base 64 of MIME.

At the next step SP54, the processing of displaying the animation in which the pet of the counterpart of communication (teddy-bear 103A in FIGS. 25 to 28) opens the door 107 to make a call and stays for a pre-set time to then open the door to return home. If, during the time the counterpart pet stays indoors, the user operates the mouse 21D to superpose the pointing cursor 101 over the counterpart pet to move the mouse 21D left and right or to click the mouse button, the agent parameters of the counterpart pet are updated at step SP55, based on the actuation by the user. Next, at step SP56, the agent parameters of the counterpart pet are encoded by the encoding method prescribed by Base 64 of MIME. At the next step SP57, the encoded agent parameters are annexed as annexed papers to the mail header 201. The pet mail, this formulated, is automatically returned to the mail server 11D.

Then, processing transfers to step SP50 to cancel the connection to the mail server 11D to compete a series of the reception subroutine operations before processing reverts to step SP1 of FIG. 9.

If it is judged at step SP44, based on the data of the mail header 201 of the received E-mail addressed to the user, that the received E-mail is not the pet mail, but is a usual E-mail, processing transfers to step SP58 to update the TOC file. Then, processing transfers to step SP50 to cancel the connection to the mail server 11D to complete a series of the reception subroutine operations before processing reverts to step SP1 of FIG. 9.

Figure 12:
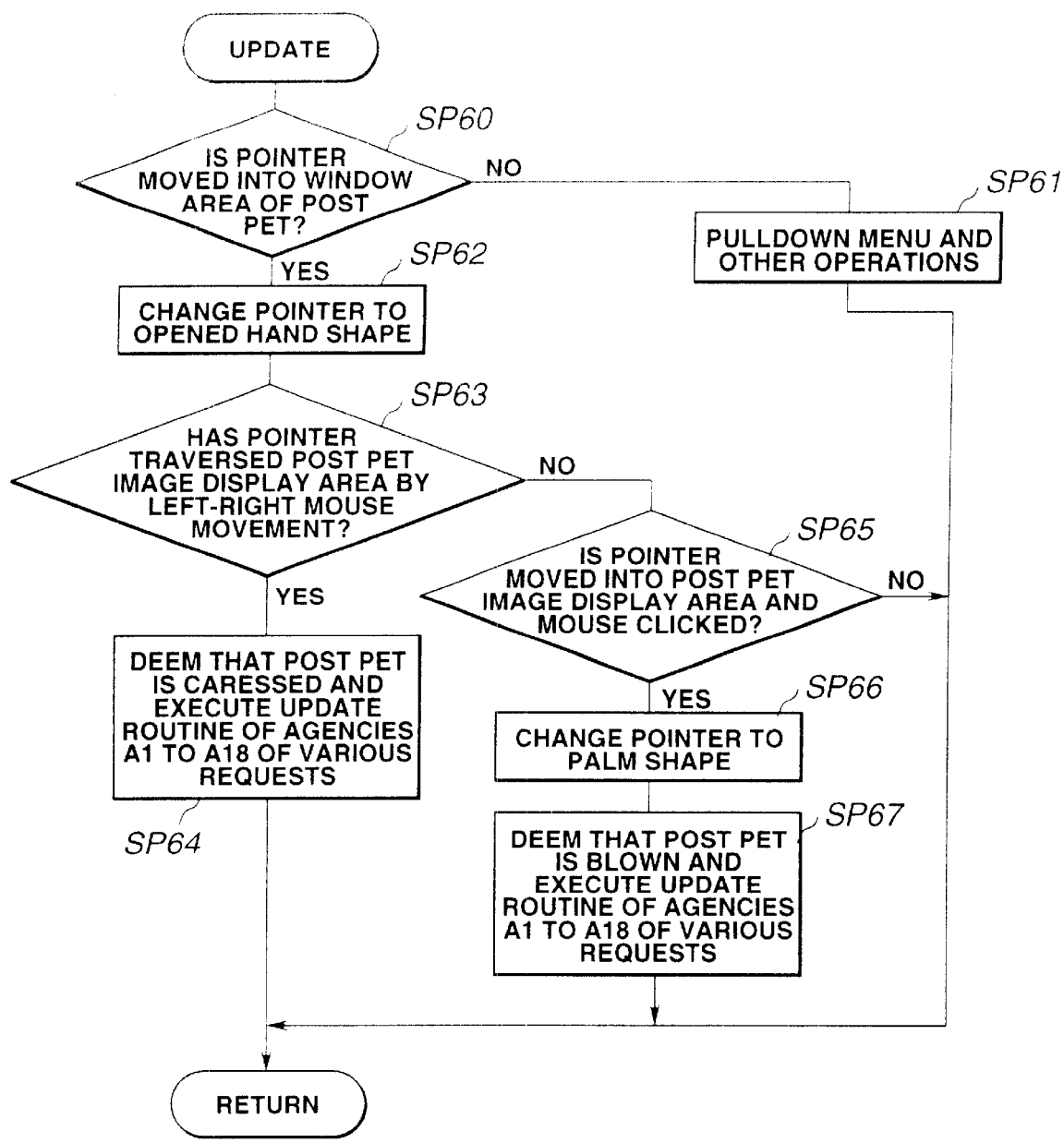
FIG. 12 is a flowchart showing the contents of update processing for the agent parameter by the mailer.

Next, the steps SP60 to SP67 of the agent parameter update processing shown in FIG. 12 are hereinafter explained.

Figure 40:
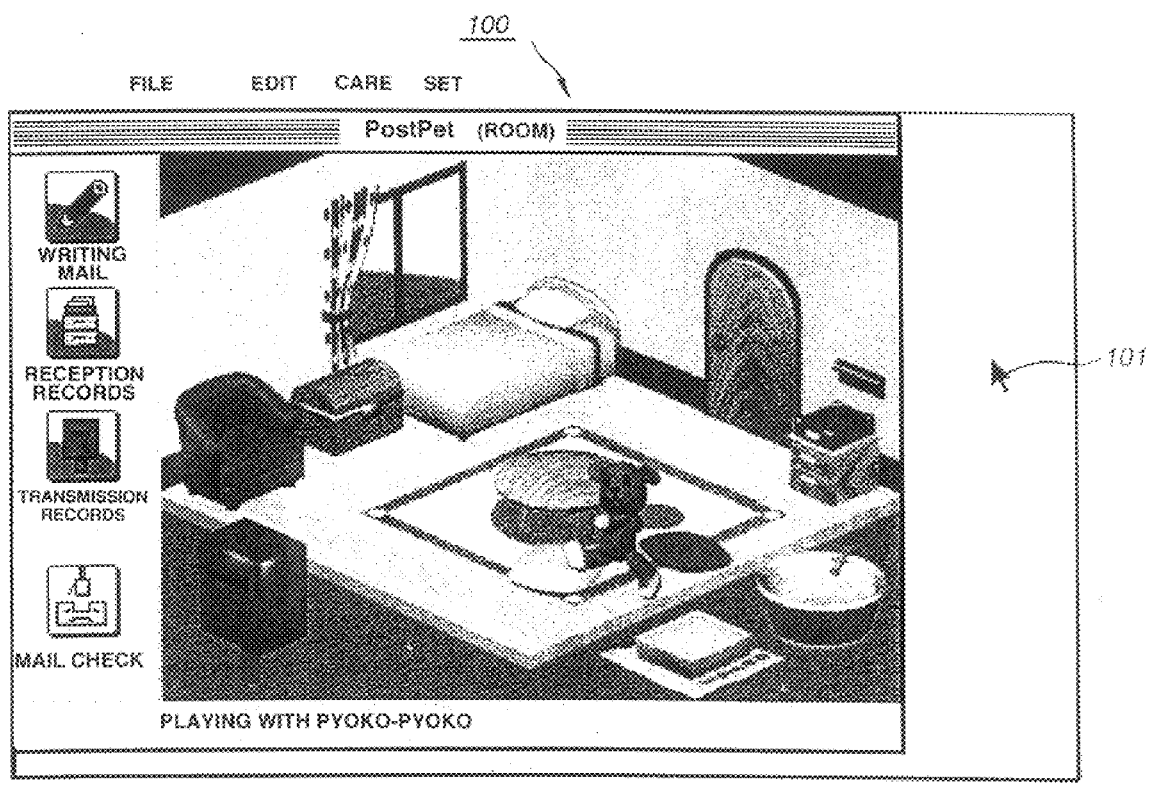
FIG. 40 shows the display state of a pointing cursor positioned outside of a room on the GUI picture of the 'PostPet (Room)'.
Figure 41:
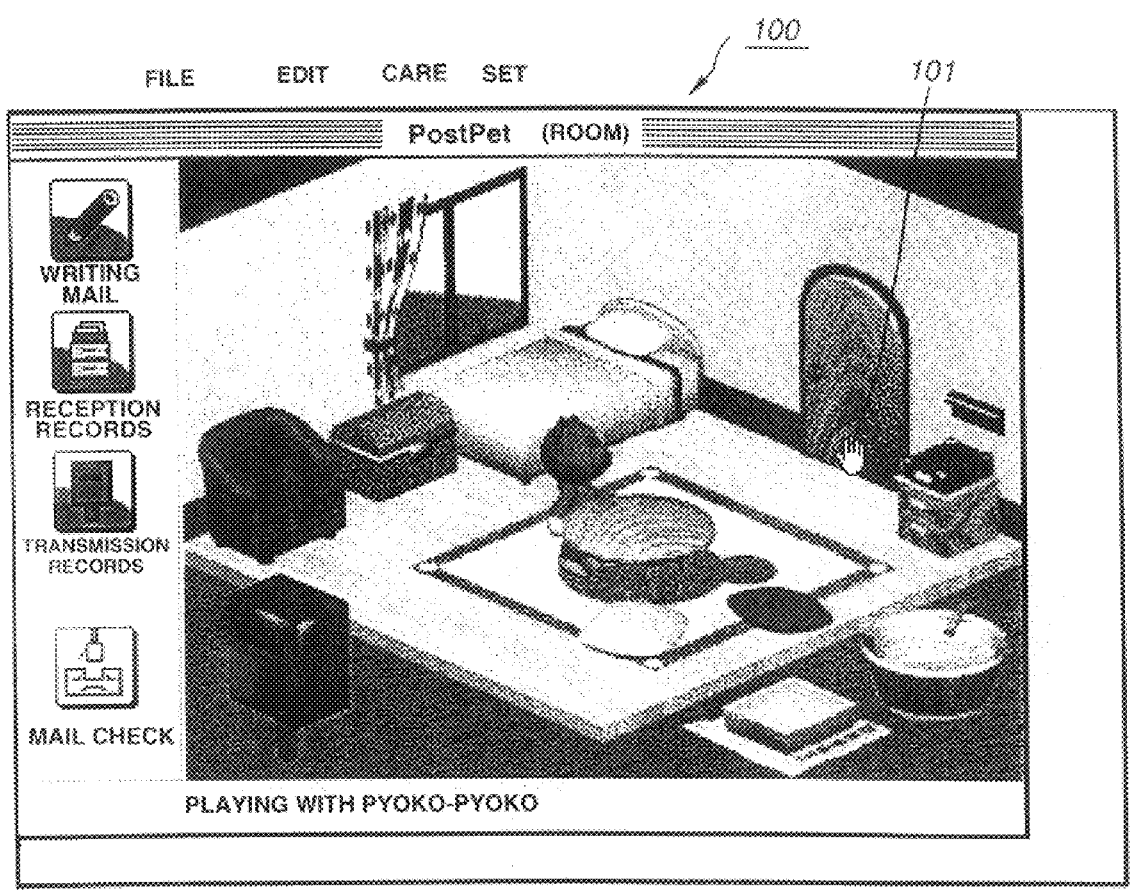
FIG. 41 shows the display state of a pointing cursor positioned within a room on the GUI picture of the 'PostPet (Room)'.

Referring to the flowchart of FIG. 12, the CPU 21a monitors at step SP60 whether or not the pointing cursor 101 displayed on the screen of the display device 21B has moved into a window area of 'PostPet (Room)'. If the pointing cursor 101 is outside the window area of 'PostPet (Room)', pulldown menu processing or the like processing is executed at step SP61. If the pointing cursor 101 goes into the window area of 'PostPet (Room)', that is into the room, the pointing cursor 101 is changed at step SP62 to an open hand shape. Thus, if the pointing cursor 101 is positioned outside the room on the GUI picture 100 of the 'PostPet (Room)', as shown in FIG. 40, the pointing cursor 101 is represented as an arrow, whereas, if it goes into the room, as shown in FIG. 41, it is displayed in an open hand shape.

Figure 42:
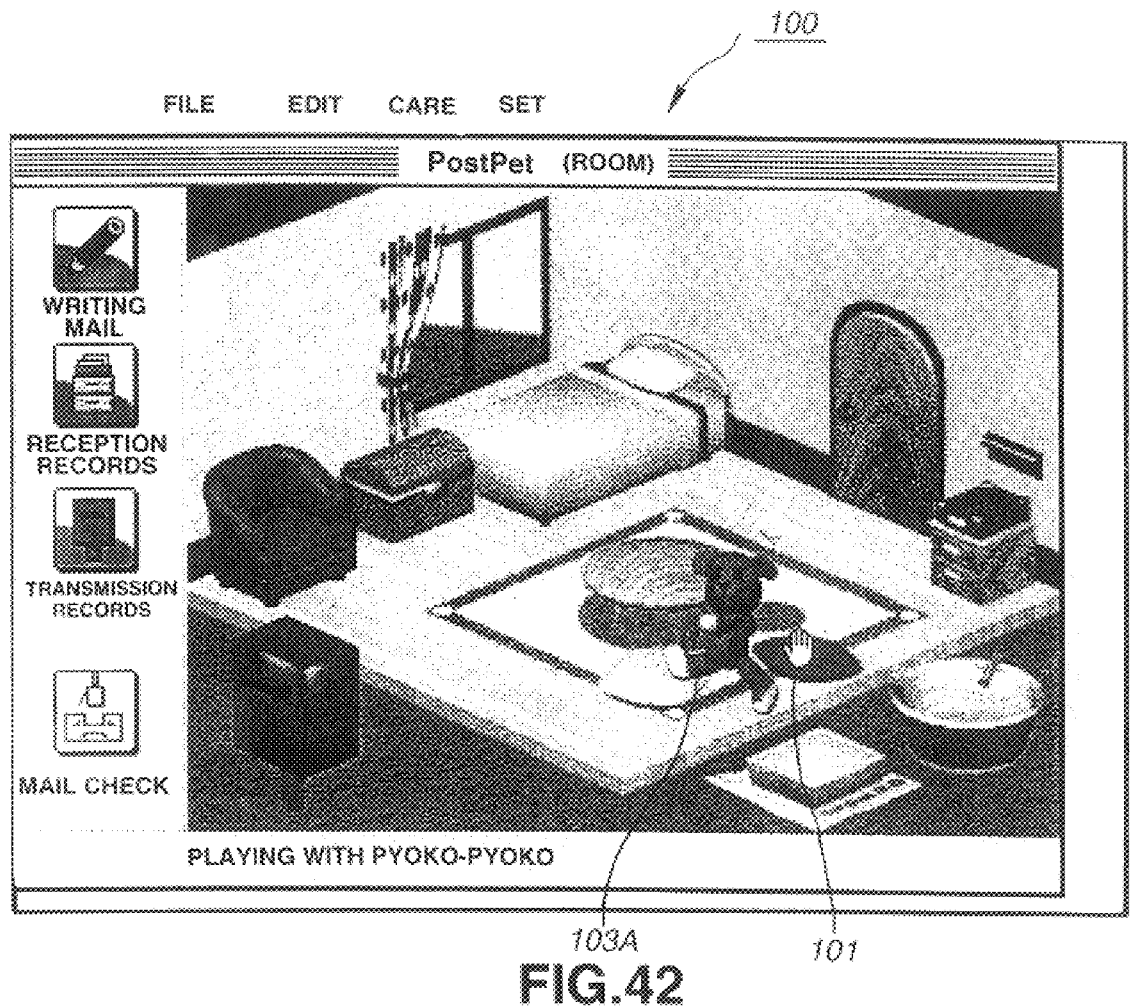
FIG. 42 shows the state of caressing the post pet on the GUI picture of the 'PostPet (Room)'.
Figure 43:
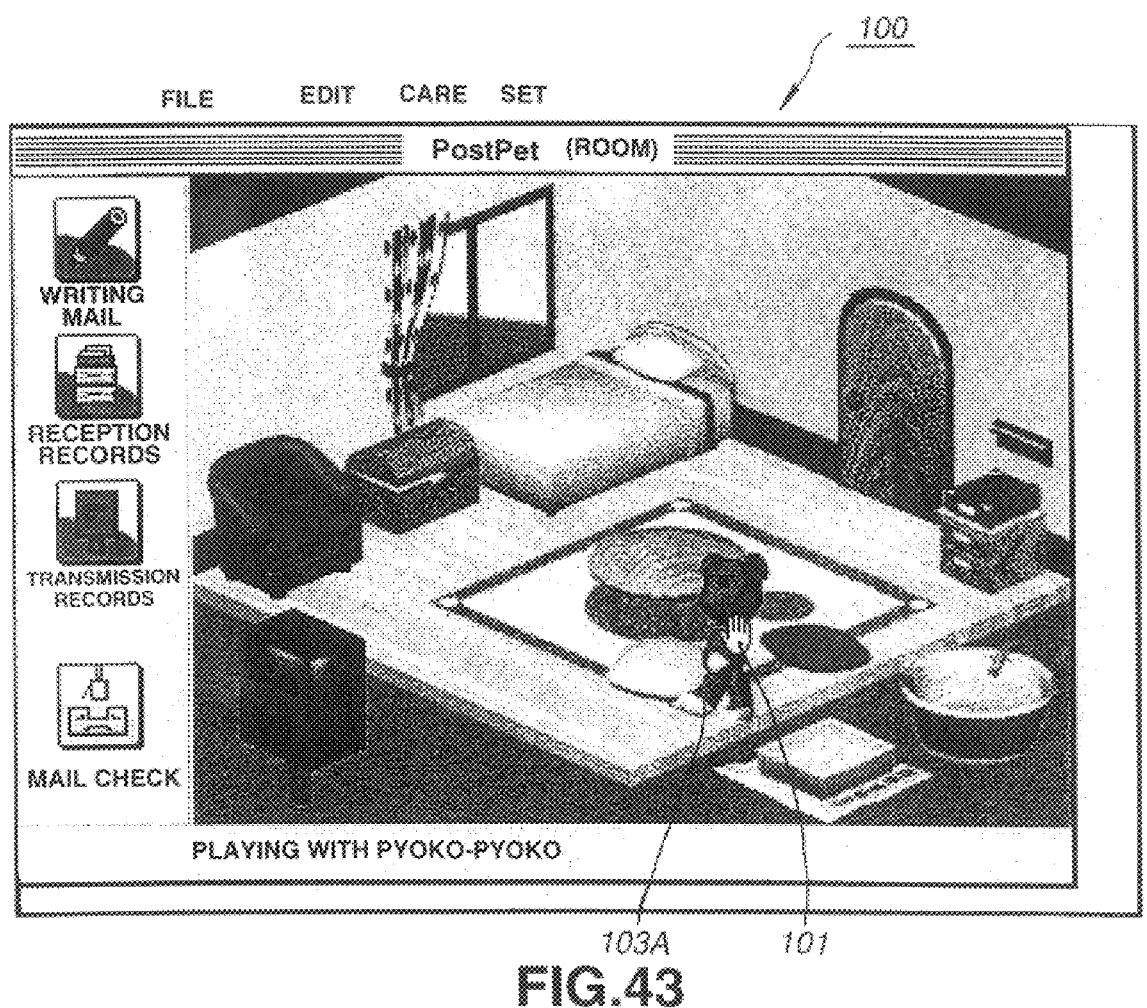
FIG. 43 similarly shows the state of caressing the post pet on the GUI picture of the 'PostPet (Room)'.
Figure 44:
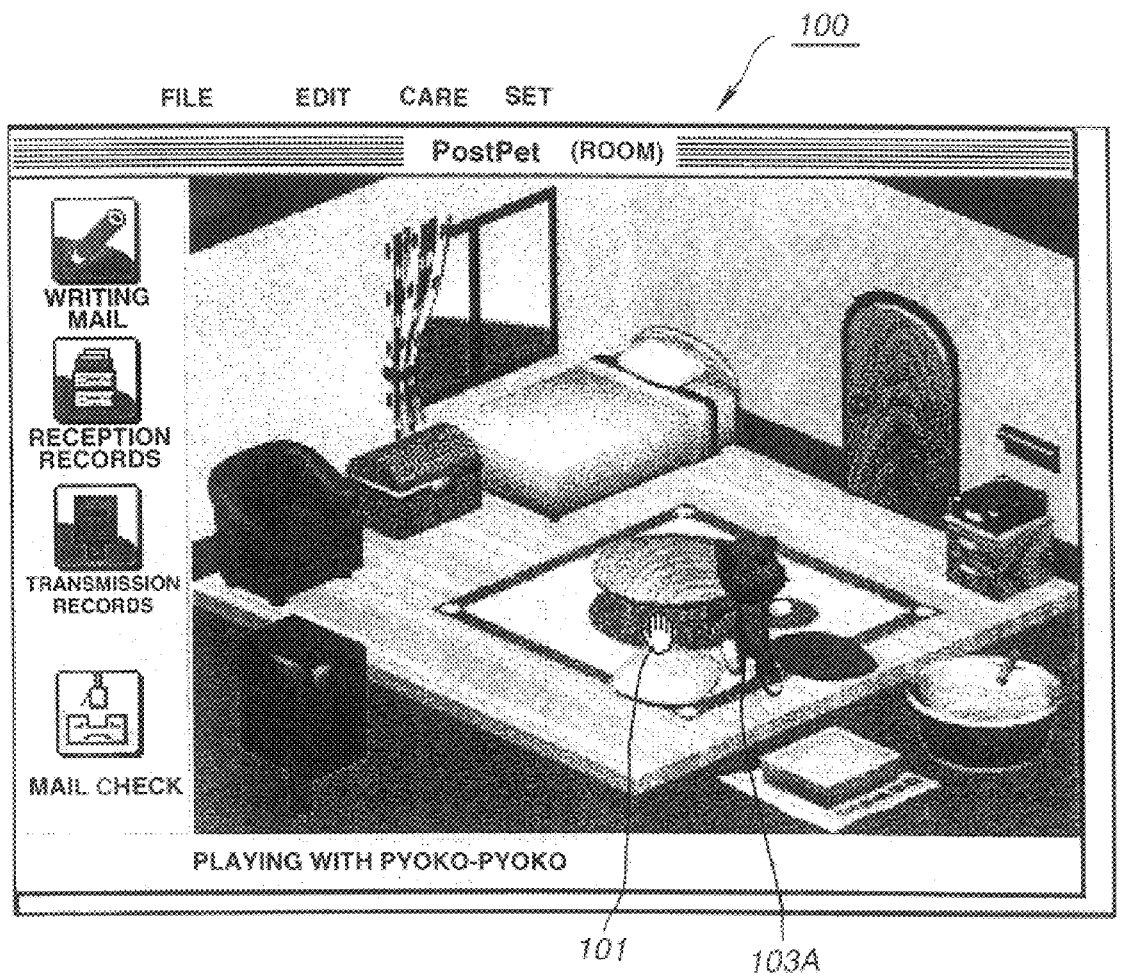
FIG. 44 similarly shows the state of caressing the post pet on the GUI picture of the 'PostPet (Room)'.

The CPU 21a judges at step SP63 whether or not the pointing cursor 101 has traversed the display area of the post pet image by the reciprocating movement of the mouse 21D in the left and right direction. If the result of judgment is YES, that is, if the pointing cursor 101 has traversed the display area of the post pet image, the CPU 21a deems that the post pet has been caressed and executes at step SP64 an update processing routine for the agencies A1 to A 18 of various desires as later explained. Thus, on the GUI picture 100 of 'PostPet (Room)', the pointing cursor 101, represented by the open hand shape, is reciprocated in the left-and-right direction on the post pet 103 for caressing the post pet 103, as shown in FIGS. 42 to 44.

Figure 45:
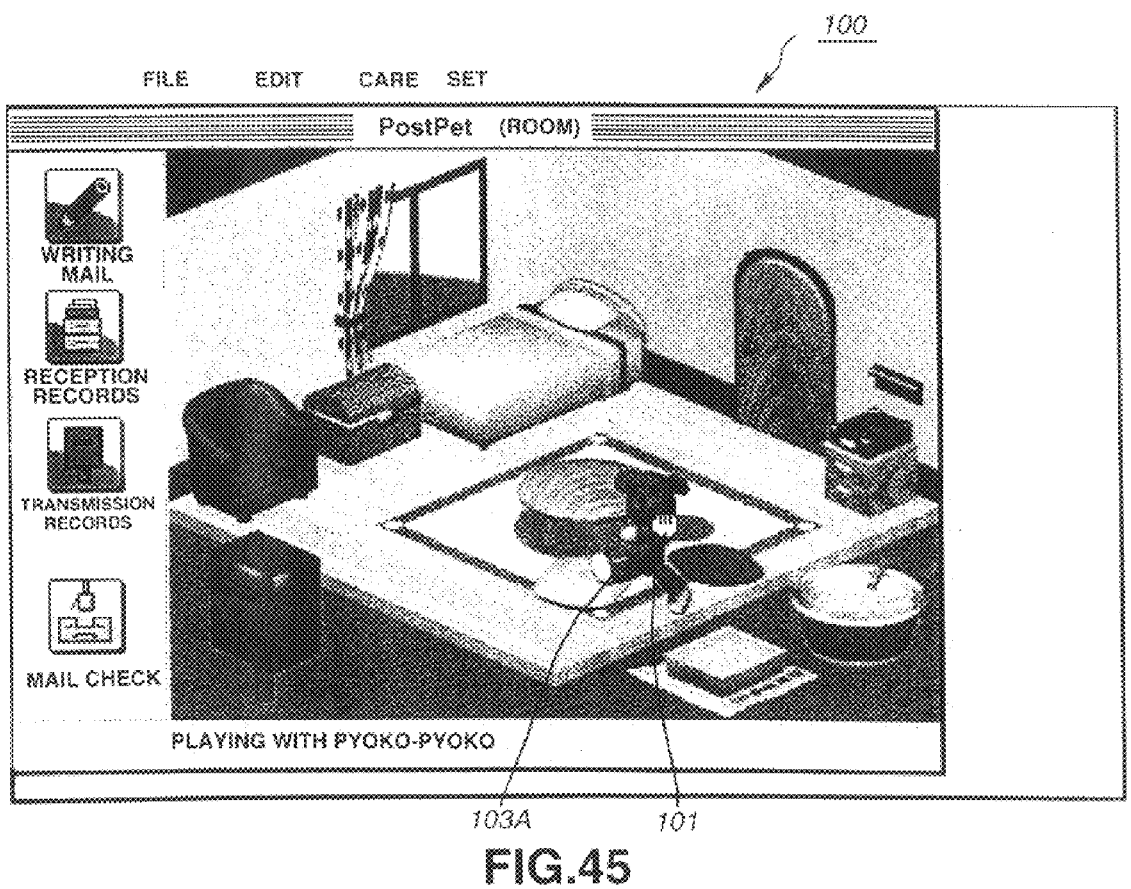
FIG. 45 similarly shows the state of hitting the post pet on the GUI picture of the 'PostPet (Room)'.

The CPU 21a judges at step SP65 whether the pointing cursor 101 has been moved into the display area of the post pet image and the mouse button of the mouse 21D has been clicked. If the result of judgment is affirmative, that is, if the mouse 21D has been clicked when the pointing cursor 101 is in the post pet image display area, the CPU 21a alters at step SP66 the pointing cursor 101 to the shape of a clenched fist to execute updating processing routines of the agencies A1 to A18 of various desires at step SP67 on the assumption that the post pet has been struck. Thus, on the GUI picture 100 of the 'PostPet (Room)', the post pet 103 can be struck on the pointing cursor 101 displayed in the shape of a clenched fist, as shown in FIG. 45.

When executing the mail sending by the postman 104, the CPU 21a sequentially alters bit map data of the postman 104 on the video RAM 21j to cause the display controller 21g to display on the display device 21B an animation in which the postman 104 moves on the GUI picture 100 of the 'PostPet (Room)' shown in FIG. 4 to recover the mail posted into the mail post 106 to deliver the recovered mail.

Figure 14:
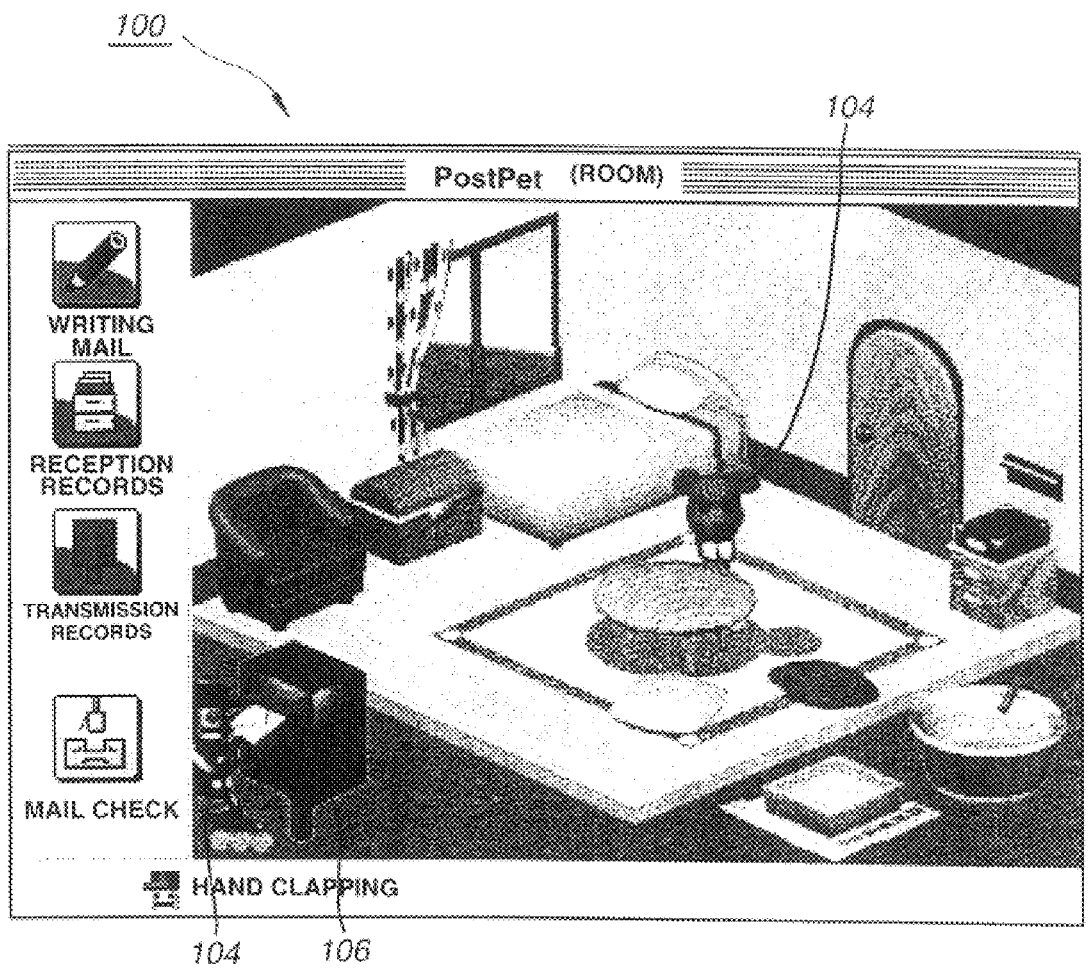
FIG. 14 shows the state of the GUI picture 'PostPet (Room)' in the case mail sending is commanded by a postman.
Figure 15:
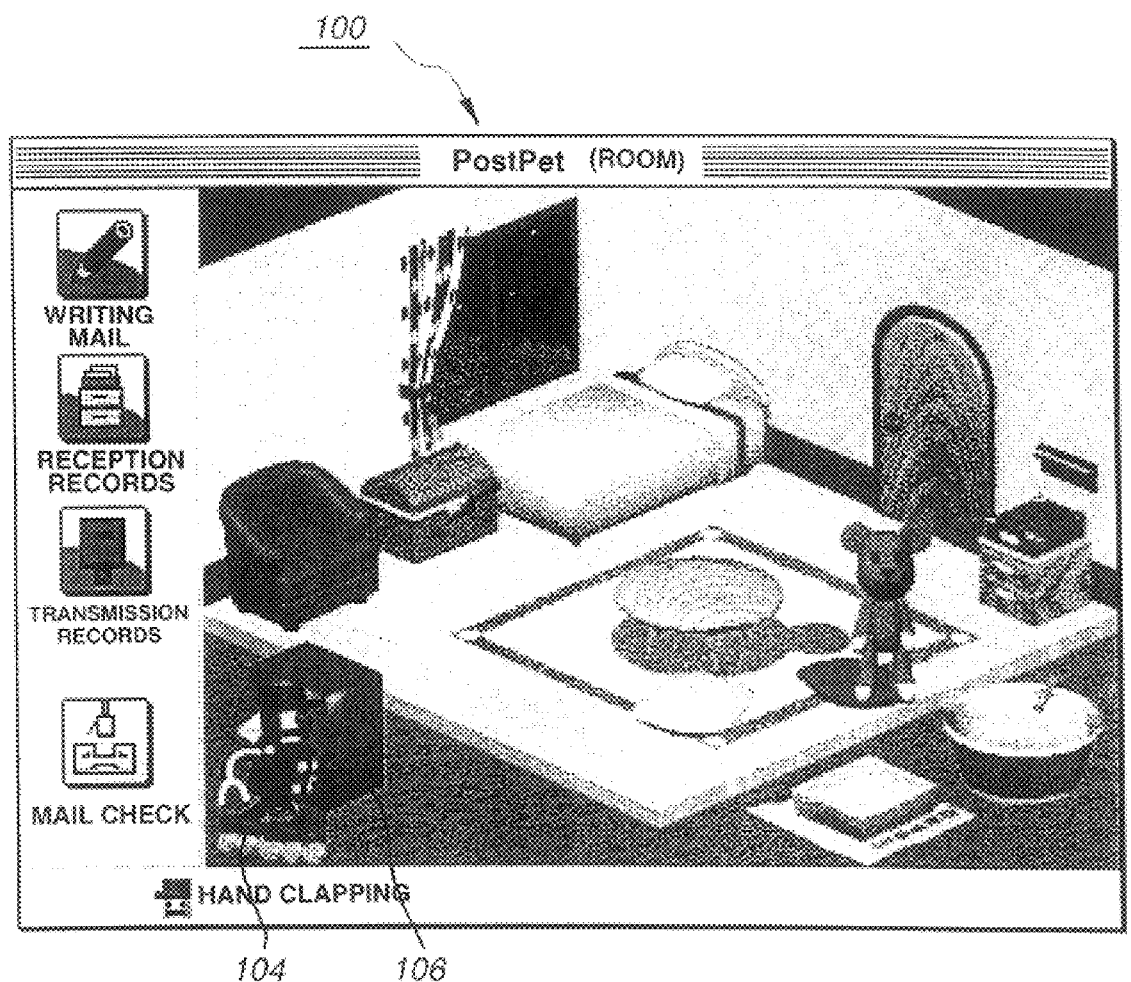
FIG. 15 similarly shows the state of the GUI picture 'PostPet (Room)' in the case mail sending is commanded by the postman.
Figure 16:
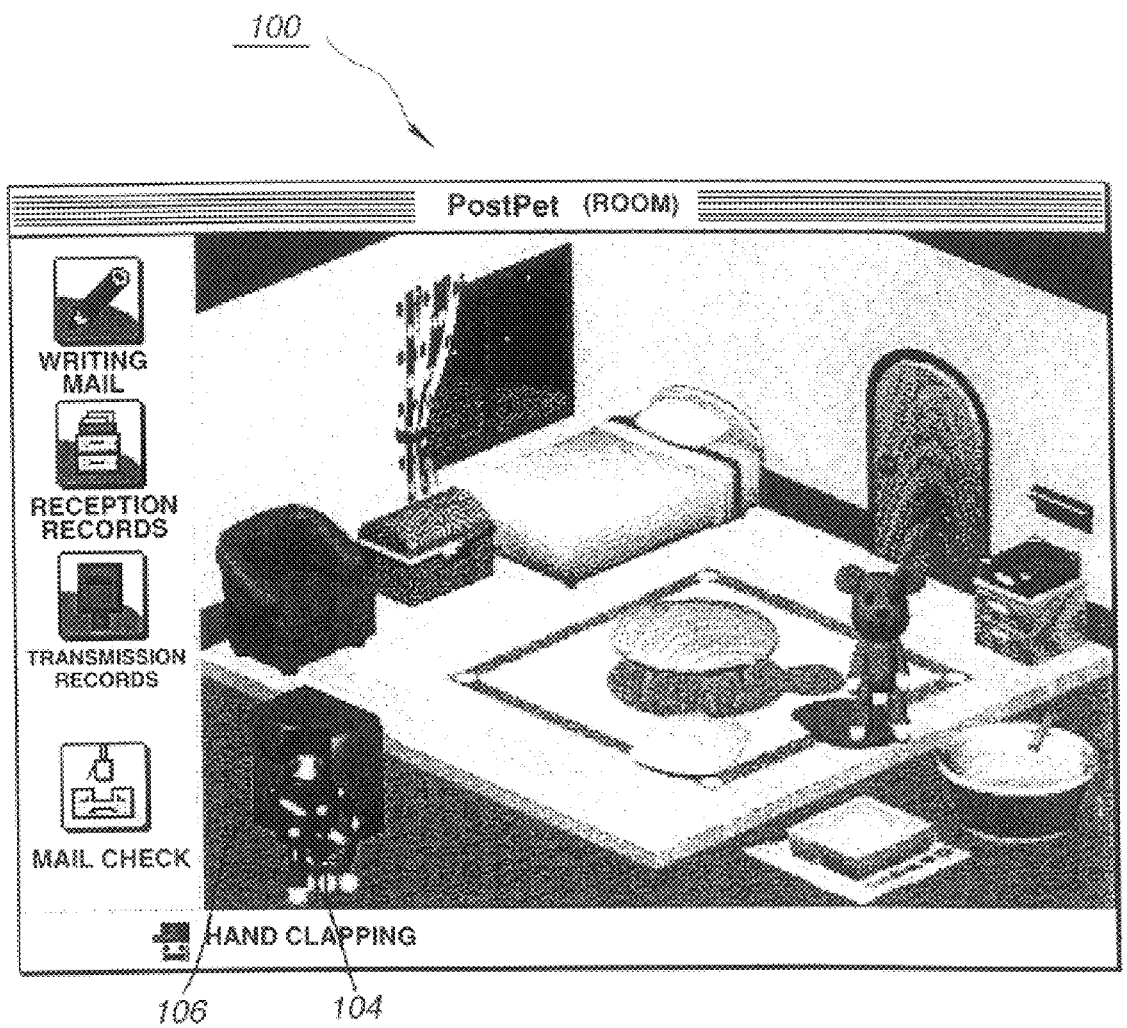
FIG. 16 similarly shows the state of the GUI picture 'PostPet (Room)' in the case mail sending is commanded by the postman.
Figure 17:
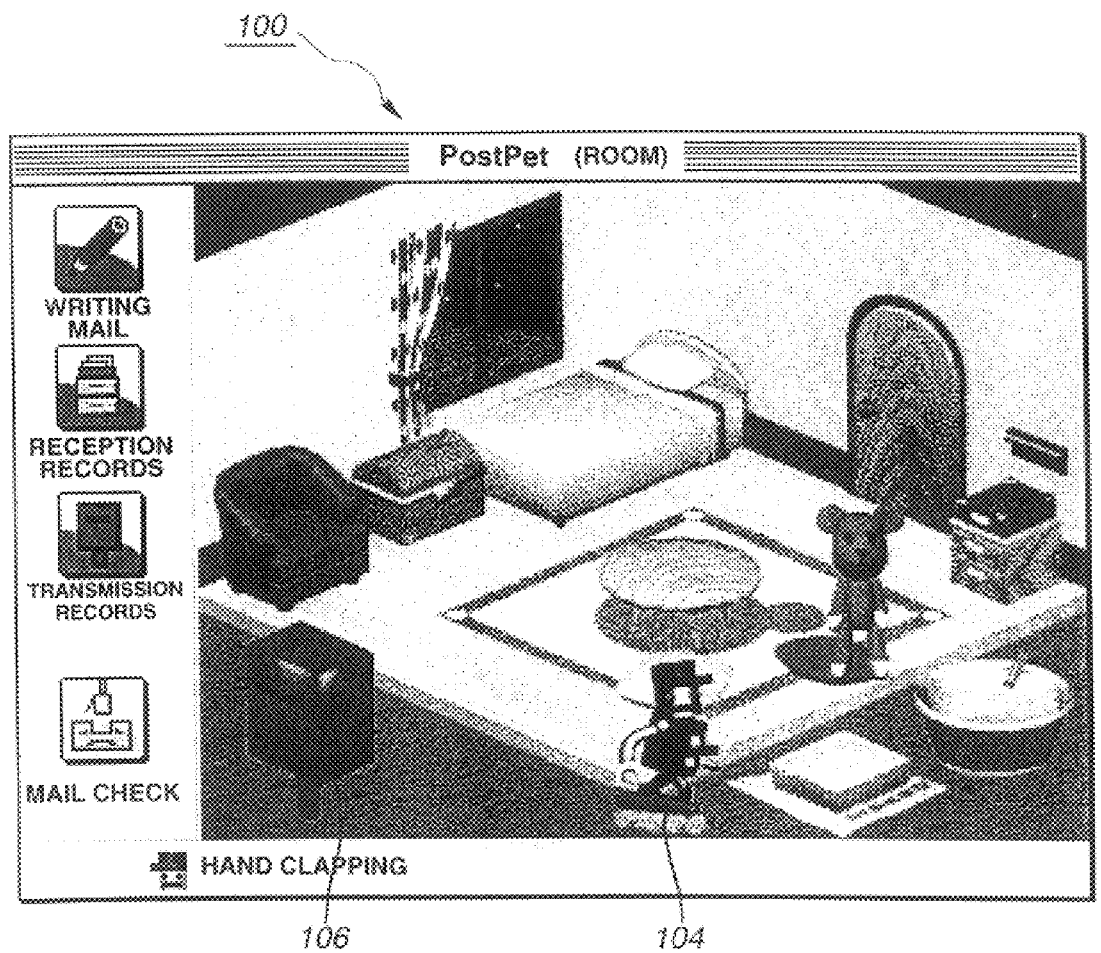
FIG. 17 similarly shows the state of the GUI picture 'PostPet (Room)' in the case mail sending is commanded by the postman.
Figure 18:
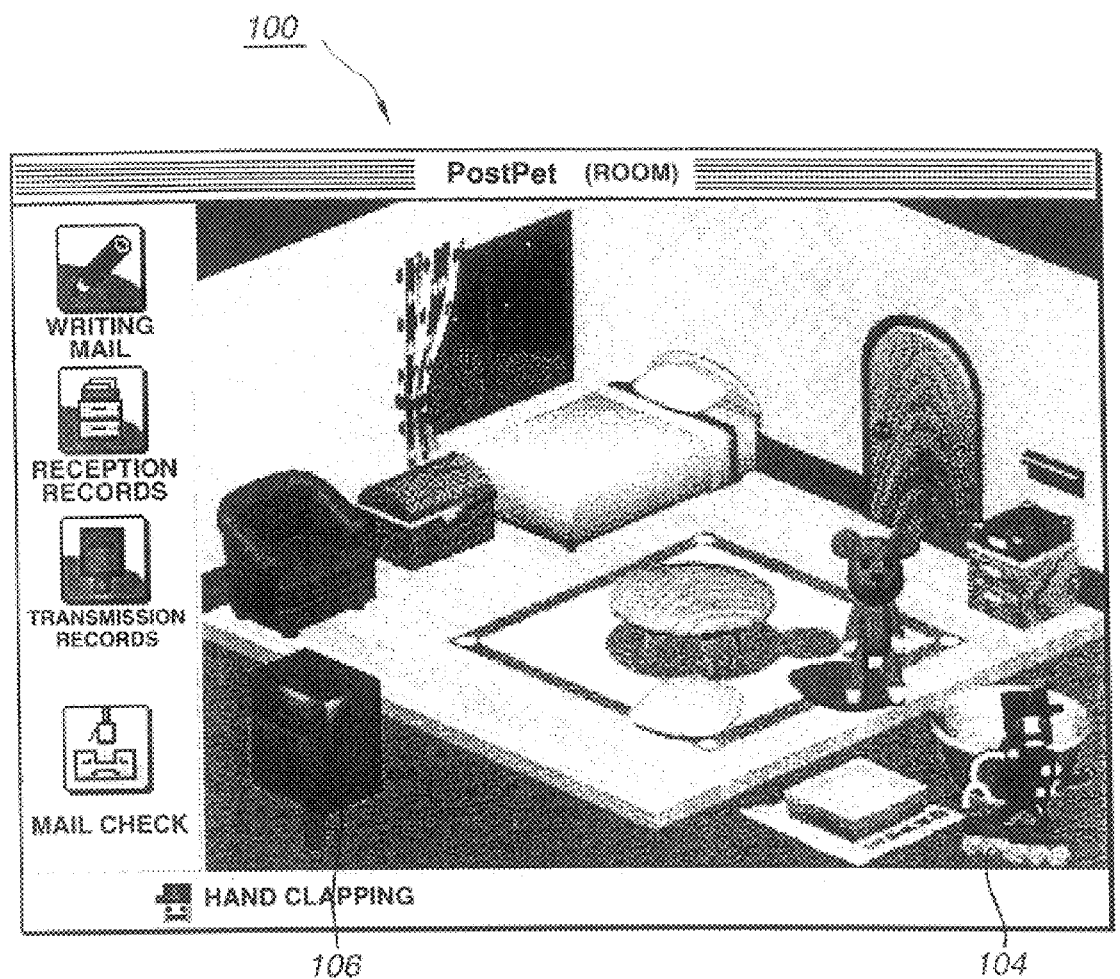
FIG. 18 similarly shows the state of the GUI picture 'PostPet (Room)' in the case mail sending is commanded by the postman.

Specifically, if the icon 110B of handing over to the postman 104 for commanding mail dispatch by the postman on the GUI picture 110 of 'Writing a Mail' is clicked as shown in FIG. 13, animation display is made such that the postman 104 makes debut from the left side on the GUI picture 100 of the 'PostPet (Room)' as shown in FIG. 14 and moves to the site of the mail post 108 as shown in FIG. 15, the postman 104 then recovering the mail posted in the mail post 106 as shown in FIG. 16 and proceeding with the delivery of the mail posted in the mail post 106, as shown in FIGS. 17 and 18.

Also, when executing the mail sending by the post pet 103, the CPU 21a sequentially alters bit map data of the post pet 103 on the video RAM 21j to cause the display controller 21g to display on the display device 21B an animation in which the post pet 103 carrying the mail moves on the GUI picture 100 of the 'PostPet (Room)' as shown in FIG. 4 as far as the door 107 on foot to open the door to go out.

Figure 20:
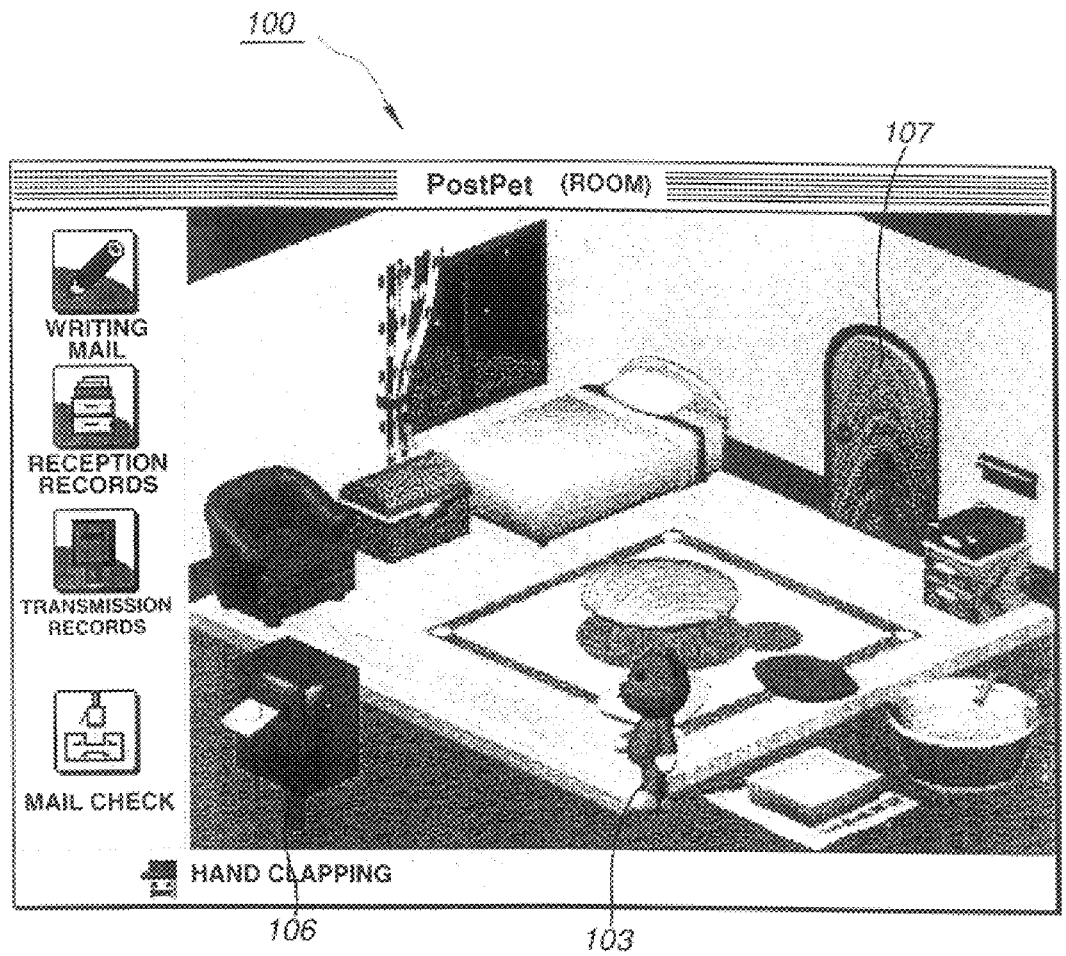
FIG. 20 shows the state of a GUI picture of 'PostPet (Room)' when mail sending is commanded by a post pet.
Figure 21:
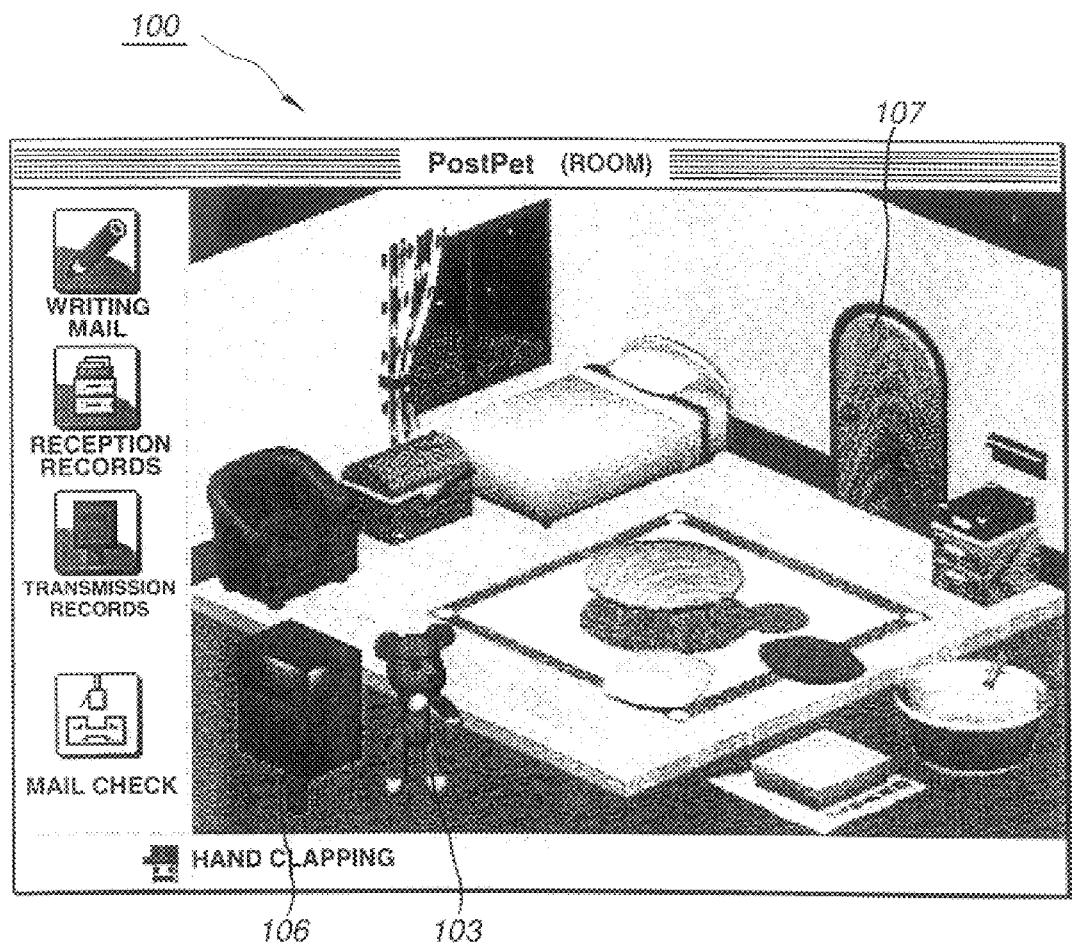
FIG. 21 similarly shows the state of a GUI picture of 'PostPet (Room)' when mail sending is commanded by the post pet.
Figure 22:
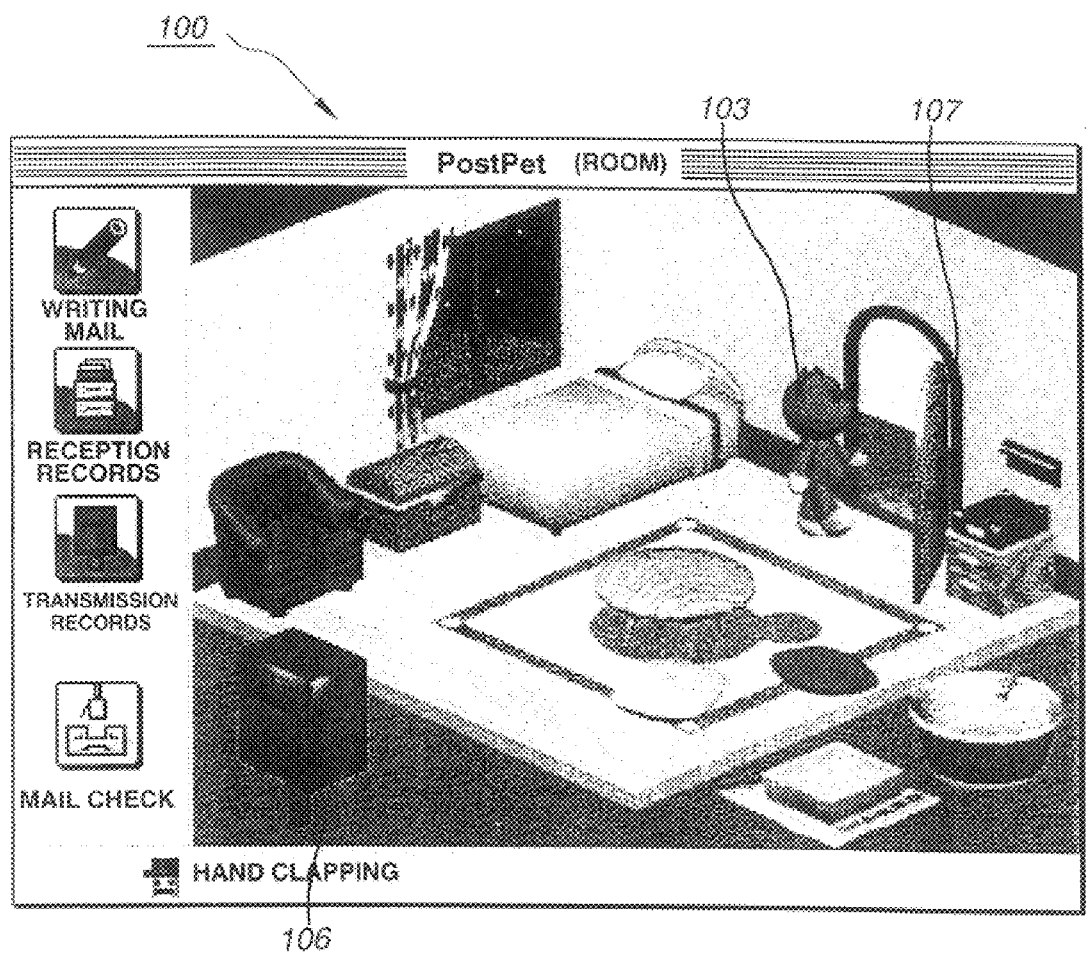
FIG. 22 similarly shows the state of a GUI picture of 'PostPet (Room)' when mail sending is commanded by the post pet.
Figure 23:
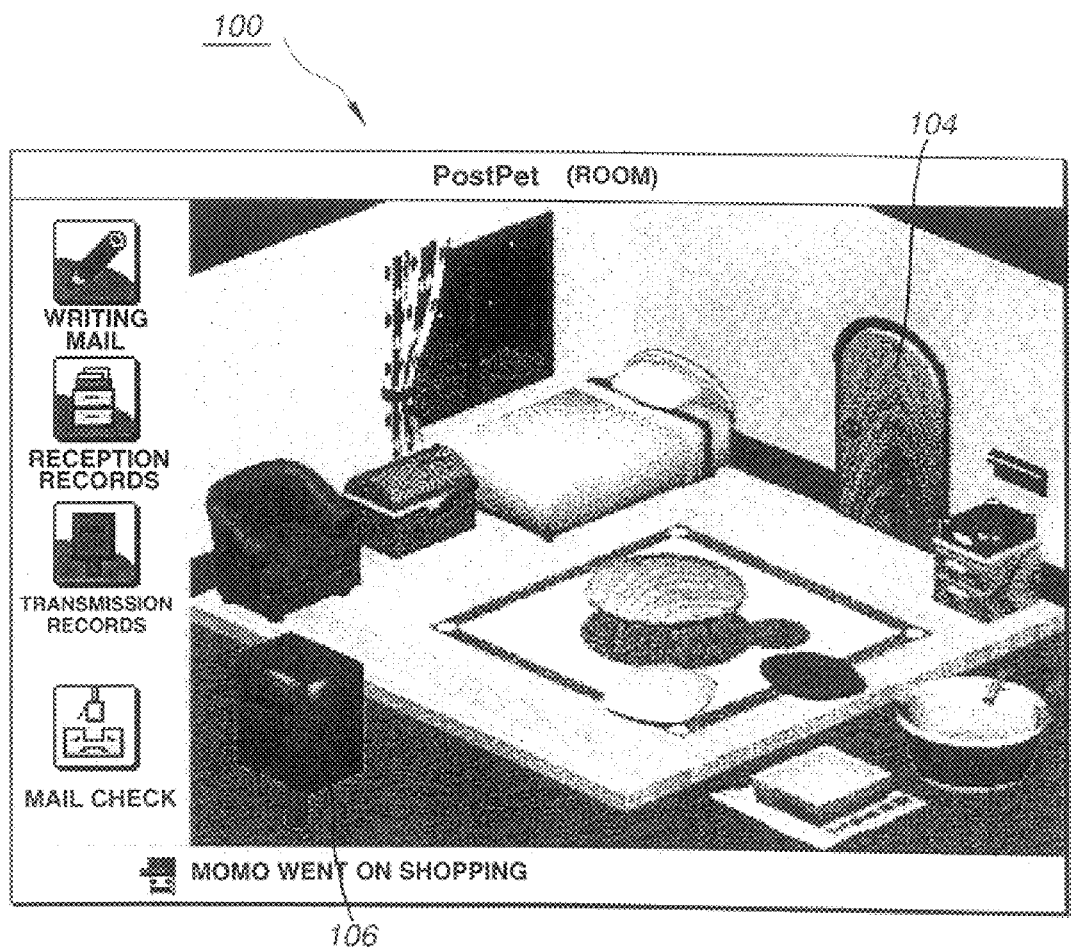
FIG. 23 similarly shows the state of a GUI picture of 'PostPet (Room)' when mail sending is commanded by the post pet.

Specifically, if the icon 115A of handing over to the pet for commanding mail dispatch by the post pet 103 on the GUI picture of 'Writing a Mail' as shown in FIG. 19, is clicked, animation display is made such that the post pet 103 moves on the GUI picture 100 of the 'PostPet (Room)' as far as the mail post 106 as shown in FIG. 20, the post pet 103 recovers the mail posted in the mail post 106 as shown in FIG. 21 and the post pet 103 carrying the mail then moves as far as the door 107 to open the door to go out as shown in FIGS. 22 and 23. At this time, a message which reads: "Momo (name of the pet) went out for mail dispatching" specifying mail dispatching by the post pet 103 is displayed on the lower side of the GUI picture 100 of the 'PostPet (Room)'.

It should be noted that mail sending by the post pet 103 sends a sole E-mail by a single post pet 103, that is by a single agent, while mail sending cannot be executed if the post pet 103 is absent on the GUI picture 100 of the 'PostPet (Room)', that is if the post pet 103 is outing.

Conversely, mail sending by the postman 104 sends one or more E-mails by a single postman 104, that is, by a single agent, and can be executed at any time. That is, if the post pet 103 is absent on the GUI picture 100 of the 'PostPet (Room)', that is, if the post pet 103 has gone out, mail sending can be done by the postman 104.

Figure 24:
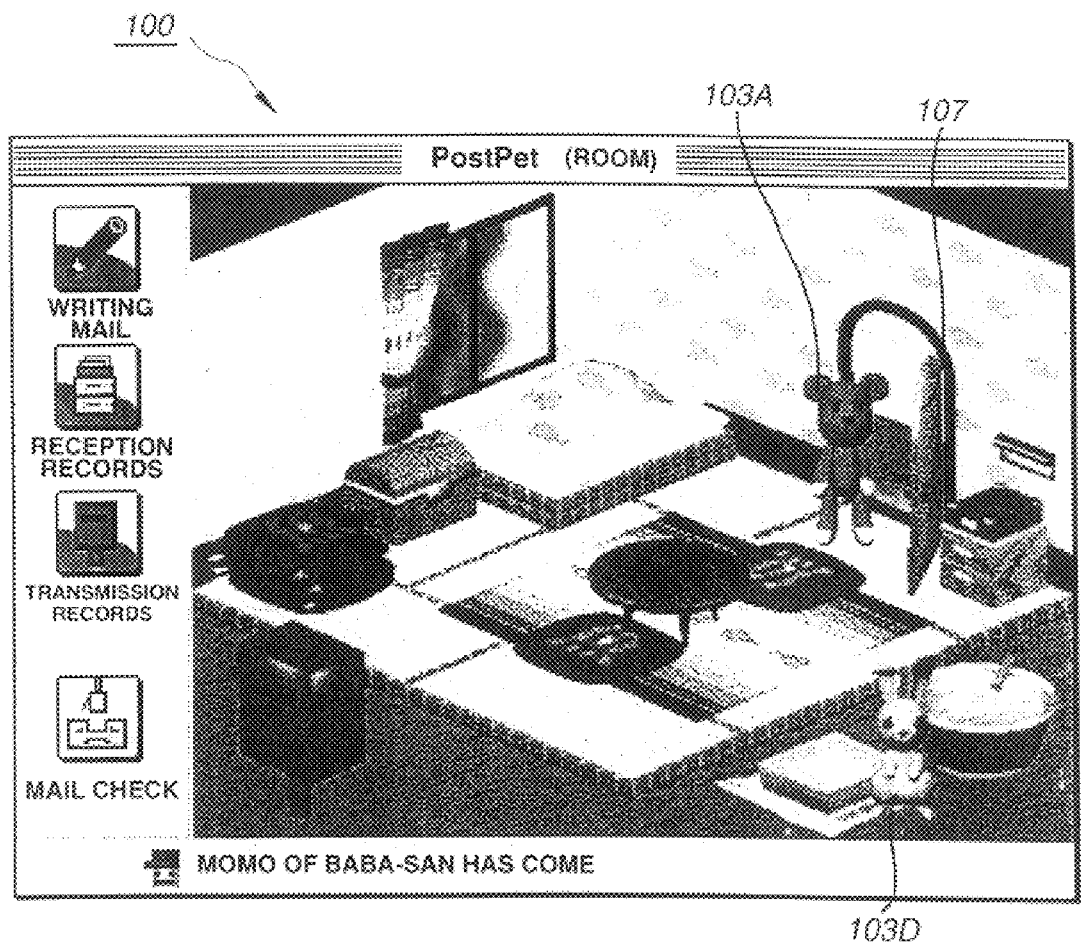
FIG. 24 shows the state of a GUI picture of 'PostPet (Room)' when an E-mail is received by the post pet.

The above-described behavior of the post pet is determined by the agent parameters attached to the mail, such that, if, on mail reception by the post pet, there are agent parameters, the CPU 21a causes the display controller 21g to display on the screen of the display controller 21g an animation for indicating that the post pet 103D, for example, on the GUI picture 100 of the 'PostPet (Room)' opens the door 107 to go into the room to put the mail on the table 108 to then walk around in the room by way of performing post pet behavior as defined by the above-mentioned agent parameters, as shown in FIG. 24.

Figure 25:
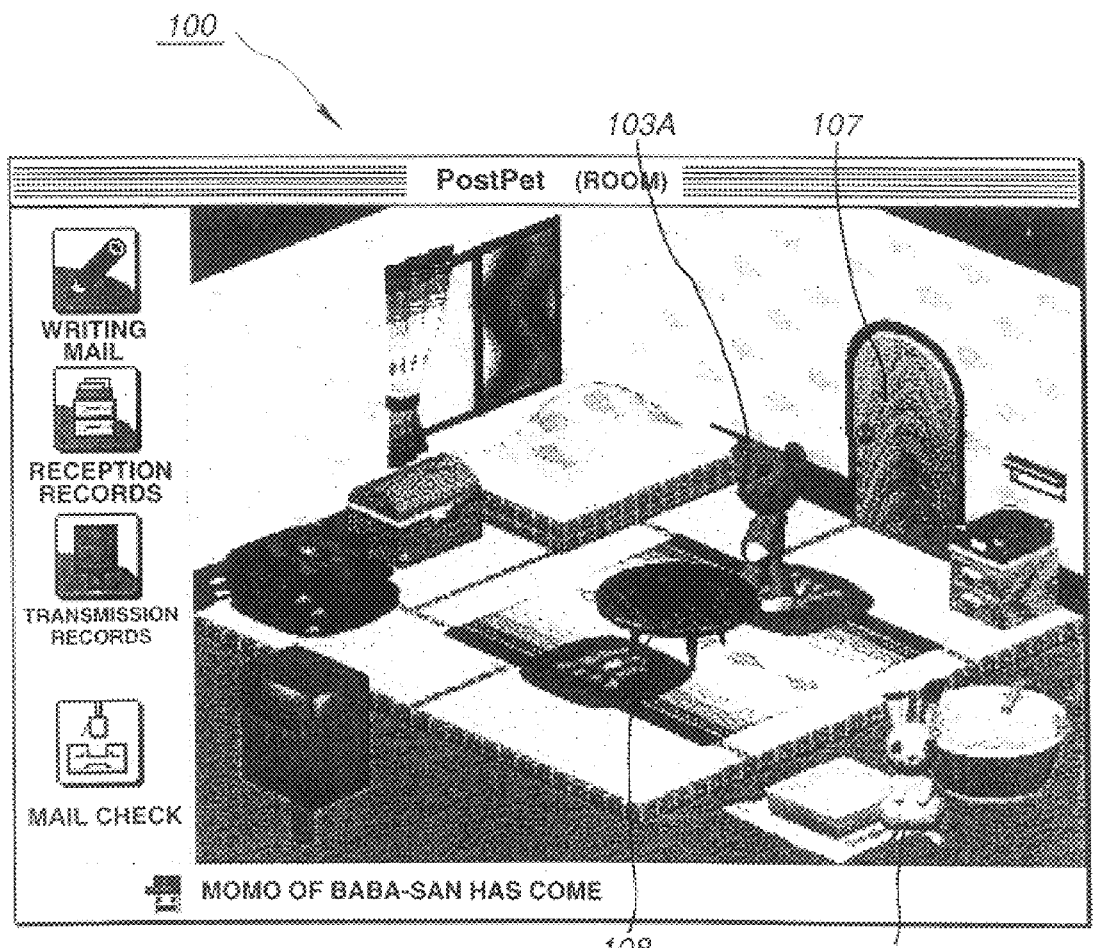
FIG. 25 similarly shows the state of a GUI picture of 'PostPet (Room)' when an E-mail is received by the post pet.
Figure 26:
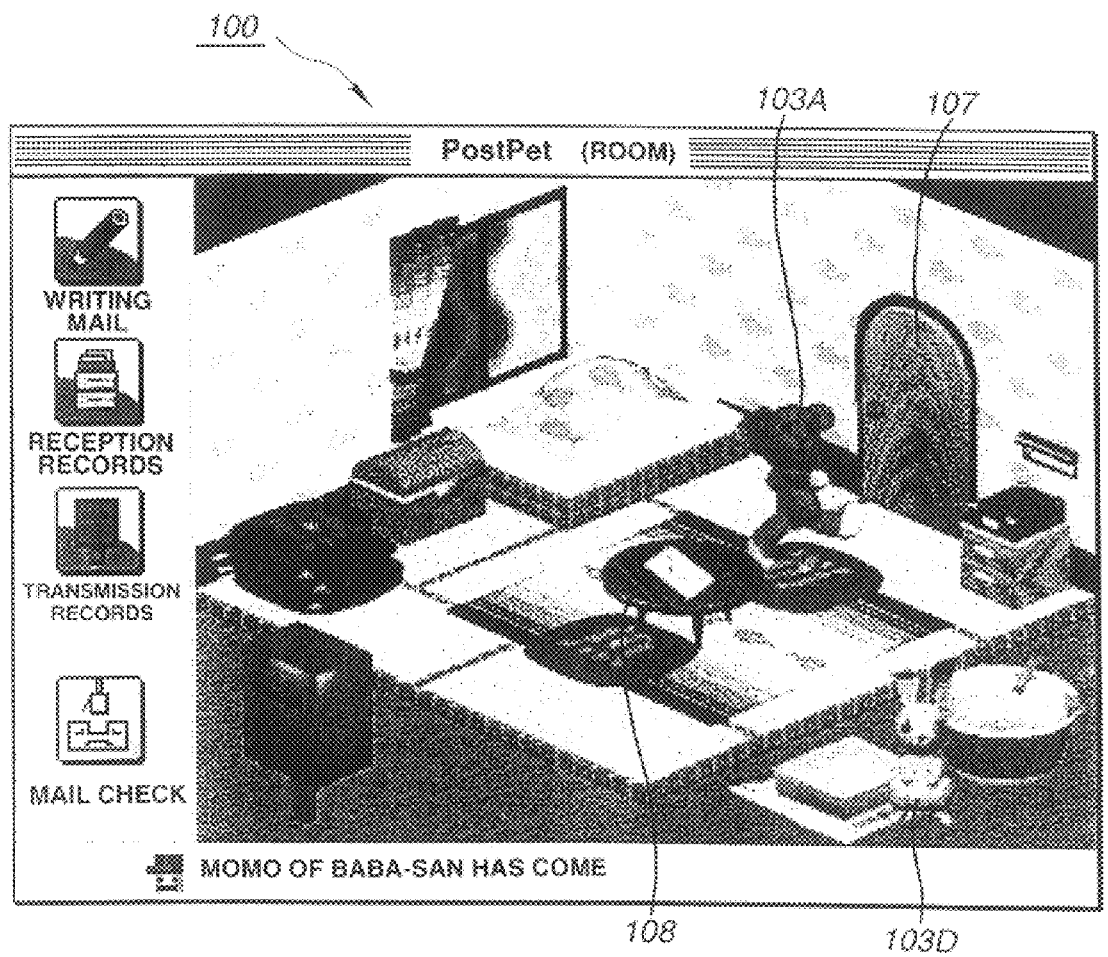
FIG. 26 similarly shows the state of a GUI picture of 'PostPet (Room)' when an E-mail is received by the post pet.
Figure 27:
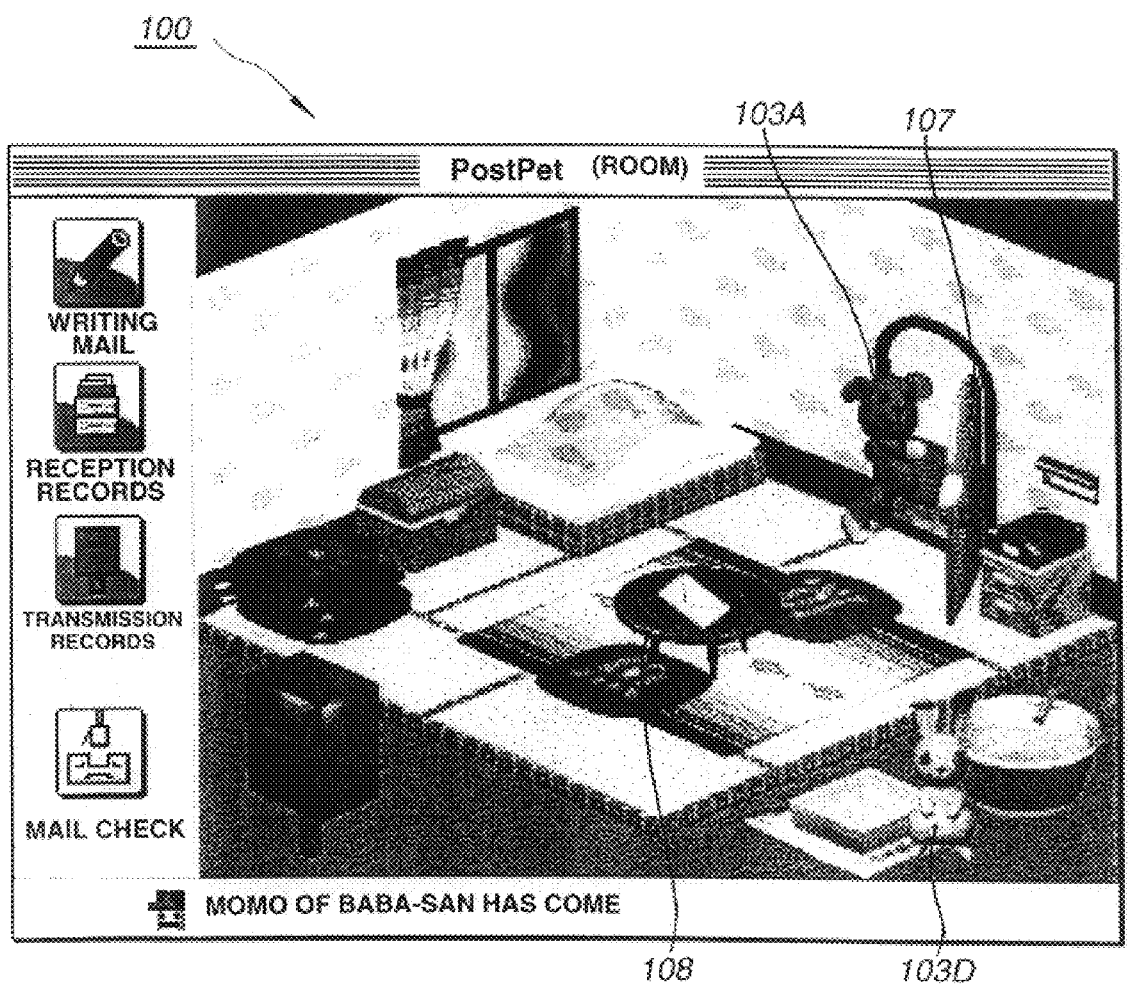
FIG. 27 similarly shows the state of a GUI picture of 'PostPet (Room)' when an E-mail is received by the post pet.

Specifically, if, on mail reception by the post pet, there are agent parameters, animation display is made in which the door 107 is first opened on the GUI picture 100 of the 'PostPet (Room)' as shown in FIG. 24, the post pet 103A then enters the room as shown in FIG. 25 to put the mail on the table 108 as shown in FIG. 26, the post pet 103A then walking around in the room to go out to close the door 107 as show in FIG. 27. At this time, a message reading: "Momo of Mr. Baba has come" is displayed on the lower side of the GUI picture 100 of the 'PostPet (Room)'.

If the user operates the mouse 21D to click the post pet 103B on the GUI picture 100 of the 'PostPet (Room)' by the pointing cursor 101 or acts on the keyboard 21C, the CPU 21a executes changes pre-defined in association with the contents of the operation to process the agent parameters determining the behavior of the post pet 103B. Specifically, the CPU processes the agent parameters responsive to the operating of caressing or hitting the post pet 103B by the operation of the mouse 21D.

The CPU 21 a automatically returns the processed agent parameters to the sending side.

Figure 28:
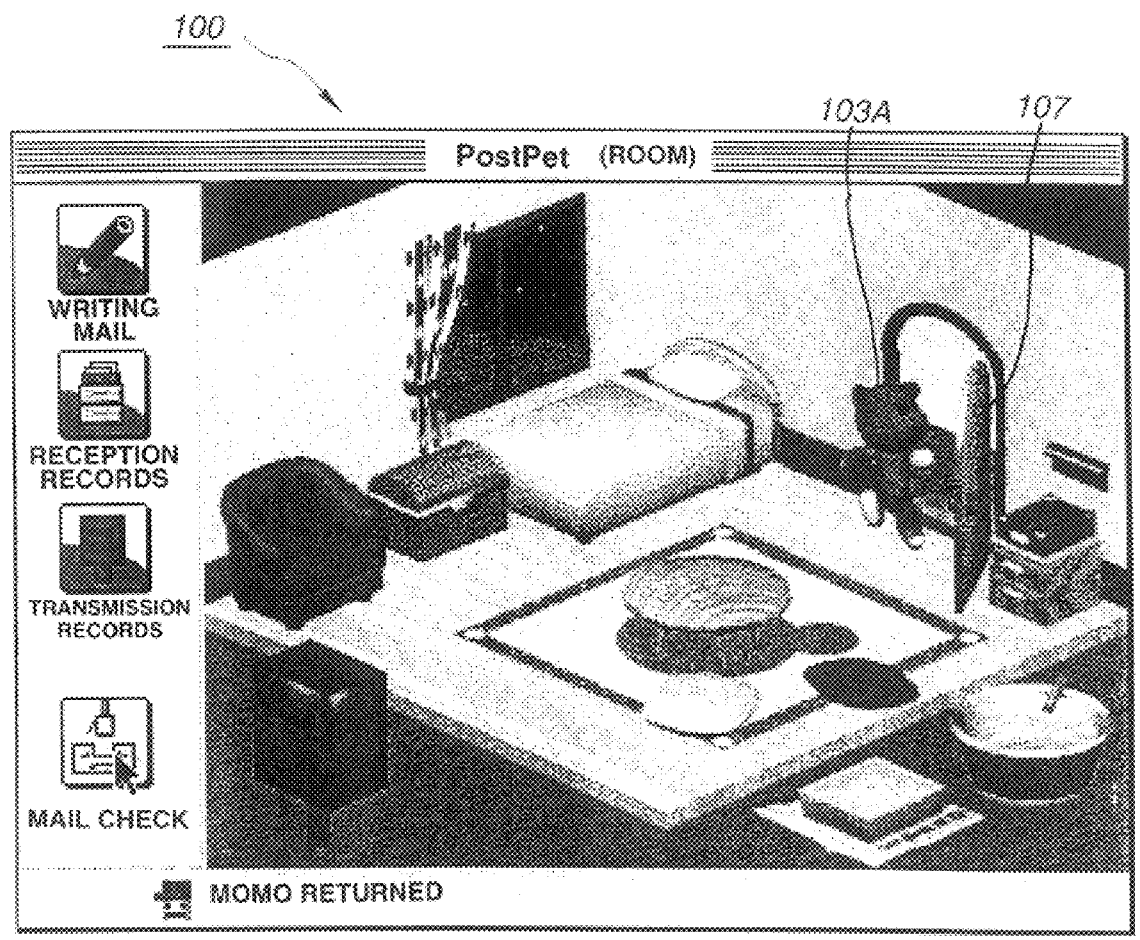
FIG. 28 shows the state of a GUI picture of 'PostPet (Room)' when the mail has been sent by the post pet and the post pet has returned.
Figure 29:
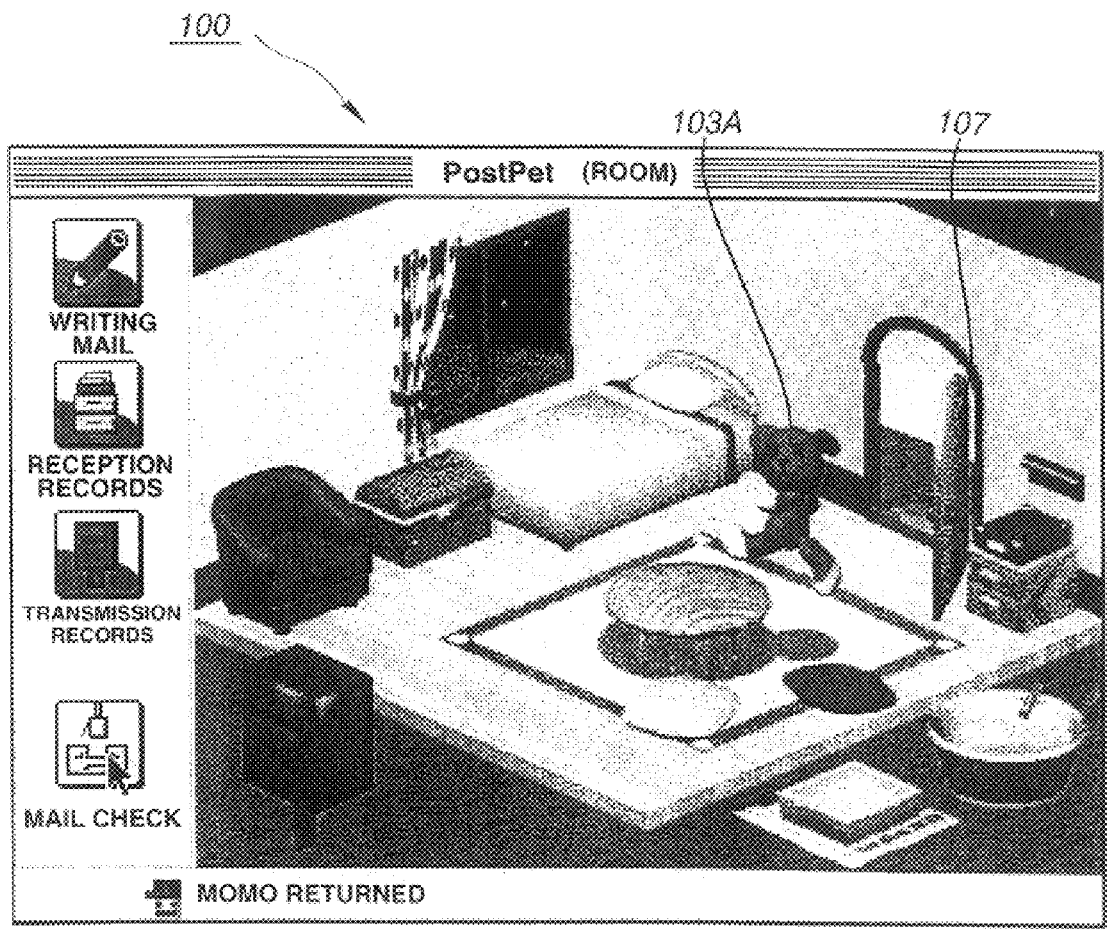
FIG. 29 similarly shows the state of a GUI picture of 'PostPet (Room)' when the mail has been sent by the post pet and the post pet has returned.
Figure 30:
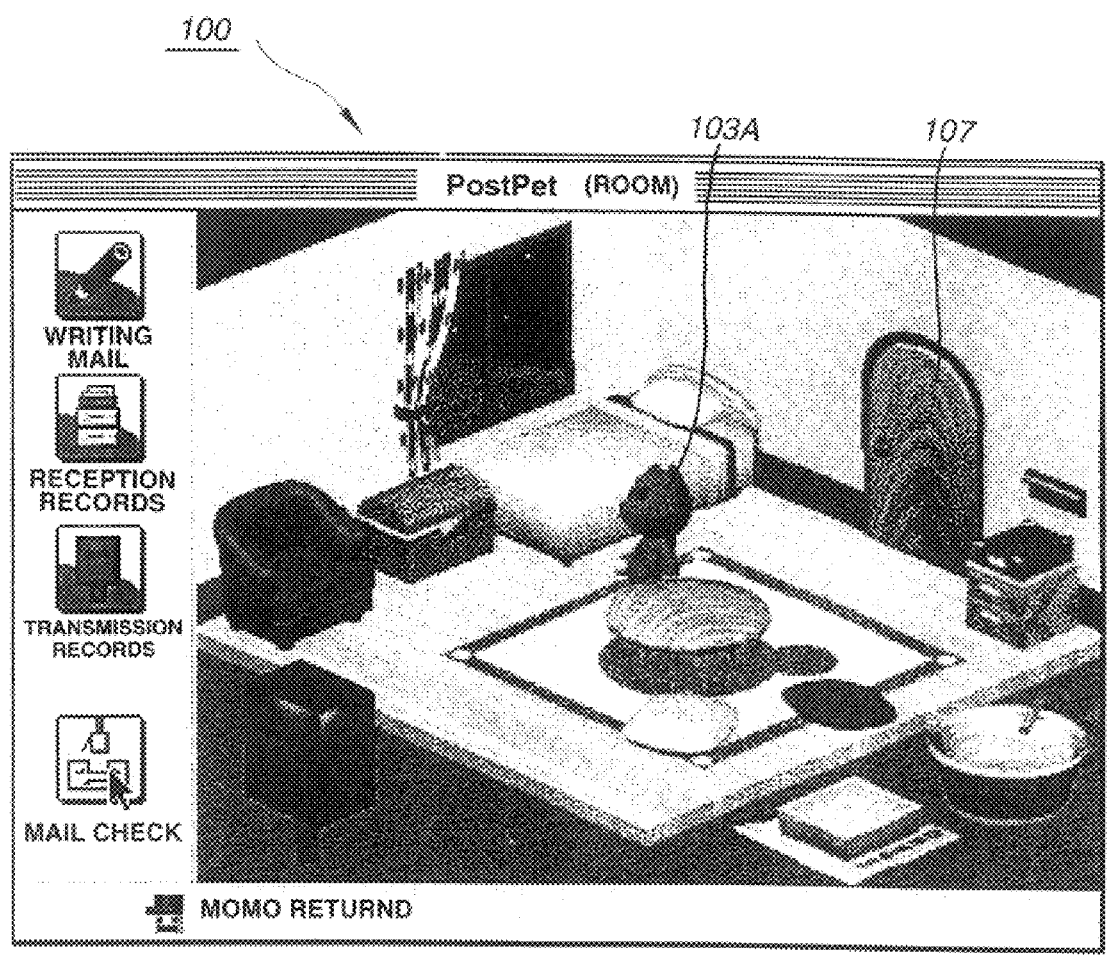
FIG. 30 similarly shows the state of a GUI picture of 'PostPet (Room)' when the mail has been sent by the post pet and the post pet has returned.

Upon reception of the automatically returned agent parameters, the CPU 21a causes the display controller 21g to display on the screen of the display device 21B an animation in which the door 107 is first opened on the GUI picture 100 of the 'PostPet (Room)' as shown in FIG. 28, the post pet 103 entering the room as shown in FIG. 29 and closing the door 107 as shown in FIG. 30. At this time, a message reading: "Momo (pet's name) has come back" is displayed on the lower side of the GUI picture 100 of the 'PostPet (Room)'.

Figure 31:
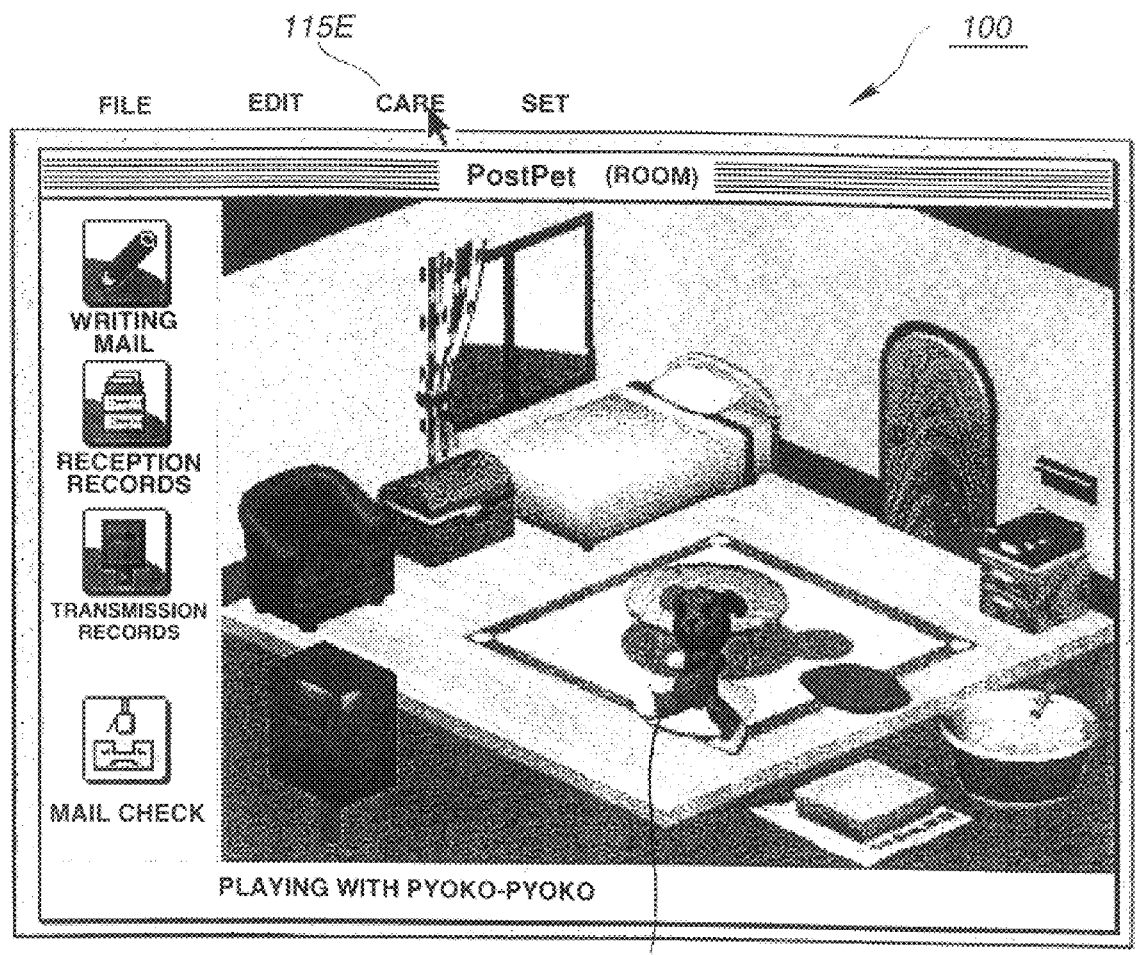
FIG. 31 shows the state of clicking an icon commanding looking after a post pet on the GUI picture of the 'PostPet (Room)'.
Figure 33:
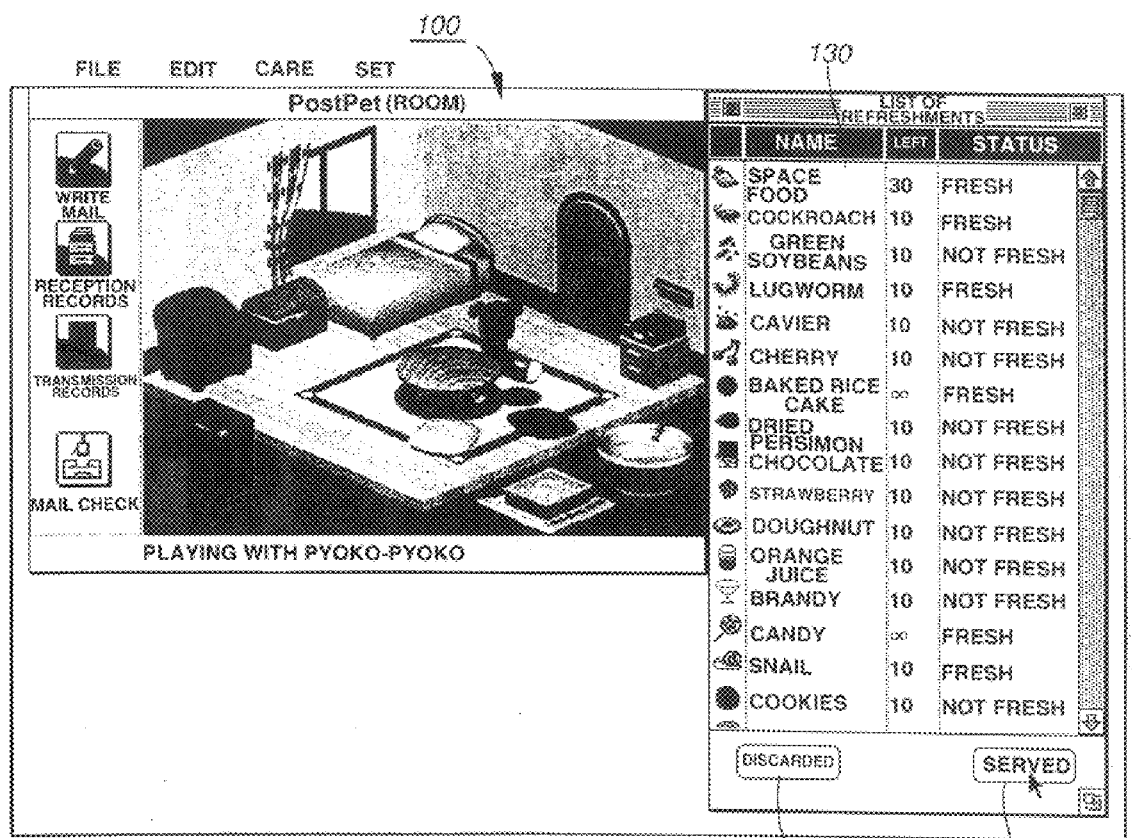
FIG. 33 shows the state in which an item 'refreshment' of the pulldown menu on the GUI picture of the 'PostPet (Room)' is selected for opening the window.
Figure 34:
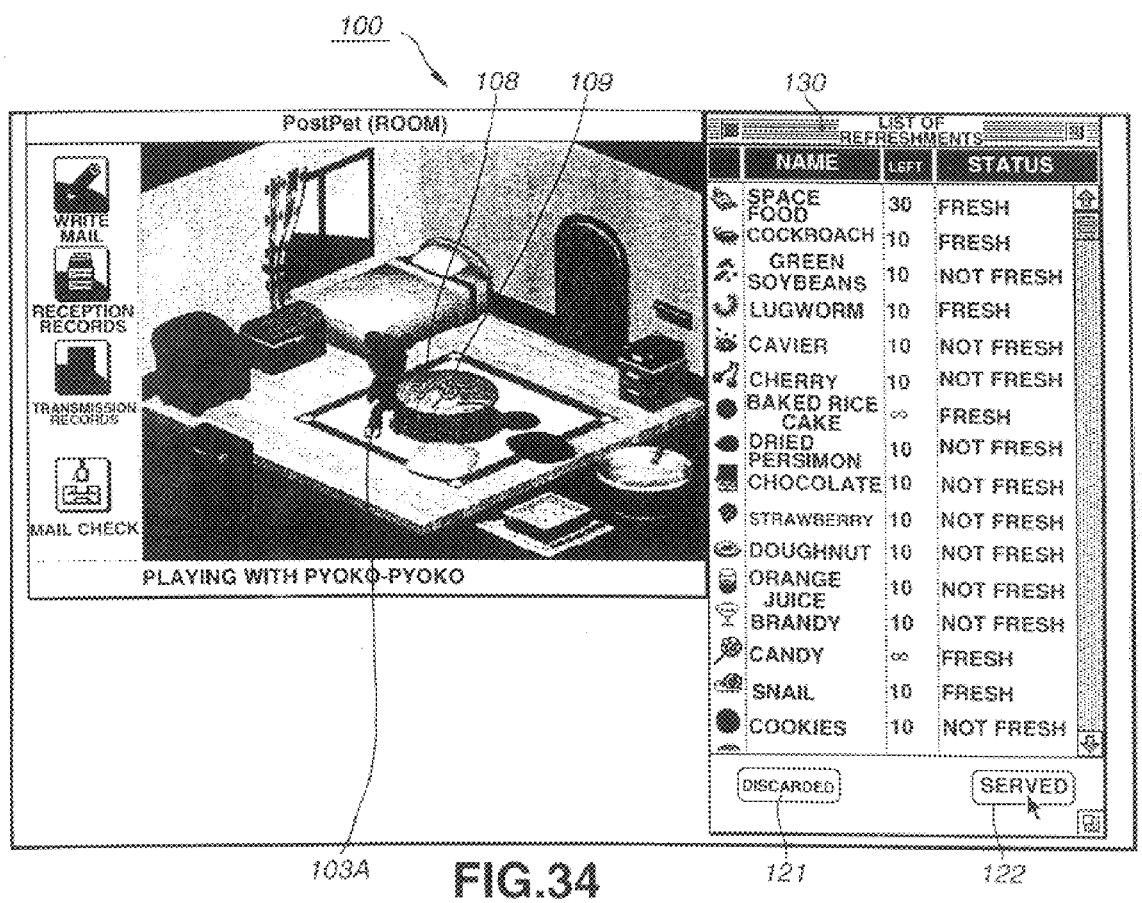
FIG. 34 shows the state of clicking a button 'served' on a window opened on selecting 'refreshment' on the pull-down menu on the GUI picture of the 'PostPet (Room)'.

If the icon 115E for looking after the post pet 103 staying in the room is clicked on the GUI picture 100 of the 'PostPet (Room)' as shown in FIG. 31, there is opened a pulldown menu 125 specifying items such as 'state of pet', 'wash' or 'refreshments', showing the contents of care as shown in FIG. 32. If the item 'refreshments' is selected, there is opened a window 130 showing a list of names of refreshments, remaining quantity and quality of the refreshments, as shown in FIG. 33. In this window 130 showing the list of names of refreshments, there are a 'discard' button commanding discarding of the selected refreshments, and a 'serve' button commanding giving the selected refreshments to the post pet 103. If any of the listed refreshments is selected and the 'serve' button 122 clicked, the selected refreshment, for example, a candy 109, is put on a table 108, as shown in FIG. 34. Thus, the candy 109 is given the post pet 103 staying in the room. Although there are provided a number of different types of refreshments as default, an up-to-date list of refreshments may be procured, such as by downloading from the WWW server (such as http://www.so-net.or.jp/postpet/index.html) on the Internet, and pasted to the 'refreshments' folder present in the same directory as the PostPet. exe which is the execution file or the E-mail sending program by way of adding the new 'refreshments' file.

Figure 35:
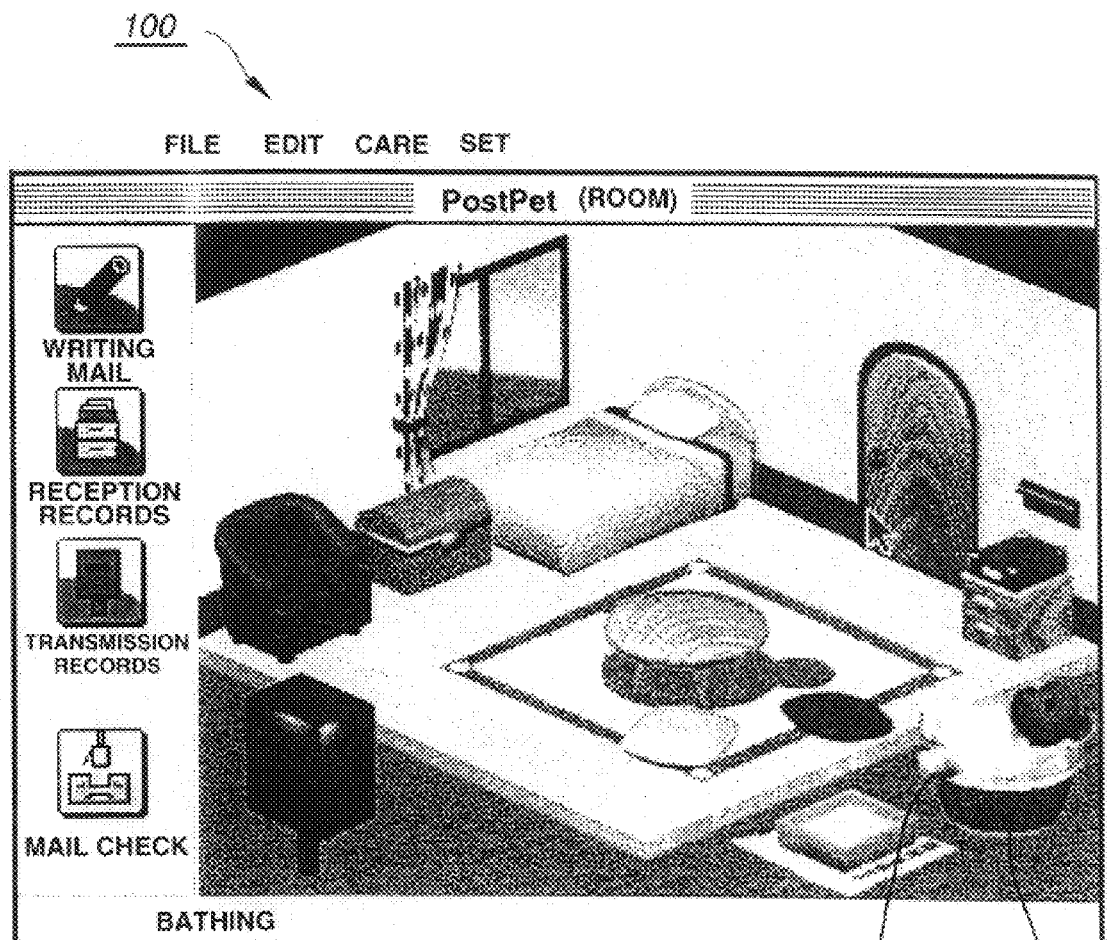
FIG. 35 shows the state in which an item 'Wash' of the pulldown menu on the GUI picture of the 'PostPet (Room)' has been selected.

If the item 'wash' displayed on the pulldown menu shown in FIG. 32 is selected, the post pet 103 takes a bath using a pail 123 on the GUI picture 100 of the 'PostPet (Room)', as shown in FIG. 35. At this time, a message reading: "Taking a Bath" is displayed on the lower side of the GUI picture 100 of the 'PostPet (Room)'.

Figure 36:
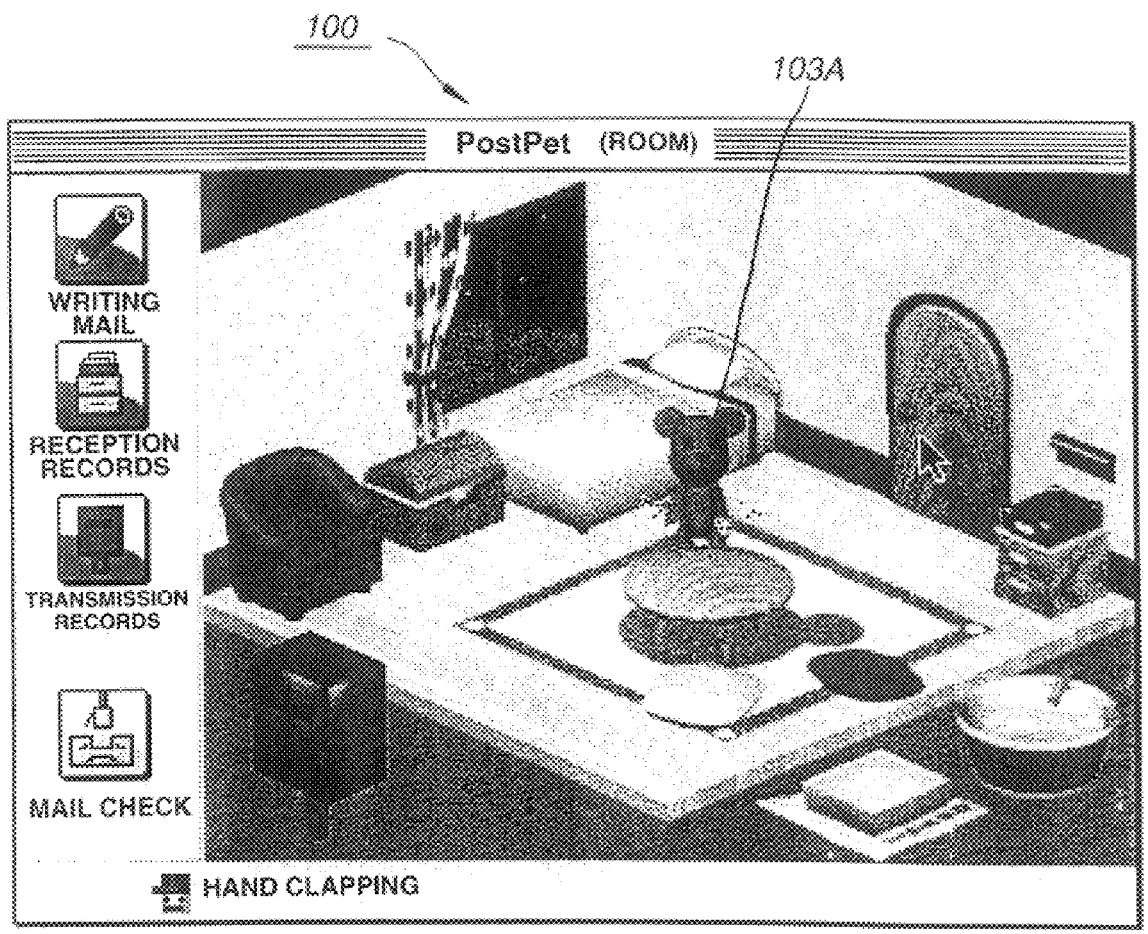
FIG. 36 shows the state in which the post pet on the pulldown menu on the GUI picture of the 'PostPet (Room)' is contaminated.

The post pet 103 has become dirty due to going out for mail dispatch or taking refreshments. The dirtied state is shown by dots on the post pet 103 as shown in FIG. 36. These dots are removed on selecting the item 'wash' displayed on the care pulldown menu 125 to get the pet take a bath.

Figure 37:
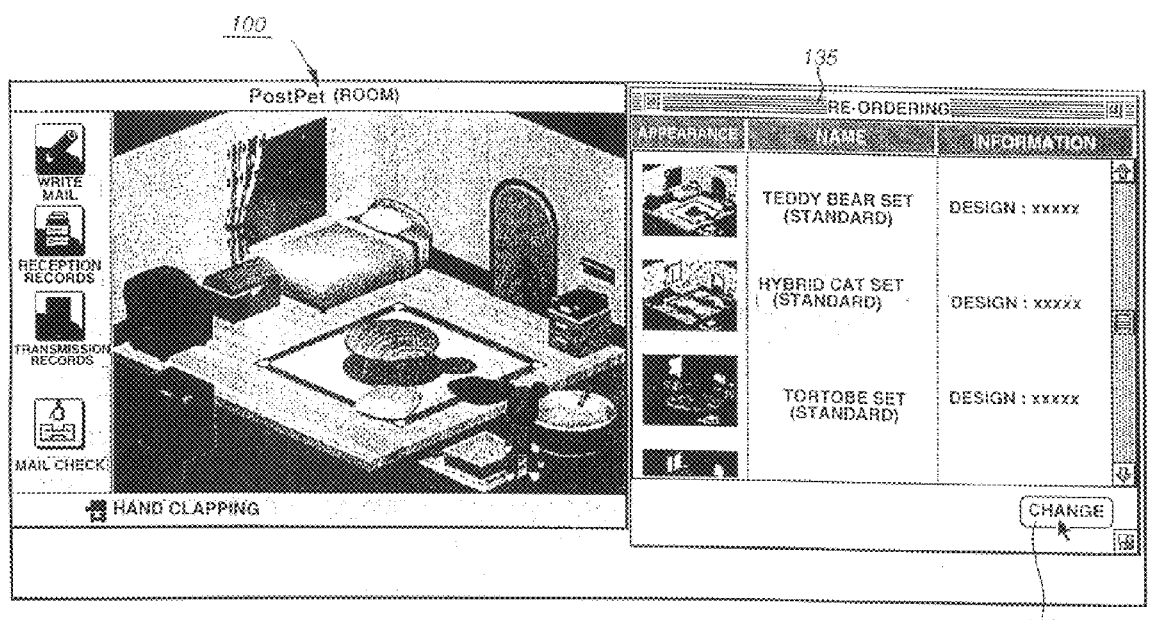
FIG. 37 shows the state in which an item 'Re-Ordering' of the pulldown menu on the GUI picture of the 'PostPet (Room)' has been selected.
Figure 38:
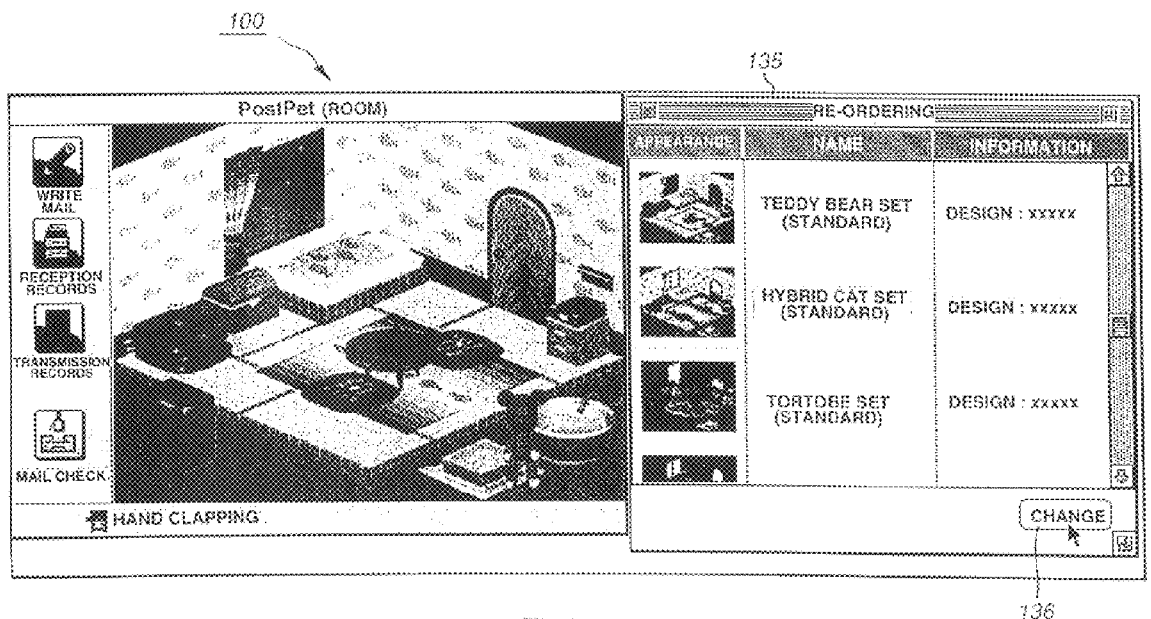
FIG. 38 shows the GUI picture of the 'PostPet (Room)' when the re-ordering has been executed.

If an item 'Re-ordering' displayed on the care pulldown menu 125 is selected, a 're-ordering' window 135 shown in FIG. 37 is opened. If a desired room, such as a hybrid cat set shown netted in FIG. 37, is selected, and a 'change' button 136 is pushed, the room re-ordering is performed, as shown in FIG. 38. Although there are provided a number of different types of room re-ordering of room re-ordering as default, an up-to-date list of refreshments may be procured, such as by downloading from the WWW server on the Internet, such as http://www.so-net.or.jp/postpet/index.html, and pasted to the 'plug-in' folder present in the same directory as the PostPet. exe, which is the execution file of the E-mail sending program, by way of adding the new 'room re-ordering' file.

Figure 39:
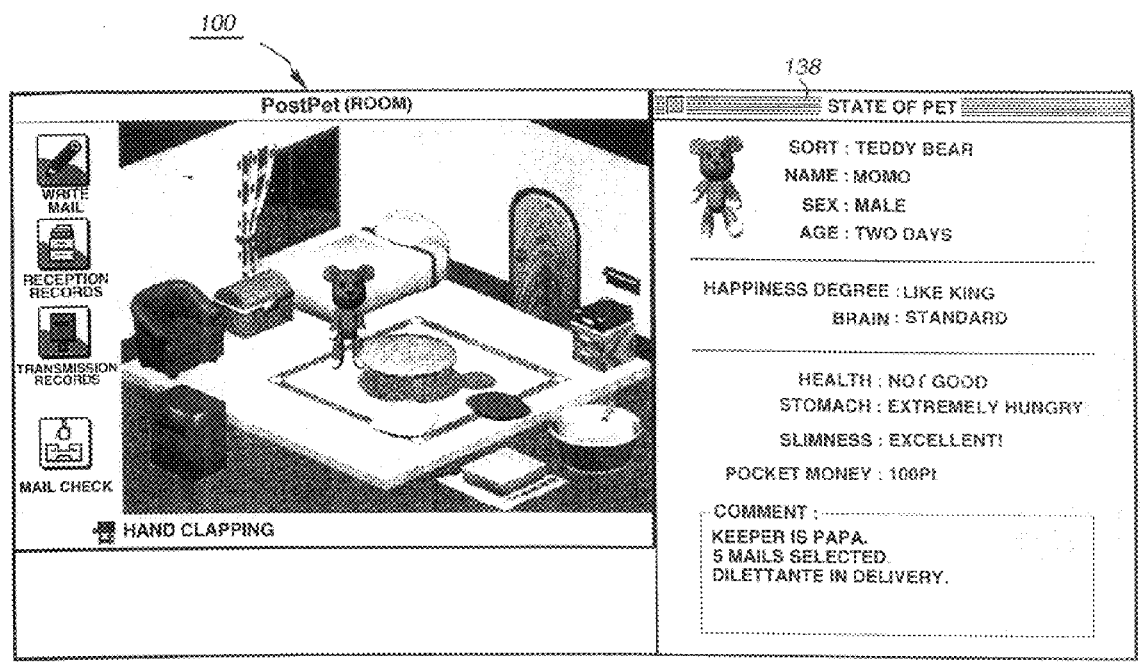
FIG. 39 shows the state in which an item 'State of Pet' of the pulldown menu on the GUI picture of the 'PostPet (Room)' has been selected.

If an item 'state of pet' displayed on the care pulldown menu 125 is selected, the window 138 shown in FIG. 39 is opened for displaying the state of the pet. Depending on the state of the pet displayed on the window 138, the user can recognize the sort, name, sex, age, degree of happiness, brain, condition, hungriness, slimness, pocket money and comment. The degree of happiness or brain can be variably represented by pet parameter values.

Figure 46:
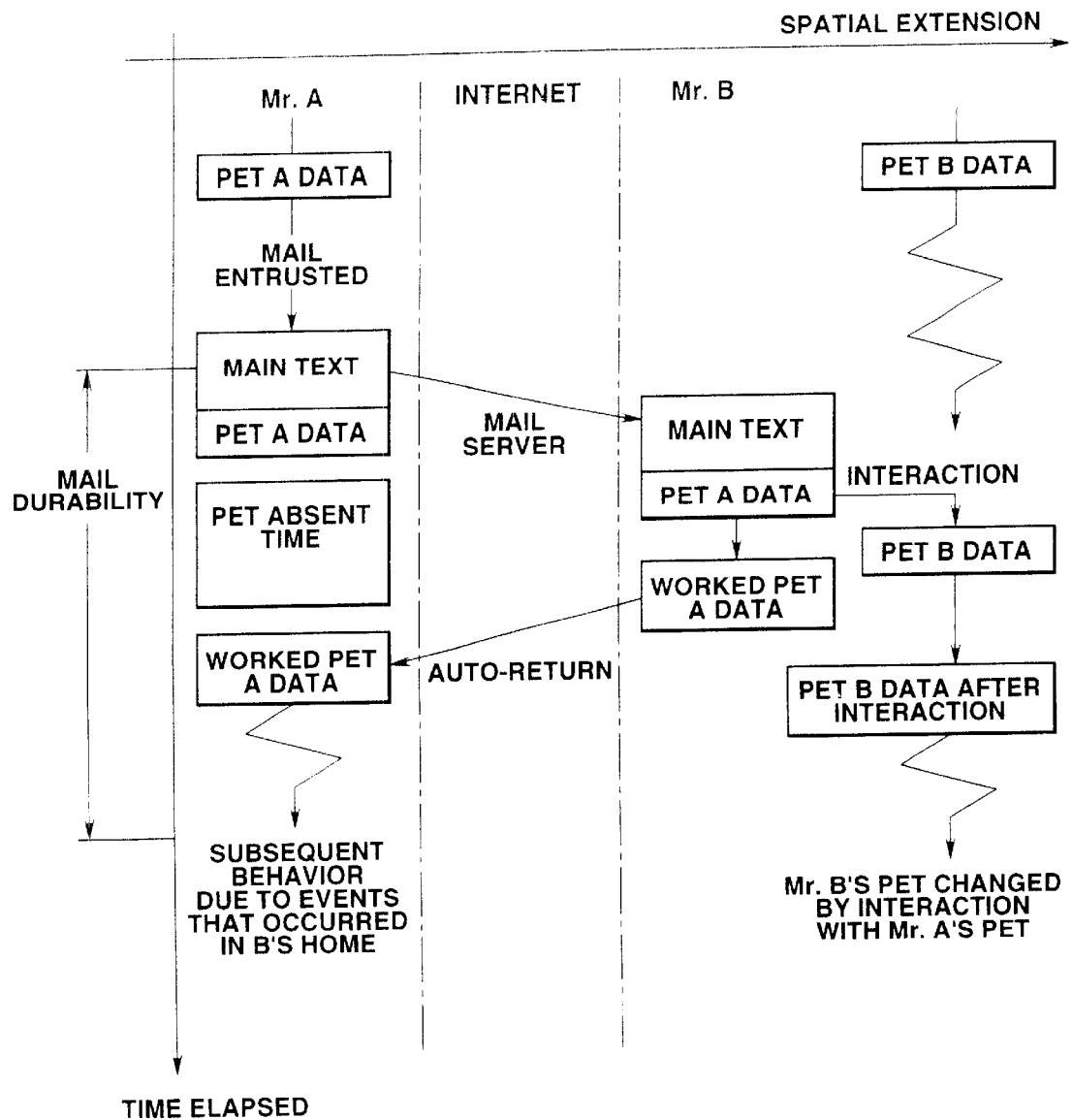
FIG. 46 is a timing chart showing the sequence of E-mail exchange in a state in which two personal computers each having installed therein the mailer are connected concurrently to the communication network.

Between personal computers 22 having the mailer function similar to that of the personal computer 21 having the above-described mailer function, E-mails can be exchanged by the post pet 103. If the personal computer 21 executes E-mail sending by the post pet 103A to send the E-mail to the personal computer 22, the latter executes the reception subroutine shown in FIG. 11 to check the E-mail reception time by the post pet 103A as shown by the time chart shown in FIG. 46. If the time is within the mail life, the post pet 103A is displayed on the screen of the display device 21B to automatically return the processed agent parameters.

If the sending side personal computer 21 executes the E-mail sending by the post pet 103A, the post pet 103 is absent, that is, has gone out, on the GUI picture of the 'PostPet (Room)', until the agent parameters of the post pet 103A are returned from the receiver, such that the post pet 103 cannot execute mail sending. However, if the agent parameters are returned automatically within the mail life, the single post pet 103A can be used repeatedly for sending the E-mails one by one.

In the sending personal computer 21, the operation determined by the automatically returned agent parameters is executed by the post pet 103A. If further a post pet 103B is registered as an agent on the receiving side personal computer 22, the agent parameters of the post pet 103B are changed, upon reception of the E-mail by the post head 103A sent from the personal computer 21, by the interaction with the post pet 103A performing the operation as determined by the agent parameters annexed to the E-mail.

Figure 47:
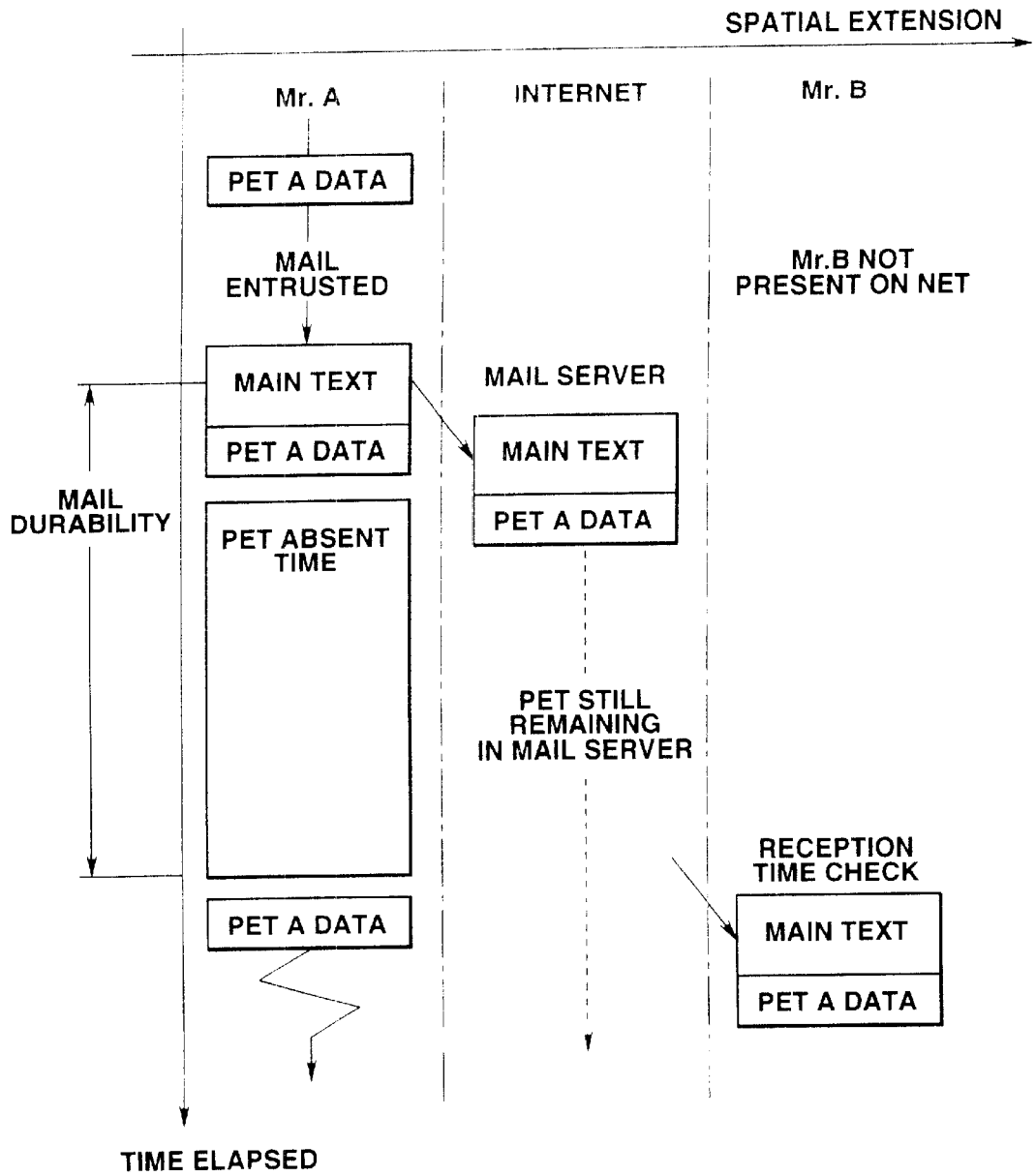
FIG. 47 is a timing chart showing the sequence of E-mail exchange in a state in which two personal computers each having installed therein the mailer are connected with a time offset to the communication network.
Figure 48:
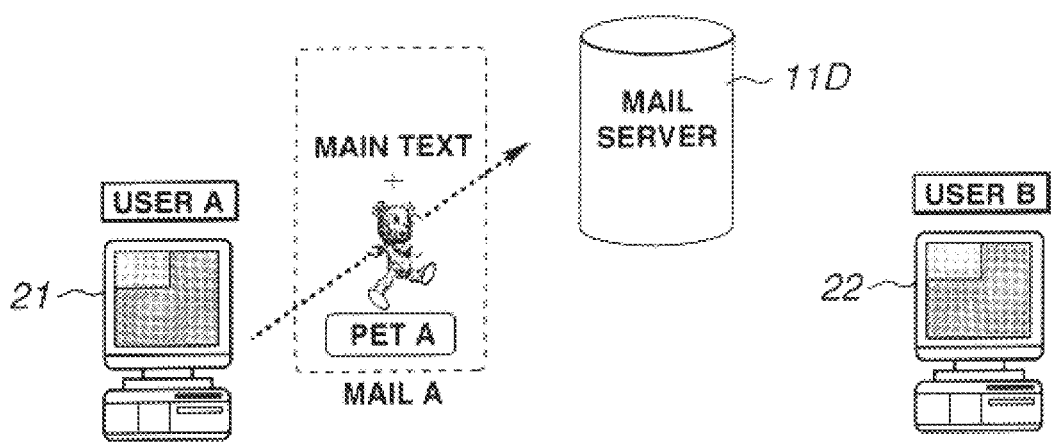
FIG. 48 schematically shows sending a mail A from a user A to another user B by the post pet.

If, when the personal computer 21 executes the E-mail sending by the post pet 103A to send the E-mail to the personal computer 22, and the personal computer 22 fails to execute the reception subroutine shown in FIG. 11, that is, if the personal computer 22 is not connected to the communication network, the E-mail is reserved in the mail server on the Internet service provider 12, as shown in the timing chart of FIG. 47, such that the E-mail is received at a later time when the personal computer 22 is connected to the communication network. In this case, the post pet 103A stays in the mail server until the E-mail is received. Thus, with the sending personal computer 21, mail sending by the post pet 103A cannot be executed, with the post pet 103A being absent, that is having gone out, on the GUI picture of the 'PostPet (Room)'. Therefore, the E-mail sent by the post pet 103A is designed to have a pre-set life, such that, if the agent parameters of the post pet 103A are not returned from the receiving side within the mail life period, the agent parameters of the post pet 103A are automatically generated on timeout of the mail life period for causing the post pet 103A to appear on the GUI picture of the 'PostPet (Room)'.

On connection to the communication network, the receiving side personal computer 22 checks the reception timing of the E-mail by the post pet 103A to judge whether or not the time is within the mail life period, based on the sending data and time information of the agent parameters annexed to the E-mail and on the mail life period information. If the time is within the mail life period, the processed parameters are automatically returned after waiting until entrance to the above-mentioned reception subroutine. On the other hand, if the reception timing of the E-mail by the above-mentioned post pet 103A exceeds the mail life period, the post pet 103A is not displayed, while the agent parameters are not returned, even if the above-mentioned reception subroutine is executed.

The pet arrival confirmation mail function, which is an additional function of the automatic mail return processing of the step SP57 of FIG. 11, is hereinafter explained.

For making the animation display on the E-mail sending side GUI picture 100 for indicating the state of the post pet 103 returning home, the main text 202 of the pet mail received on the receiving side is deleted at step SP57. In addition, the agent parameters 203 are processed on the basis of actuation by the user so that only the processed agent parameters 203 are annexed to the mail header 201 for automatic return mailing. This enables the E-mail sending side to make animation display on the GUI picture 100 showing the post pet 103 returning home as shown in FIGS. 28 to 30 by the above-mentioned processing at the step SP49.

The function of automatic return mailing to the sender for advising the effect of arrival of the post pet as a text message of the E-mail, in addition to automatic return mailing of the agent parameters 203, is the pet arrival confirming function.

Figure 49:
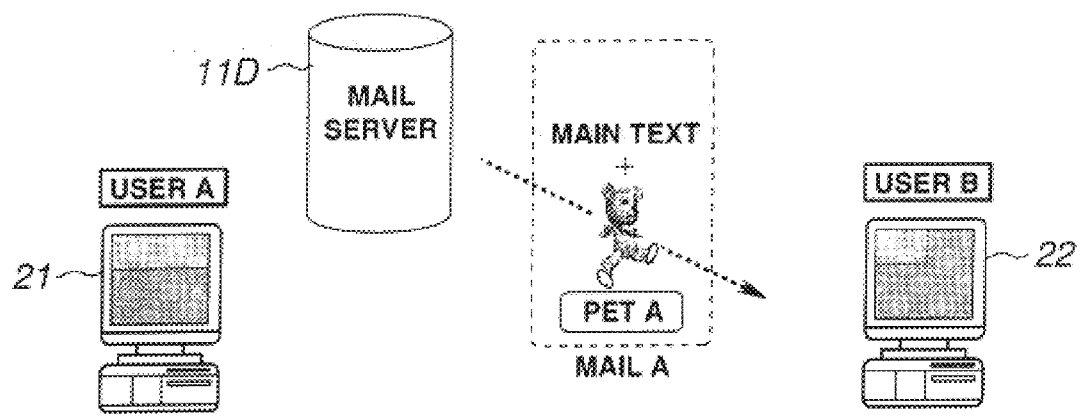
FIG. 49 schematically shows capturing the mail A by the user B.
Figure 50:
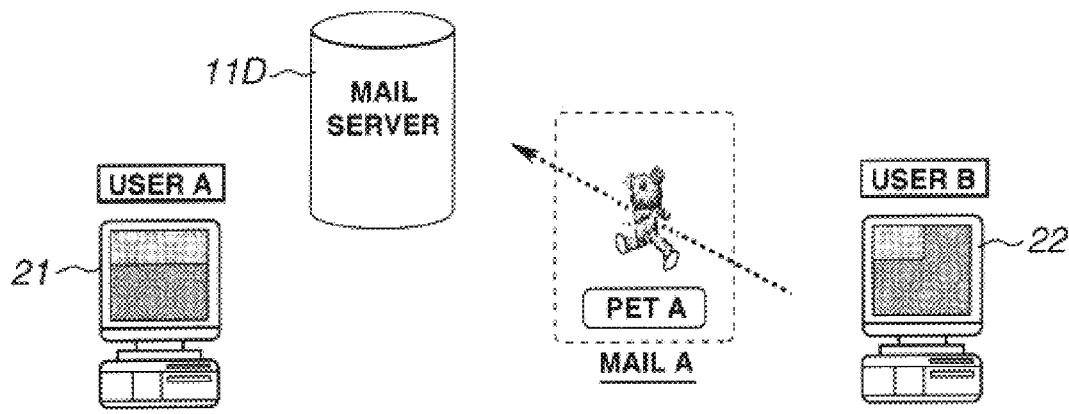
FIG. 50 schematically shows automatic mail returning of an agent parameter by the user B.
Figure 51:
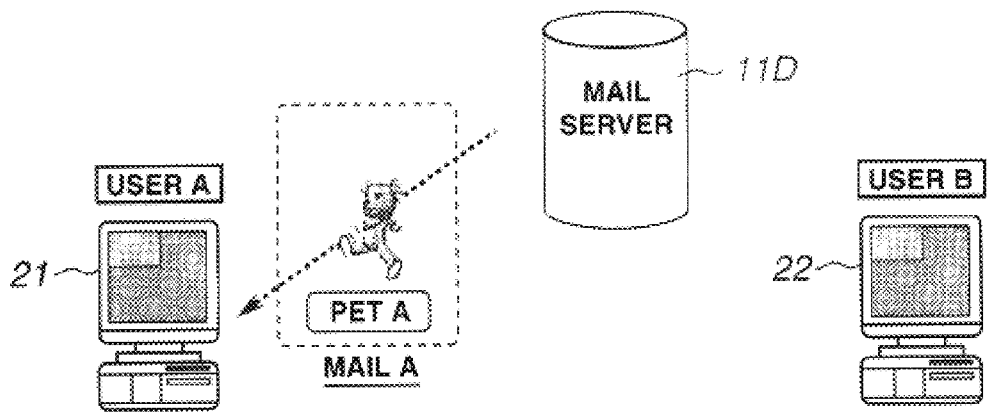
FIG. 51 schematically shows reception of an agent parameter automatically returned from the user B.

Referring to FIGS. 48 to 51 showing the processing flow, an 'automatic return' mail A' is automatically returned from the receiving side personal computer 22 of the user B via mail server 11D to the personal computer 21 of the sending side user A, as shown in FIGS. 50 and 51. In addition to this 'automatically returned' mail A', a 'pet arrival confirmation mail' is automatically returned from the receiving side personal computer 22 of the user B via mail server 11D to the personal computer 21 of the sending side user A.

This 'pet arrival confirmation mail' is automatically generated by the E-mail sending/receiving program of the receiving side personal computer 22 of the user B.

Figure 52:
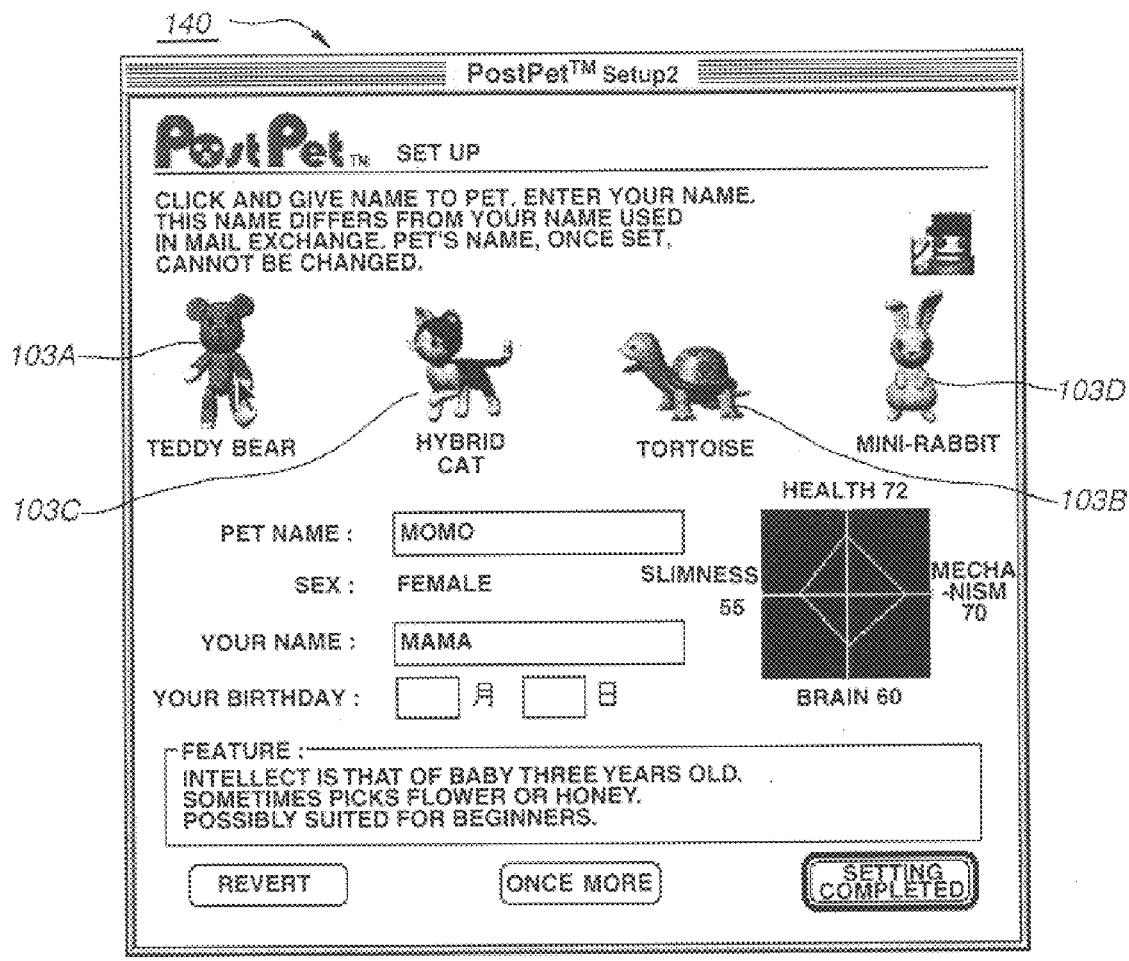
FIG. 52 shows a GUI picture for selecting the post pet.

It is assumed that, in a GUI picture 140 of a setup shown in FIG. 52, the user A sets 'Momo' as the name of his or her pet, while the user B sets 'Mippi' as the name of his or her pet.

The following mail is then set as the 'pet arrival confirmation mail'.

That is, a 'secret diary' is automatically set as the title (Subject), and a main text reading, for example:

"Today, I went (to the user B).

I played with Mippi.

I was hit a little.

I was hit many times.

Momo ."

is set automatically.

This 'pet arrival confirmation mail', in addition to the 'automatically returned' mail A', is automatically returned from the receiving side personal computer 22 of the user B via mail server 11D to the personal computer 21 of the sending side user A.

This adds the 'pet arrival confirmation mail' entitled 'secret diary' to the reception list of the user A, as is the usual E-mail.

This 'pet arrival confirmation mail', automatically generated by the E-mail sending/receiving program of the personal computer 22 of the user B, has the main text corresponding to the action of the user B on the post pet who delivered the mail, such as the action of caressing or hitting. This gives not only the practical effect of confirming the delivery of the E-mail to the receiving side but also the psychological effect that the keeper can actually feel that the post pet is serving on his or her behalf.

In the E-mail system of the above-described configuration, the 'PostPet' of the personal computer 21 of the user A encodes the agent parameter along with the main text of the mail handed to the pet A as the MIME type mail in order to transfer the resulting mail A to the destination, that is, to the user B. This causes the pet A to exit from the computer 21.

If then the 'PostPet' user B of the destination executes the mail check as shown in FIG. 49, the mail A is captured into the 'PostPet' of the personal computer 22.

The 'PostPet' of the user B records changes in the status of the pet A due to various events occurring in the pet room of the user B to return the pet A as 'automatic return' mail A to the user A, as shown in FIG. 50.

If the user performs mail check by the 'PostPet' of the personal computer 21 as shown in FIG. 51, the automatic return mail A is retrieved. This is used by the 'PostPet' of the personal computer 21 of the user A as the new agent parameter which reflects the events at the user B.

That is, by having agent picture data in the personal computers of the user and the receiver, and by actually sending the agent parameters controlling the agent behavior, he results as if the agent picture data were being sent. Since it is not he picture data but the agent parameters that are sent, the user connection time is decreased for saving the Internet connection an telephone charges for a dial-up user. Since the exchanged data volume is reduced, the resources of the Internet in its entirety can be saved.

In the present E-mail system, if the postpet 103 is taken to a cocktail lounge (Nomiya) or to a barber, the postpet 103 is tipsy when leaving the cocktail lounge or has hair cut when leaving the barber. The cocktail lounge or the barber is provided on a home page of the Internet service provider 11. Specifically, if the user transmits the agent parameter of the postpet 103 to the cocktail lounge provided on the home page, the Internet service provider 11 processes part of the agent parameters to return the processed parameter to the user automatically.

This changes the behavior of the postpet 103.

Figure 53:
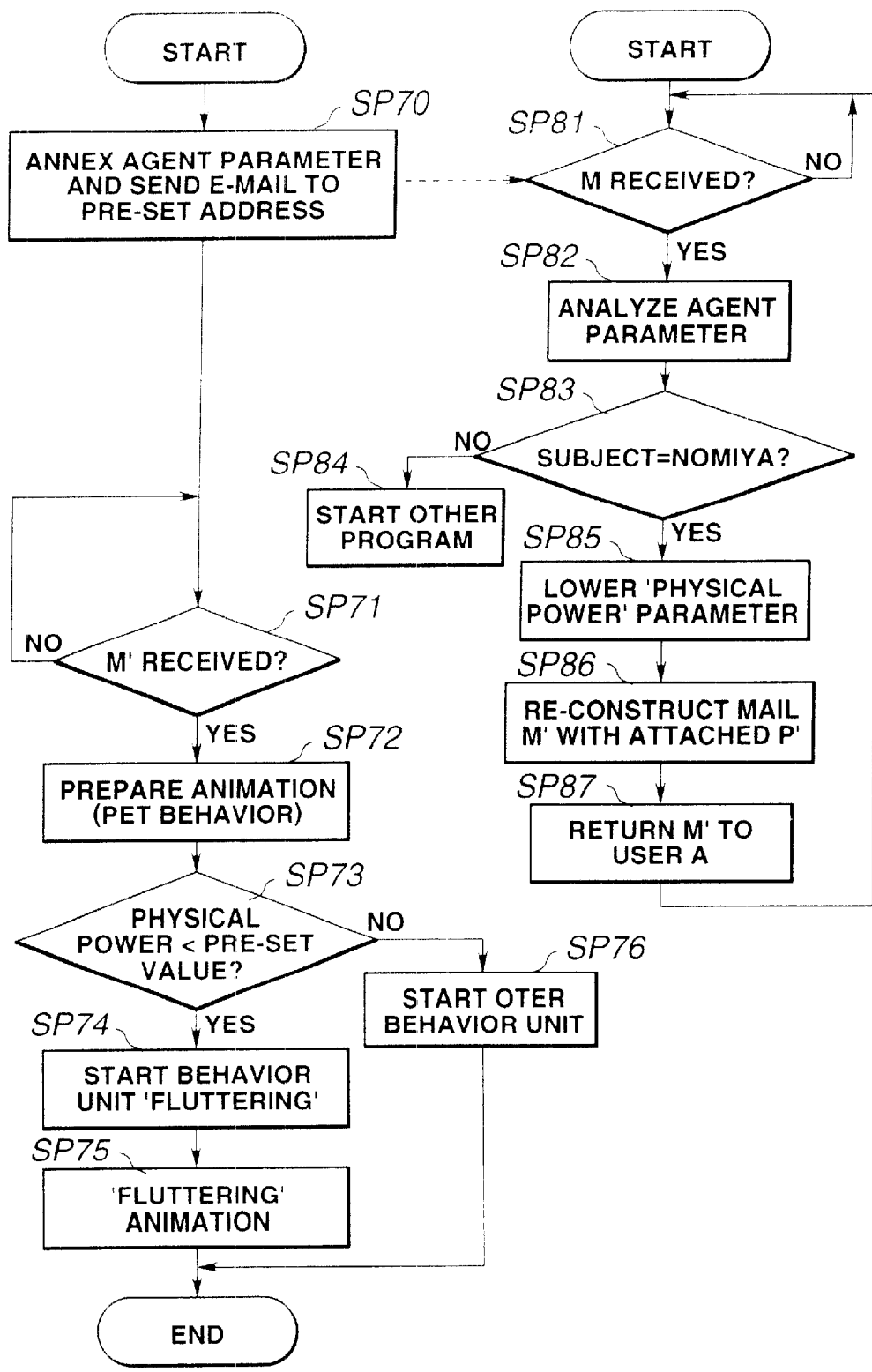
FIG. 53 is a flowchart for illustrating the operation of the personal computer and the Internet service provider when the E-mail having an attached agent parameter is sent to a cocktail lounge (Nomiya).
Figure 56:
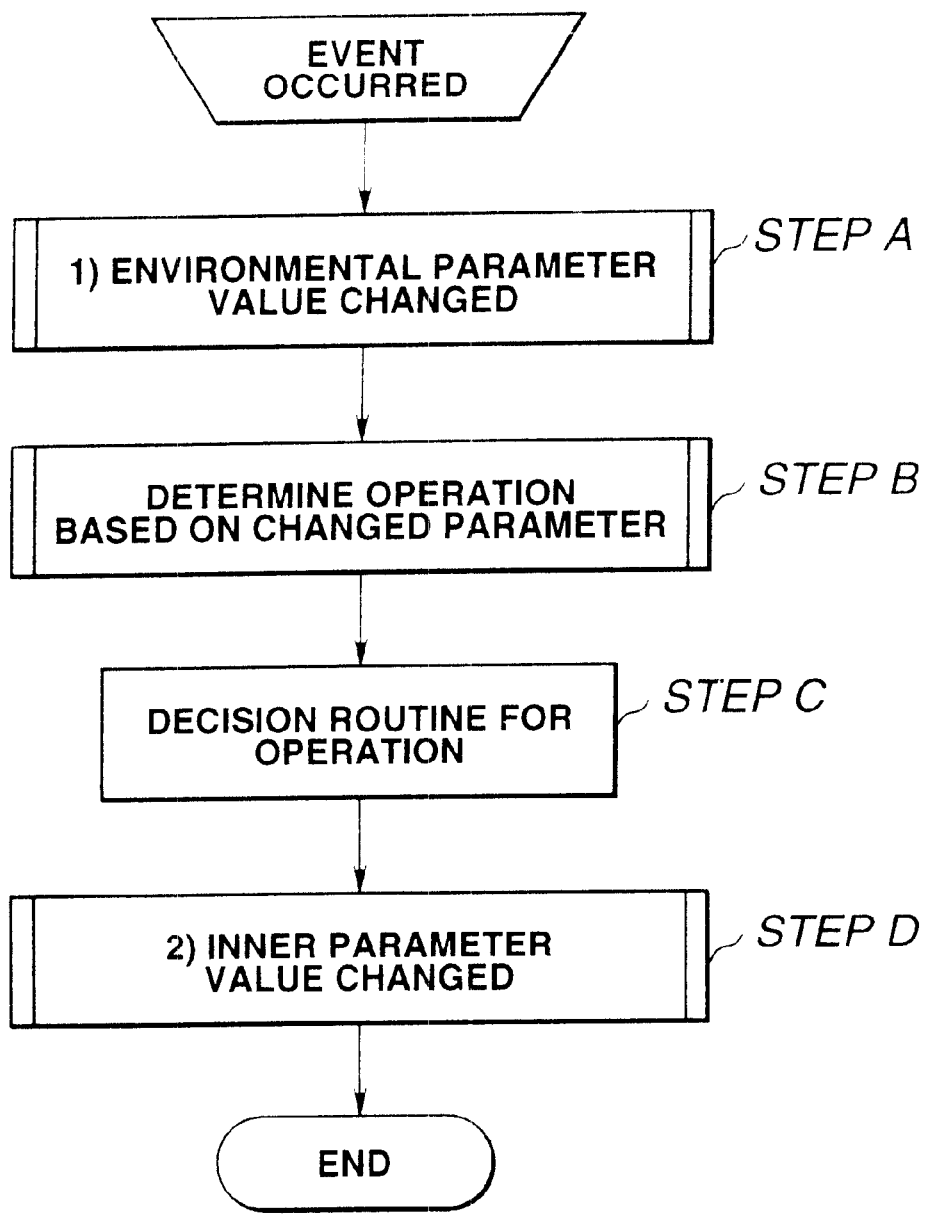
FIG. 56 is a flowchart illustrating the event processing of a feeling unit determining the postpet behavior.

As an example of taking the postpet 103 to the public house, the operation of the personal computer (user) 21 at steps SP71 to SP76 in FIG. 53 and the operation of the Internet service provider 11 at step SP81 to step SP87 are explained. The Internet service provider 11 has a barber, park, hospitals and so forth in addition to the cocktail lounge.

The following description is made with reference to an example of taking the postpet 103 to the cocktail lounge of the Internet service provider 11, any suitable system other than the Internet service provider 11can be used if it can process the agent parameter.

If the user moves the pointing cursor 101 by actuation of the mouse 21D to a point above the mail-writing icon 105A, for example, on the GUI picture of the 'PostPet (room)', and clicks the mail-writing icon 105A, the CPU 21 a writes at a pre-set position of the video RAM 21j the bit map data comprised of the GUI picture 110 superimposed on the GUI picture 100 of the 'PostPet (room)', as shown in FIG. 4.

The 'mail-writing' GUI picture 110 has its upper half portion and its lower half portion configured as a first display area 113 in which to display the contents of the mail header and as a second display area 114 in which to display the mail contents. In the first display area 113, there is displayed the header information, such as the address (To:), mail sender (From:), title (Subject:), carbon copy (Carbon Copy) [cc.] and attachment (Attachment:). In the first display area 113, there are also displayed an icon 115A for handing to the pet for instructing mail dispatching by the post pet 103 and an icon 115B for handing to the postman 104 for instructing mail dispatching by the postman.

The user actuates the keyboard to enter (petdata@yyy.or.jp) in the destination (To:) of the first display area 113 of the GUI picture 110 and the (user A) as the senders name in the mail sender name, while entering (cocktail lounge) in the title (Subject:). The mail address of the user A is (userA@xxx.or.jp). The mail contents need not be entered in the second display area 114 of the GUI picture 110.

If the user actuates the mouse 21D to move the pointing cursor 101 to a position above the icon 115A (handing to the pet) and clicks, the CPU 21a saves the E-mail comprised of the mali header 201 having attached agent parameter 203 governing the behavior of the post pet 103 in the RAM 21c, if the user actuates the mouse 21D to move the pointing cursor 101 to the icon 105D for connection and clicks it, the CPU 21a executes the sending sub-routine of step SP6 to perform the sending of the E-mail (step SP70), as shown in FIG. 6.

In this manner, the personal computer 21 sends the E-mail M to the Internet service provider 11 which is the address name (petdata@yyy.or.jp). This E-mail is made up of the address (To: pedata@yyy.or.jp), sender (From: userA@xxx.or.jp) and the title (Subject: public house) and the attached agent parameter.

On the other hand, the communication server 11C of the Internet service provider 11 is in the state of waiting for reception of the E-mail M(step SP81). On reception of the E-mail M from the personal computer 21, the E-mail is saved in the mail server 11D via the MODEM 11F, communication server and LAN 11B. The mail server 11D extracts the mail header and the agent parameter from the E-mail M to transfer the extracted data to the data base server 11G.

The data server 11g analyzes the transferred agent parameter (step SP82) to determine whether or not the title (Subject:) of the mail header is 'cocktail lounge' (Nomiya). If he title is cocktail lounge, barber, park or the hospital, the title is determined accordingly. By analyzing the information of the title (Subject:), the data base server 1G judges to which of the cocktail lounge, barber, park or the hospital the pet has come to select the correction parameters as will be explained subsequently. Stated differently, the correction parameter is selected by analyzing the information of the title (Subject:) even if the same address is used.

If the data base server 11G judges the title (Subject:) not to be a cocktail lounge, it starts another program at step SP84. If the title (Subject:) is the barber, the agent parameter relevant to the barber is modified.

If the data base server 11G judges the title (Subject:) to be a cocktail lounge, it diminishes the value of the physical power of the agent parameter attached to the E-mail at step SP85 to transfer the resulting parameter to the mail server 11D. If the title is the barber or the hospital, the cleanliness parameter is increased, or the vigor parameter is decreased, respectively.

The mail server 11D appends the sender and the destination of the mail header of FIG. 54 in a reversed order to the transferred agent parameter, in order to reconstruct an E-mail M' at step SP36, as shown in FIG. 55. The mail server 11G returns the E-mail M' to the user A of the personal computer 11 at step SP85.

Upon reception of the E-mail M', the CPU 21a of the personal computer 11 writes the GUI picture simulating the inside of the room and the bit map data of the postpet 103 on the video RAM 21j of the display controller 21g to display the animation of the postpet 103 n the GUI picture 100 of the display unit 21B (step SP72).

The CPU 21a judges whether or not the 'physical power' among the agent parameters is smaller than a pre-set value (step SP73). If the 'physical power' is judged to be smaller than the pre-set value, the CPU causes the behavior unit 'tipsy' to be started at step SP74 to display the drunken and tipsy state of the post pet 103.

If the CPU 21a finds that the 'physical power' of the agent parameter is not larger than a pre-set value, it starts another behavior unit at step 26. For example, if the postpet visits the barber or the hospital, its hair becomes trim or it feels weaker, respectively.

With the present E-mail system as described above, the postpet can have its behavior changed by sending the agent parameters of the postpet 103 to the Internet service provider 11, which then returns the partially modified agent parameters to modify the behavior of the PostPet. For example, if the agent parameters are sent to the 'cocktail lounge' (Nomiya) or to the 'barber' provided on a home page of the Internet service provider 11, the postpet 103 is tipsy or trim, respectively.

Although a single agent parameter is changed in the present embodiment, it is to be noted that plural agent parameters may also be changed.

The sending/receiving program for the E-mail stored in the Internet service provider 11 may be installed in the personal computer 21. This makes it possible for the personal computer 21 to process the agent parameters transmitted from the personal computer 22 to return the processed agent parameters.

It is noted that the behavior of the post pet is determined by the agent parameters 203 as follows:

Specifically, the relative intensities of the pseudo-desires are determined by the environment of the post pet and stimuli from the user. Each desire agency has a score and sensitivity, whilst each behavior unit adds new scores with the scores of each desire agency as an input. The behavior unit having the maximum score is manifested.

The score of the behavior unit and the desire agency is calculated by:

$$\text{new score} = \text{old score} + (\text{input} \times \text{sensitivity})$$

with the sensitivity being the depth of the relation between each desire agency and the behavior unit and the input element. The sensitivity itself is also changed with input.

That is, the feeling unit determining the post pet behavior captures changed values of environmental parameters of the post pet at step A, determines the behavior based on the changed environmental parameters at step B, judges the behavior taken at step C and modifies the value of the inner parameters at step D by way of performing event processing.

Figure 58:
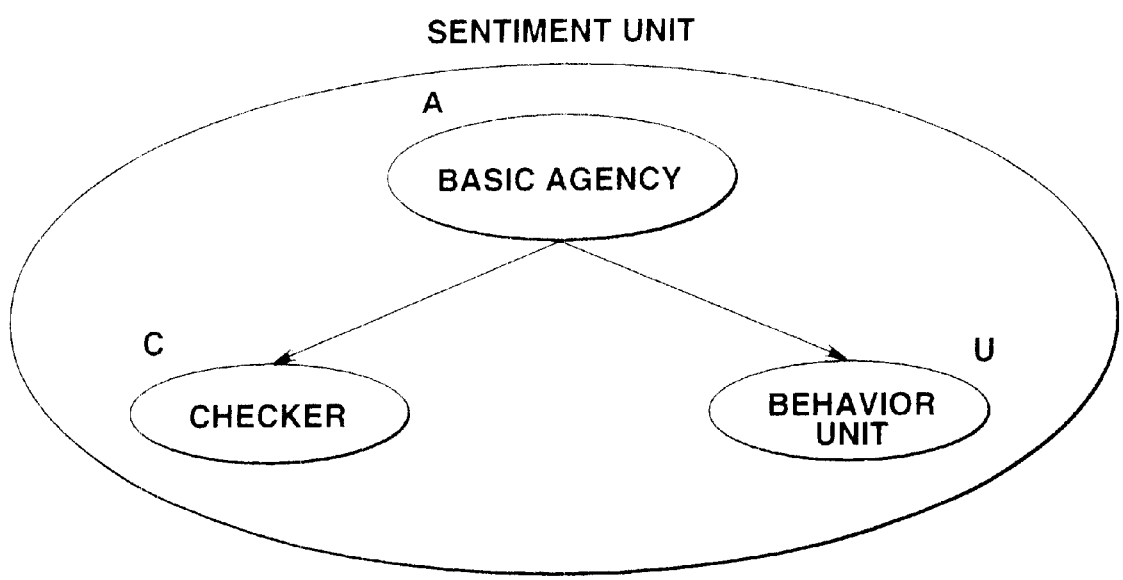
FIG. 58 shows the basic structure of the feeling unit.
Figure 59:
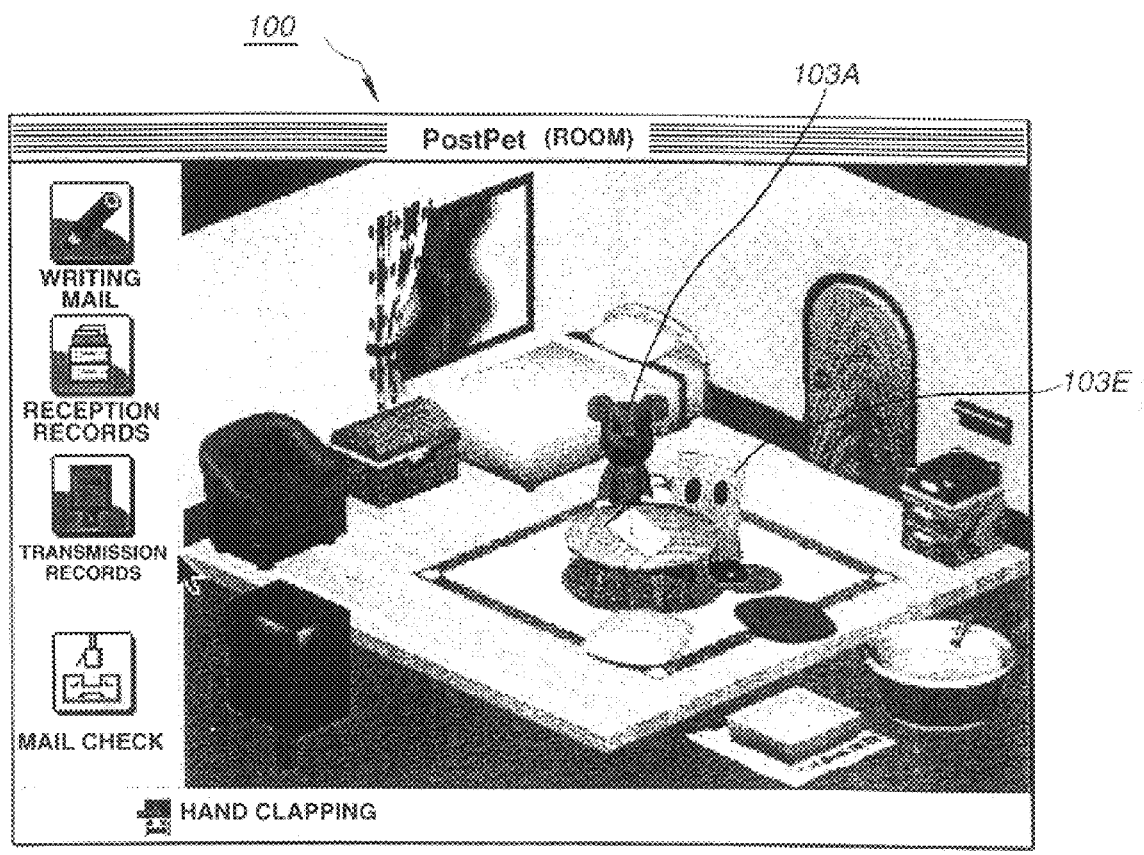
FIG. 59 shows a GUI picture of the 'PostPet (Room)' in which Hatena-kun made debut.

Specifically, the agencies of various desires receives environmental information items E1 to E7, specifying the environment of the input post pet, such as age, intellect physical strength, vigor, intimacy, dirtiness or hungriness, and the information on stimuli specifying the stimuli on the post pet from the user, such as hitting, kicking or dispatching an E-mail, as input, in order to check the environmental information items E1 to E7, through an age checker C1, an intelligence checker C2, a physical strength checker C3, a vigor checker C4, a like-dislike checker C5, an apparel checker C6 and a hungriness checker C7, while directly checking the information on stimuli, for calculating respective scores. Each of behavior units U1 to U25 has the scores of the desire agencies, thus calculated, as the input, and the behavior unit having the maximum score is started. That is, the feeling unit is made up of a basic agency A, a checker C and a behavior unit U, as shown in FIG. 58 showing the basic units for reaction.

The above-mentioned desire agencies may be exemplified by a mouse searcher A1, desirous to search for a mouse, a food searcher A2, desirous to search for food, a toy searcher A3, desirous to search a toy, a bathroom seeker A4 who needs to go to the bathroom, a sleep liker A5 desirous to sleep, a speech liker A6 desirous to have a chat, a sampling liker A5 desirous to make sampling, a writer A8 desirous to write letters, an eater A9 having strong appetite, a recollector A10 desirous to recollect the past, a soothsayer A11 desirous to make prophets, a rioter A12 desirous to make rages, a quietness liker A13 who likes quietness, a quarreling liker A14 desirous to make quarrels, a caressing liker A15 desirous to be caressed, a searcher A16 desirous to make searches, a reflection liker desirous to be reflective and an evaluation liker A18 desirous to make evaluations.

The behavior units may be exemplified by a walking unit U1 for animated representation of the walking motion, a running unit U2 for animated representation of the running operation, a sitting unit U3 for animated representation of the sitting operation, a sit-and-raise-one-hand unit U4 for animated representation of the motion of sitting and raising one hand, a stand-and-raise-one-hand unit U5 for animated representation of the motion of standing and raising one hand, a sit-and-raise-both-hands, unit U6 for animated representation of the motion of sitting down and raising both hands, a standup-and-raise-both-hands unit U7 for animated representation of the motion of standing up and raising both hands, a calling unit U8 for animated representation of the calling motion, a carry-and-walk unit U9 for animated representation of the carrying and walking motion, a hand-clapping unit U10 for animated representation of the hand-clapping motion, a standup-and-riot unit U11 for animated representation of the standing up and rioting operation, a lie-and riot unit U12 for animated representation of the lying and rioting operation, an eat-and-walk unit U13 for animated representation of the eating and walking operation, a toilet unit U14 for animated representation of going to the bathroom, a hit unit U15 for animated representation of the hitting operation, a defence unit U16 for animated representation of the defending operation, a sleeping unit U17 for animated representation of the sleeping operation, a fall-down unit U18 for animated representation of the falling-down operation, a nodding unit U19 for animated representation of the nodding operation, a dancing unit U20 for animated representation of the dancing operation, a swinging unit U21 for animated representation of the swinging operation, an stand-upside-down unit U22 for animated representation of the stand-upside-down operation, a put-into-order unit U23 for animated representation of the putting-into-order or housing operation, a special technique unit U24 for animated representation of the showing the special technique, and a carrying unit U25 for animated representation of the carrying operation.

In the present embodiment, about 50 illustrative expressions are provided for the post pet 103. These expressions are ranked depending on the 'intellect' of the post pet 103. If the eat-and-walk unit U13 is started, an illustrative legend belonging to a rank 'intellect' at the time point is selected at random. The intellect of the post pet 103 is varied depending on the age E1 of the post pet 103 as set by the time elapsed since registration in the user computer or the serial number information 203 specifying the number of mails handled by the post pet 103.

The selected expressions is sent as the E-mail on randomly selecting the counterpart of the E-mailing to whom the user has so far sent E-mails, including the user.

Examples of the expressions of the mail voluntarily sent by the post pet 103 include "ah", "ne-ne" or "ano-ne" enunciated by pets directly after installment and hence of low intellect, "I've understood the mail system—it's easy for me" enunciated by pets in the middle stage of intellect, "there's something happy for me in what I do" enunciated by pets in the high intellectual state and a farewell message running "the time seems to have come—I cannot think no longer—I will go without making you feel sad—I've been happy". These expressions may be laid on store separately or in common for different species of the pets.

That is, the post pet 103A of the present embodiment can voluntarily send an E-mail reading: "My name is Momoko-please remember me" to the user or to the counterparts of the E-mailing. The scores of the above-mentioned eat and walk unit U13 are varied with the age E1, intellect E2, physical strength E3 or the vigor E4 of the post pet 103 and is reset at a time point when the post pet 103 has voluntarily sent an E-mail. The physical strength E3 or the vigor E4 of the post pet 103 is varied with the stimuli or the contents of experiences from the user or the counterpart. For example, the physical strength E3 of the post pet 103 is lowered and raised on dispatching an E-mail and on eating or sleeping. The vigor E4 of the post pet 103 is lowered and enhanced on being persecuted and caressed by the counterpart, respectively. Thus, the post pet 103 can voluntarily send E-mails a number of times to the user or to the counterpart of E-mailing.

For preventing the user from disliking the post pet 103 as a result of the increased age E1 or intellect E2 of the post pet 103 resulting in the increased number of times of dispatching E-mails to the user or to the counterparts and in repeated occurrences of the same legends, a 'life' is set for the post pet 103.

This 'life' set for the post pet 103 is usually set in terms of the number of E-mail's carried by the pet to 500 mails and is varied with the physical strength E3 or the vigor E4.

The post pet 103, whose life has come to a close, sends the final E-mail reading, for example: "Momo now goes to a distant place . . . Thank you for your attention for me . . . So long" to the user or to the counterpart to stop the function as an agent.

Meanwhile, if the post pet is selected first, the GUI picture 140 for selecting the pet is displayed, as shown in FIG. 52, such that one of the Teddy-bear 103A, tortoise 103B, hybrid cat 103C and mini-rabbit 103D can be selected. The parameters of 'condition', 'temper', 'brain' and 'slimness' are varying at all times and are set at the time of selecting (clicking) the pet. However, the parameters as set at the time of selecting (clicking) the pet are initial values, after all, and are varied depending on the pet keeping state of the user. The items 'pet's name' and 'your name' can be freely entered by the user.

Figure 57:
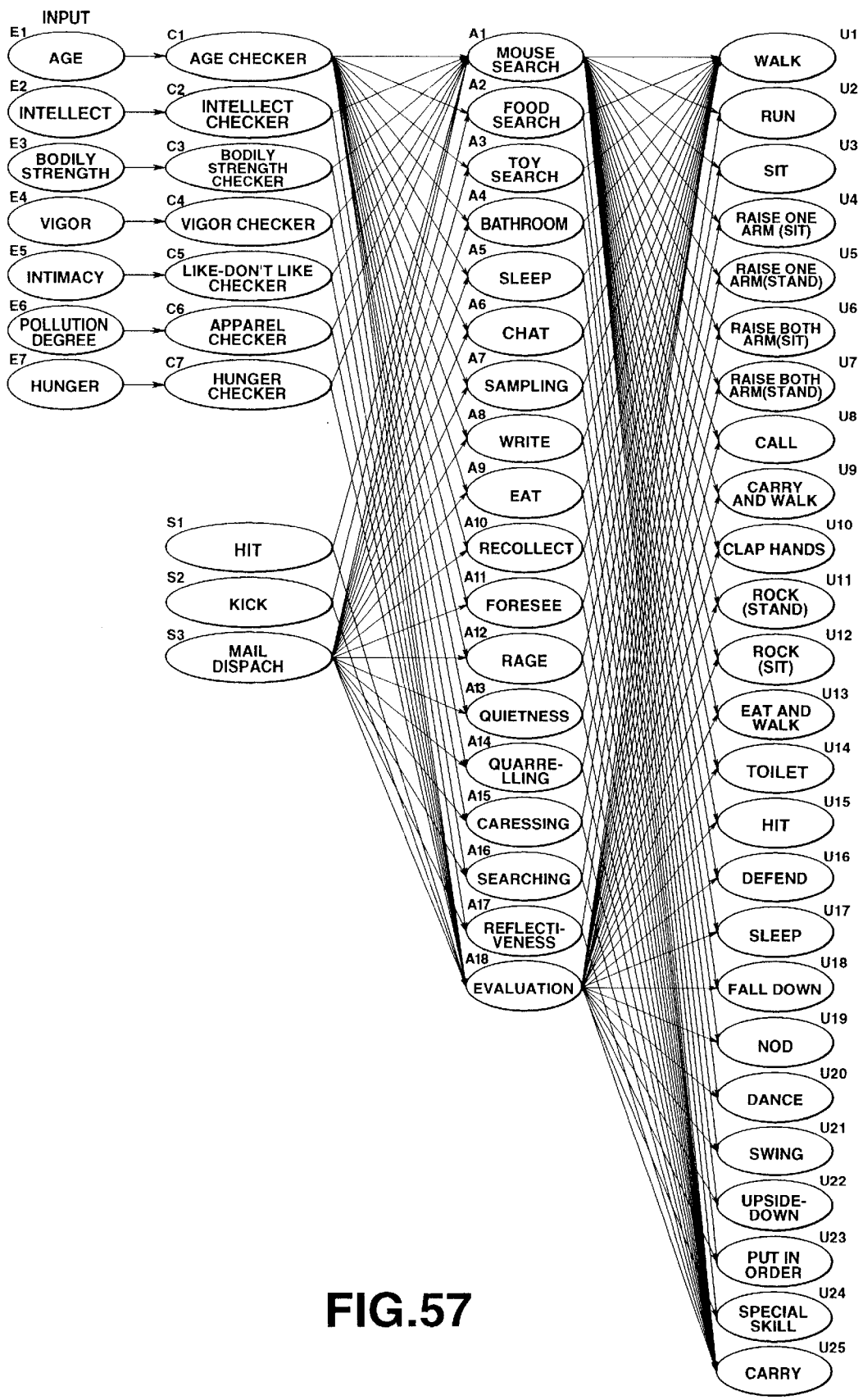
FIG. 57 illustrates the technique of determining the behavior of a post pet by an agent parameter.

In the post pet, picture data of the pet are stored in the local disc of the user, so that, if the number of pet types is increased in future, these new pets cannot be represented. Thus, picture data of a character 'hatena-kun' (Mr. Question) shown in FIG. 3 is used. That is, if a mail is sent by a post pet of a newly defined character to a user having only picture data of Teddy bear 103A, tortoise 103B, a hybrid cat 103C and a mini-rabbit 103D, the hatena-kun 103E is displayed, as shown in FIG. 57. Thus, it is possible with the post pet to cope with an increased number of the pets, by using the hatena-kun 103E, for adding new pets.

With the above-described E-mail system, data appended to the E-mail can be collected and the collected results can be displayed on the whole page or returned by an E-mail. In the following, it is assumed that the agent parameters appended to the E-mail are collected by the Internet provider 11. For example, entries for an athletic meeting of the postpets 103 are accepted on a home page of the Internet service provider 11, such that, if the user has his or her postpet 103 take part in the meeting, the results of the game are displayed on the home page or returned to the user.

Specifically, it is announced on a home page of the Internet service provider 11 that a pet race is being had for which entries can be made and that the entry is completed by sending an E-mail reading petdata@yyy.or.jp with a title (Subject: race) by the pet.

The personal computer 21 enters in the first display area 113 of the GUI screen 10 shown in FIG. 4 'petdata yyy.or.jp', 'user A' and 'race' in the address (To:), sender's name (From:) and title (Subject:), respectively. The mail address of the user A is (userA@xxx.or.jp). There is no necessity of entering the mail contents in the second display area 114 of the GUI screen 110.

If a user actuates a mouse 21D to move the pointing cursor 101 on the icon 105D for 'connection' the CPU 21a proceeds to the transfer subroutine of step S6 to send the E-mail. The personal computer 21 sends the above-mentioned E-mail to the Internet service provider 11 having an address (petdata@yyy.or.jp). This E-mail is made up of a mail header, composed of the address (To: petdata@yyy.or.jp), sender (From: userA@xxx.or.jp) and the title (Subject: race), and an appended agent parameter, as shown in FIG. 54.

Figure 60:
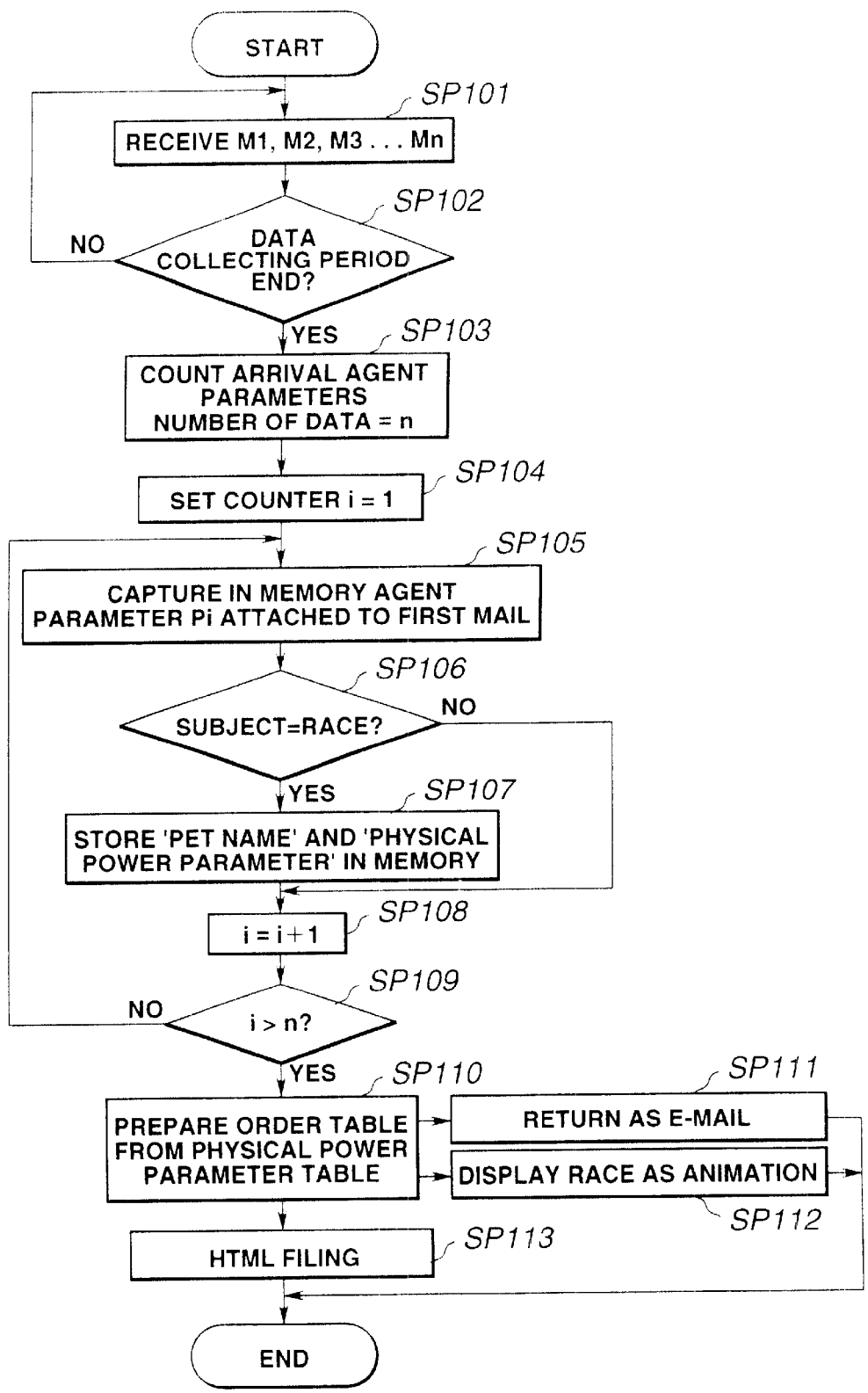
FIG. 60 is a flowchart for illustrating the operation of the Internet service provider when making acceptance of entries in an athletic meeting of postpets by an E-mail.

Upon reception of the E-mail form the personal computer 21, as shown in FIG. 60, the mail server 11D of the Internet service provider 11 receives the E-mail at step SP11 over the modem IF and the communication servers 11C and LAN 11B. The mail server 11D extracts the mail header and the agent parameters from the E-mail to transfer the extracted data to the data base server 11G. This processing is repeated until the pre-set data collection period for the received E-mails comes to a close (step SP102). Thus, E-mails M1, M2, M3, . . . are received during the data collection period.

When the data collection period has elapsed, the controller of the data server 11G counts the number of the agent parameters received. This number is set as n (step SP103). The counter is set to i=1 (step SP104) and the agent parameter Pi appended to the i(=1)th E-mail is stored in the memory (step SP105).

The controller of the data base server 1G judges whether or not the title (Subject:) is 'race'. That is, the E-mails other than those having the title (Subject:race0 are excluded in the collection. If an event called a contest is held simultaneously as the athletic meeting, E-mails having the title (Subject: contest) are collected in another table. By discriminating the events held in the Internet service provider 11 depending on the contents of the title (Subject:), the user can participate in the event even using the same address.

If the title (Subject:) is 'race', the controller of the data base server 11G saves the pet name and the physical power parameter in the memory (step SP107). The counter is incremented to i=i+1 (step SP108) to judge whether or not i>n (step SP109). If the title (Subject:) is judged at step SP106 not to be a 'race', the controller proceeds to step SP108.

If the result of judgment at step SP109 is not i>n, the processing of steps SP105 to SP109 is performed to store in the memory the pet name and the physical power parameter not stored in the memory. If the processing of steps SP105 to SP109 is carried out, the physical power parameter table composed of the user-based mail address, pet name and physical power parameter is formulated, as shown in FIG. 61.

If the result of step SP109 is i>n, the physical power parameters in the physical power parameter table are arrayed in the order of the decreasing magnitudes to form a rank table (step S110). The rank table is the physical power parameter table with ranks.

After forming the rank table, the results are returned by E-mails to the users at step SP111 or displayed with animation of a simulated race (step SP112). Alternatively, he results of the ranks are sent to the WWW server 11H to prepare a HTML file (step SP113).

Specifically, an E-mail with an appended message running: "your pet arrived second" as shown in FIG. 62 is sent to the user A at step SP111. This E-mail is sent when the value of the physical power parameter was second largest among the participants.

Figure 63:
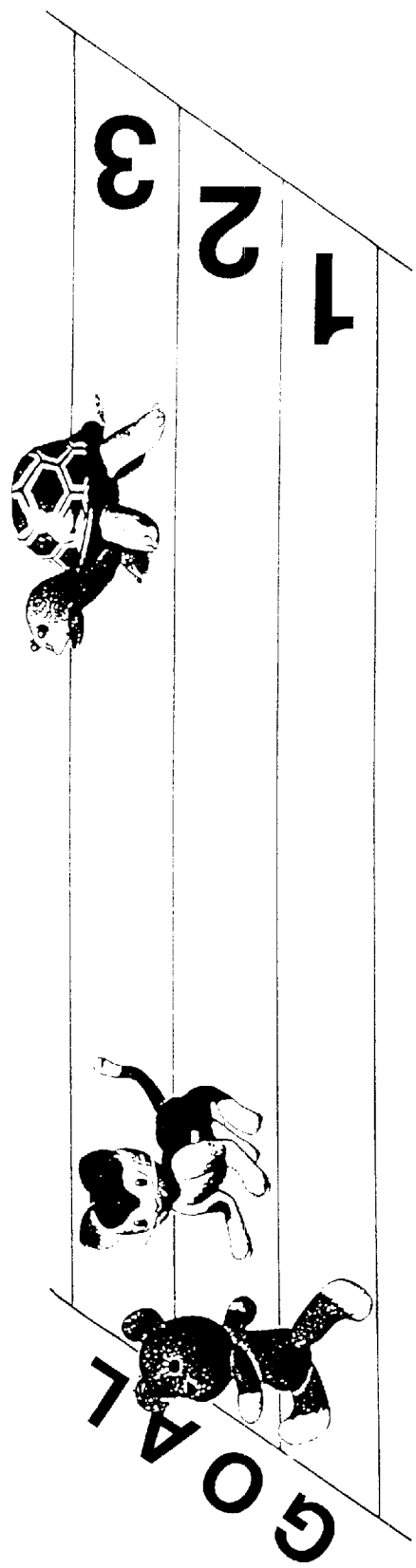
FIG. 63 shows the state of animation display of the results of the athletic meeting by the postpets.

At step SP112, an animation in which Momo, Furo and Sumiko arrive first, second and third are displayed on the home page of the Internet service provider 11, based on the above physical power parameter table, as shown in FIG. 63.

Figure 64:
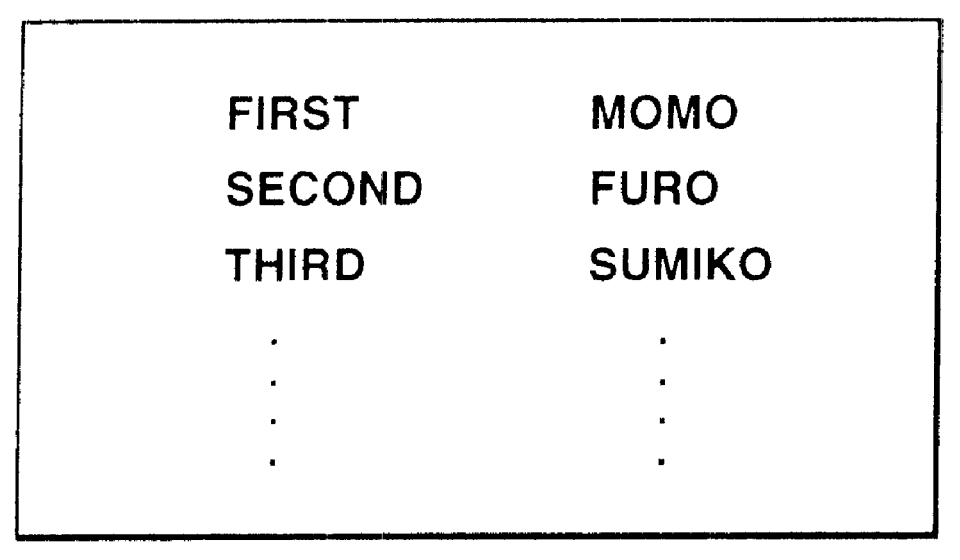

At step SP113, the results of the rank by the physical power parameter are sent to the WWW server 11H, which then formulates a HTML file indicating the ranks of the athletic meeting based on the above ranks as shown in FIG. 64 to display the results on the home page.

Thus, it is possible with the present E-mail system to collect the data of the agent parameters from the users to return he results of collection to the users automatically or to display the athletic meeting of the postpets 103 of the users.

Although the foregoing description has been made in connection with application of the present invention to the Internet, the present invention can be applied to a mail communication system exploiting a personal handy phone or other mobile communication terminals capable of supporting the mail communication on the Intranet or PHS Internet Access Forum Standard (PIAFS), in addition to mail exchange on the Internet.

What is claimed is:

1. A data processing apparatus, comprising:
   a server for receiving a data transmission including an agent parameter defining a behavior of an animated virtual agent and for receiving specifying information which specifies an event;
   a controller for determining an event participation by said animated virtual agent based on said specifying information;
   wherein said controller is configured to modify said agent parameter based on said event participation.

2. The apparatus of claim 1 wherein said event participation includes one of a visit to a cocktail lounge, a barber and a hospital by said virtual agent.

3. The apparatus of claim 2 wherein when said controller determines that said virtual agent visited said cocktail lounge, said controller further configured to lower a physical power parameter of said virtual agent.

4. The apparatus of claim 2 wherein when said controller determines that said virtual agent visited said barber, said controller further configured to modify a physical appearance parameter of said virtual agent.

5. The apparatus of claim 2 wherein when said controller determines that said virtual agent visited said hospital, said controller further configured to lower a physical strength parameter of said virtual agent.

6. The data processing apparatus of claim 1 wherein said animated virtual agent is an electronic pet.

7. A method of data processing, comprising the steps of:
   receiving a data transmission including an agent parameter defining a behavior of an animated virtual agent;
   receiving specifying information which specifies an event;
   determining an event participation by said animated virtual agent based on said specifying information; and
   modifying said agent parameter based on said event participation.

8. The method of claim 7 wherein said event participation includes one of a visit to a cocktail lounge, a barber and a hospital by said virtual agent.

9. The method of claim 8 wherein when said determining step determines that said virtual agent visited said cocktail lounge, said modifying step includes the step of lowering a physical power parameter of said virtual agent.

10. The method of claim 8 wherein when said determining step determines that said virtual agent visited said barber, said modifying step includes the step of modifying a physical appearance parameter of said virtual agent.

11. The method of claim 8 wherein when said determining step determines that said virtual agent visited said hospital, said modifying step includes the step of lowering a physical strength parameter of said virtual agent.

12. The method of data processing of claim 7 wherein said animated virtual agent is an electronic pet.

13. A computer readable medium for storing a computer program for performing data processing, said data processing comprising the steps of:

receiving a data transmission including an agent parameter defining a behavior of an animated virtual agent;

receiving specifying information which specifies an event;

determining an event participation by said animated virtual agent based on said specifying information; and modifying said agent parameter based on said event participation.

14. The medium of claim 13 wherein said event participation includes one of a visit to a cocktail lounge, a barber and a hospital by said virtual agent.

15. The medium of claim 14 wherein when said determining step determines that said virtual agent visited said cocktail lounge, said modifying step includes the step of lowering a physical power parameter of said virtual agent.

16. The medium of claim 14 wherein when said determining step determines that said virtual agent visited said barber, said modifying step includes the step of modifying a physical appearance parameter of said virtual agent.

17. The medium of claim 14 wherein when said determining step determines that said virtual agent visited said hospital, said modifying step includes the step of lowering a physical strength parameter of said virtual agent.

18. The computer readable medium of claim 7 wherein said animated virtual agent is an electronic pet.

* * * * *